US012584327B2

(12) United States Patent
Roy et al.

(10) Patent No.: US 12,584,327 B2
(45) Date of Patent: Mar. 24, 2026

(54) MODULATING POOL OR SPA HEATER SYSTEMS AND ASSOCIATED METHODS

(71) Applicant: Hayward Industries, Inc., Charlotte, NC (US)

(72) Inventors: William Julian Roy, Thompson's Station, TN (US); Benjamin Isaac Corn, Columbia, TN (US); Troy Renken, Hendersonville, TN (US)

(73) Assignee: Hayward Industries, Inc., Charlotte, NC (US)

( * ) Notice: Subject to any disclaimer, the term of this patent is extended or adjusted under 35 U.S.C. 154(b) by 711 days.

(21) Appl. No.: 17/993,734

(22) Filed: Nov. 23, 2022

(65) Prior Publication Data

US 2023/0090852 A1     Mar. 23, 2023

Related U.S. Application Data

(63) Continuation-in-part of application No. 17/832,454, filed on Jun. 3, 2022, now Pat. No. 12,222,702.

(Continued)

(51) Int. Cl.
| | |
|---|---|
| *E04H 4/10* | (2006.01) |
| *E04H 4/12* | (2006.01) |

(Continued)

(52) U.S. Cl.
CPC .............. *E04H 4/129* (2013.01); *E04H 4/10* (2013.01); *F24H 15/14* (2022.01); *F24H 15/219* (2022.01); *G05B 19/41* (2013.01); *G06F 1/26* (2013.01)

(58) Field of Classification Search
None
See application file for complete search history.

(56) References Cited

U.S. PATENT DOCUMENTS

| | | | |
|---|---|---|---|
| 6,246,831 B1 | 6/2001 | Seitz et al. | |
| 6,981,650 B2 * | 1/2006 | Uy ..................... | G05D 23/1902 236/20 R |

(Continued)

FOREIGN PATENT DOCUMENTS

| | | | | |
|---|---|---|---|---|
| EP | 1630422 A2 * | 3/2006 | ........... | E04H 4/1245 |
| EP | 2372260 B1 | 5/2016 | | |
| WO | WO-2008083494 A1 * | 7/2008 | ......... | F04D 15/0066 |

OTHER PUBLICATIONS

AO Smith®, Commercial Gas Water Heaters, Models BTH 300(A)/ 400(A)/500(A), Series 300 & 301, Instruction Manual, marked copyright 2016 (76 pages).

(Continued)

*Primary Examiner* — Mohammad Ali
*Assistant Examiner* — Kelvin Booker
(74) *Attorney, Agent, or Firm* — McCarter & English, LLP

(57)                ABSTRACT

A modulating heater system for a pool or spa includes a pool/spa heater capable of variably modulating energy output thereof and a controller communicatively coupled to the heater. The controller determines a current mode of operation for the heater, and establishes temperature overshoot and target temperature setpoints for pool/spa water for the current mode of operation. The controller determines a current temperature of the water, an optimized modulation rate for the heater for the current mode of operation, and a maximum modulation rate for the heater for the current mode of operation. The controller controls the heater to operate at one of the optimized and maximum modulation rates based on the temperature overshoot setpoint for the current mode of operation, the target water temperature setpoint for the current mode of operation, and the current (Continued)

water temperature. A corresponding method for controlling a pool/spa modulating heater is also provided.

65 Claims, 23 Drawing Sheets

Related U.S. Application Data

(60) Provisional application No. 63/196,617, filed on Jun. 3, 2021.

(51) Int. Cl.
| | |
|---|---|
| *F24H 15/14* | (2022.01) |
| *G05B 19/41* | (2006.01) |
| *G06F 1/26* | (2006.01) |
| *F24H 15/219* | (2022.01) |

(56) References Cited

U.S. PATENT DOCUMENTS

| | | | | |
|---|---|---|---|---|
| 7,236,692 | B2 * | 6/2007 | Tran | H05B 1/0269 |
| | | | | 392/318 |
| 7,874,808 | B2 | 1/2011 | Stiles | |
| 8,043,070 | B2 | 10/2011 | Stiles, Jr. et al. | |
| 8,370,001 | B2 * | 2/2013 | Love | G05D 23/19 |
| | | | | 700/282 |
| 8,406,932 | B2 * | 3/2013 | Hollaway | A61H 33/005 |
| | | | | 219/490 |
| 8,465,262 | B2 | 6/2013 | Stiles, Jr. et al. | |
| 8,971,694 | B2 | 3/2015 | Deivasigamani et al. | |
| 9,063,551 | B2 | 6/2015 | Deivasigamani et al. | |
| 9,362,740 | B1 * | 6/2016 | Elnar | F24H 15/414 |
| 10,018,366 | B2 | 7/2018 | Deivasigamani et al. | |
| 10,240,606 | B2 | 3/2019 | Stiles, Jr. et al. | |
| 10,527,042 | B2 | 1/2020 | Stiles, Jr. et al. | |
| 10,597,886 | B2 * | 3/2020 | Deloche | F25B 49/025 |
| 10,947,981 | B2 | 3/2021 | Stiles | |
| 2003/0061004 | A1 | 3/2003 | Discenzo | |
| 2005/0127197 | A1 * | 6/2005 | Uy | F23N 1/082 |
| | | | | 236/102 |
| 2006/0115248 | A1 * | 6/2006 | Tran | H05B 1/0269 |
| | | | | 392/488 |
| 2006/0260036 | A1 * | 11/2006 | Stover | E04H 4/129 |
| | | | | 4/507 |
| 2008/0168599 | A1 * | 7/2008 | Caudill | A61H 33/0087 |
| | | | | 4/541.1 |
| 2009/0132066 | A1 | 5/2009 | Hollaway | |
| 2009/0204263 | A1 * | 8/2009 | Love | G05D 23/19 |
| | | | | 700/282 |
| 2011/0035870 | A1 * | 2/2011 | Caudill | A61H 33/6021 |
| | | | | 4/541.1 |
| 2011/0044823 | A1 * | 2/2011 | Stiles | F04D 27/004 |
| | | | | 417/42 |
| 2011/0052416 | A1 * | 3/2011 | Stiles | F04D 15/0066 |
| | | | | 417/42 |
| 2011/0219530 | A1 * | 9/2011 | Hollaway | F24H 15/414 |
| | | | | 219/490 |
| 2011/0286727 | A1 * | 11/2011 | Johnson | F24H 1/142 |
| | | | | 392/465 |
| 2012/0117724 | A1 * | 5/2012 | Caudill | A61H 33/6021 |
| | | | | 4/541.1 |
| 2015/0040307 | A1 * | 2/2015 | Deloche | F24F 5/0071 |
| | | | | 4/493 |
| 2016/0305416 | A1 * | 10/2016 | Kruzel | F04B 17/03 |
| 2017/0071821 | A1 | 3/2017 | Laflamme et al. | |
| 2017/0209338 | A1 | 7/2017 | Potucek et al. | |
| 2017/0215261 | A1 | 7/2017 | Potucek et al. | |
| 2017/0314282 | A1 | 11/2017 | Nix | |
| 2018/0163993 | A1 | 6/2018 | Goodjohn et al. | |
| 2018/0174207 | A1 | 6/2018 | Potucek et al. | |
| 2018/0224822 | A1 | 8/2018 | Potucek et al. | |
| 2018/0240322 | A1 | 8/2018 | Potucek et al. | |
| 2019/0021944 | A1 * | 1/2019 | Hollaway | F24H 15/421 |
| 2020/0016029 | A1 | 1/2020 | Guilfoyle et al. | |
| 2020/0319621 | A1 | 10/2020 | Roy et al. | |
| 2021/0102712 | A1 | 4/2021 | Deivasigamani et al. | |
| 2021/0108643 | A1 | 4/2021 | Stiles, Jr. et al. | |
| 2021/0164477 | A1 | 6/2021 | Stiles, Jr. et al. | |
| 2021/0190372 | A1 | 6/2021 | Montanez et al. | |
| 2022/0107614 | A1 | 4/2022 | Pleva et al. | |
| 2022/0390924 | A1 | 12/2022 | Roy et al. | |

OTHER PUBLICATIONS

Lochinvar®, Crest Condensing Boiler with RealTime O2 TrimTM, Models: 1000-6000, Series: 100, Installation & Operation Manual, Rev. B, marked Oct. 2021 (72 pages).

Lochinvar®, Knight® Heating Boiler, Models: 80-285, Service Manual, KB-SER-08, marked Apr. 2010 (44 pages).

PVI Industries®, Conquest® Water Heater with EOS (Electronic Operating System) Models (20, 25, 30) L 100 A-GCL, Installation & Maintenance Manual, marked Nov. 2018 (62 pages).

Raypak®, X94 Professional Gas-Fired Pool & Spa Heater, Low NOx Model SR-410, Installation and Operation Manual, Rev. 3, marked effective: Feb. 5, 2021 (52 pages).

Raypak®, X94 Professional High Efficiency Pool and Spa Heater, Brochure, 6200.30C, marked effective Nov. 15, 2018 (8 pages).

Viessman®, Vitocrossal 300 CA3 Series 2.5, 3.0, 3.5, 4.0, 5.0 and 6.0, Installation and Service Instructions, marked May 2019 (252 pages).

Intellihot, "Dynamic Response Technology", blog post by Amy Turner published Apr. 1, 2022, archived at https://web.archive.org/web/20220930003754/https://intellihot.com/dynamic-response-technology/ (5 pages).

Notice of Allowance issued in connection with U.S. Appl. No. 17/832,454 dated Aug. 2, 2024 (10 pages).

PCT International Search Report and Written Opinion dated Mar. 14, 2024, issued in connection with Int'l App. No. PCT/US23/80791 (8 pages).

\* cited by examiner

114

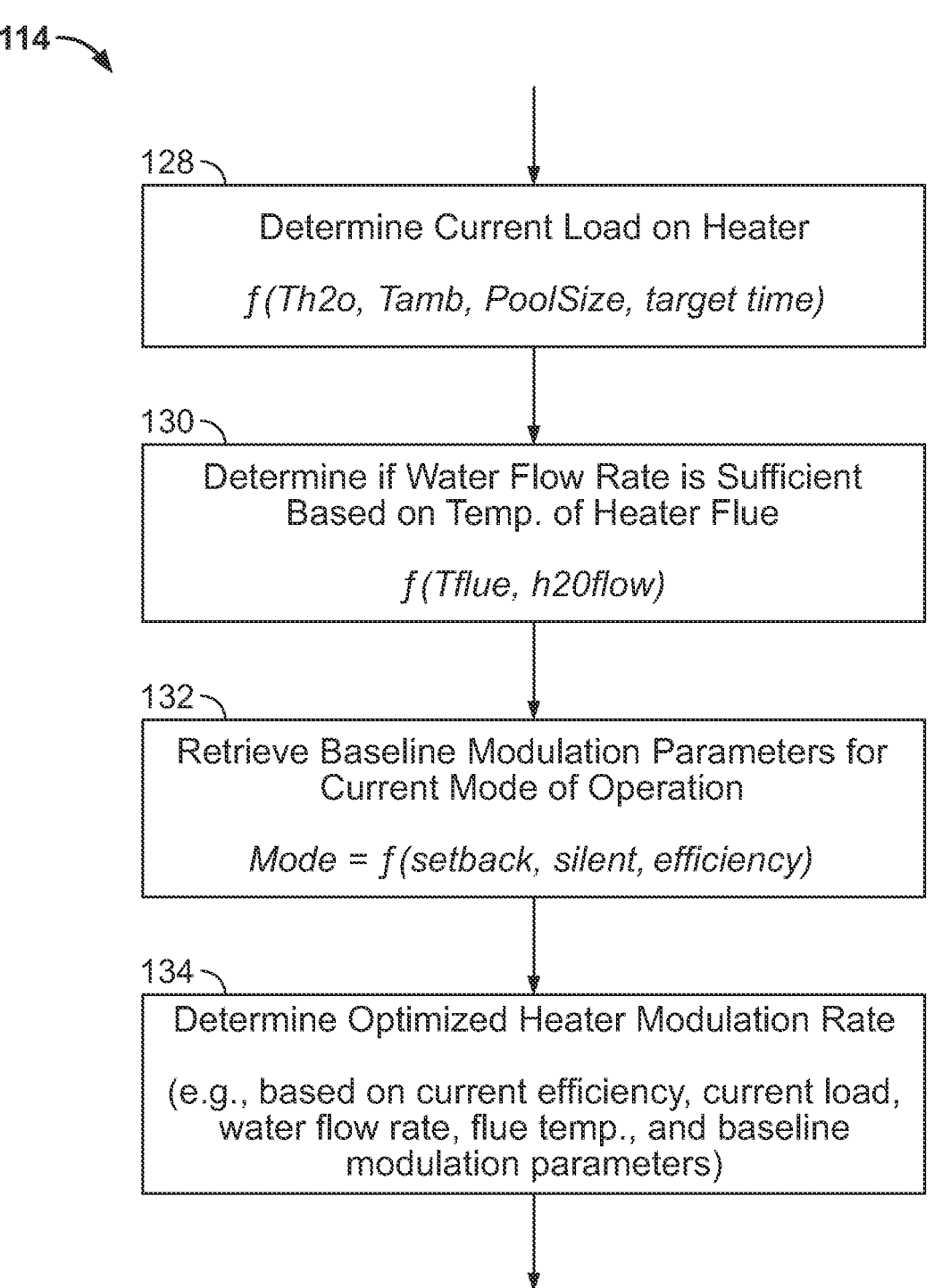

128

Determine Current Load on Heater

*f(Th2o, Tamb, PoolSize, target time)*

130

Determine if Water Flow Rate is Sufficient
Based on Temp. of Heater Flue

*f(Tflue, h20flow)*

132

Retrieve Baseline Modulation Parameters for
Current Mode of Operation

*Mode = f(setback, silent, efficiency)*

134

Determine Optimized Heater Modulation Rate (e.g., based on current efficiency, current load,
water flow rate, flue temp., and baseline
modulation parameters)

Determine Current Mode of Operation

*f (setback, recovery, silent, efficiency)*

136

Determine Max Output of Heater
Based on Available Gas Supply

*f (gas inlet pressure)*

138

Determine if Water Flow Rate is
Sufficient Based on Flue Temp.
of Heater

*f (Tflue,h2oflow)*

1108

1110 — Pool (Large Body) Heating Process

1112 — User Selects Spa Operation

1114 — Start Spa Cycle

1116 — Actuators in Spa Mode Positions?

YES

NO

1122 — Spa (Small Body) Heating Process

1118 — Set Variable Speed Pump and Heater to Minimum Operating Levels

1120 — Change Actuators to Spa Mode Positions

MODULATING POOL OR SPA HEATER SYSTEMS AND ASSOCIATED METHODS

CROSS-REFERENCE TO RELATED APPLICATIONS

The present application is a continuation-in-part of U.S. Non-Provisional application Ser. No. 17/832,454 filed on Jun. 3, 2022, which claims the benefit of priority to U.S. Provisional Patent Application No. 63/196,617, filed on Jun. 3, 2021, the entire disclosures of which are expressly incorporated by reference herein in their entirety.

TECHNICAL FIELD

The present disclosure relates to modulating pool or spa heater systems and associated methods and, in particular, to modulating pool or spa heater systems having enhanced adaptability to various pool or spa conditions, optimized energy usage characteristics, and enhanced safety features.

BACKGROUND

Swimming pools and spas use various types of heaters, such as gas-fired heaters running on natural gas ("NG") or liquefied petroleum ("LP") gas, for heating the water being circulated in the pool or spa. A gas-fired pool or spa heater can be controlled to variably alter the energy or heat output thereof as a percentage of the heater's maximum capacity and can include a plurality of control and/or performance features, such as proportional-integral-derivative ("PID") tuning. Additionally, modulation is a known technique that allows a heater to control the heat capacity of a heater as needed.

However, it is desirable for a modulating heater to differentiate between modes of pool or spa operation (e.g., "silent mode," "green mode," etc.) and alter modulation based thereon, account for changes in water temperature in order to provide more complete diagnostics and optimize energy usage, and adequately control the modulation rate to avoid unnecessarily long heating times and/or energy requirements. Accordingly, what is needed is a modulating heater system that automatically and efficiently adjusts the modulation of a modulating heater to provide enhanced adaptability to various pool or spa conditions, integration with a plurality of modes of operation, optimized energy usage characteristics, and enhanced safety features. Accordingly, the systems and methods disclosed herein solve these and other needs.

SUMMARY

The present disclosure relates modulating heater systems for a pool or spa and associated methods.

According to one aspect of the present disclosure, a modulating heater system for a pool or spa is provided. The modulating heater system includes a pool or spa heater in fluidic communication with water of a pool or spa, and a controller communicatively coupled to the pool or spa heater. The heater is capable of variably modulating energy output thereof to heat the water of the pool or spa. The controller determines a predicted load based on a previous load, a current ambient temperature, a current water temperature, and an estimated pool or spa size, and determines a temperature overshoot setpoint for a mode of operation. The controller also establishes a target water temperature setpoint for the pool or spa water for the mode of operation and receives a current water temperature of the pool or spa water from a temperature sensor. Additionally, the controller determines whether the temperature overshoot setpoint for the mode of operation plus the target water temperature setpoint for the mode of operation is greater than the current water temperature. The controller also determines an error value based on the temperature overshoot setpoint for the current mode of operation, the target water temperature setpoint for the current mode of operation, and the current water temperature. In this regard, the error value is determined as the temperature overshoot setpoint plus the target water temperature setpoint minus the current water temperature. The controller determines if the error value is less than a target value for the mode of operation. If the error value is determined to be less than the target value, then the controller determines a first modulation rate for the pool or spa heater for the mode of operation. In this regard, the first modulation rate is determined based at least on the mode of operation. If the error value is determined to be greater than the target value, then the controller determines a second modulation rate for the pool or spa heater for the mode of operation. In this regard, the second modulation rate is a maximum modulation rate that is determined based on a maximum output of the pool or spa heater, an available fuel supply, and the mode of operation. The controller also controls the pool or spa heater to operate at one of the first modulation rate and the second modulation rate.

According to aspects of the present disclosure, a modulating heater system for a pool or spa is provided. The modulating heater system includes a pool or spa heater in fluidic communication with water of a pool or spa and a controller communicatively coupled to the pool or spa heater. The heater is capable of variably modulating energy output thereof to heat the water of the pool or spa. In some instances, the heater can be a gas heater. The controller is configured to determine a current mode of operation for the pool or spa heater, and establish a temperature overshoot setpoint for the current mode of operation and a target temperature setpoint for the pool or spa water for the current mode of operation. The controller is additionally configured to determine a current temperature of the pool or spa water, an optimized modulation rate for the pool or spa heater for the current mode of operation, and a maximum modulation rate for the pool or spa heater for the current mode of operation. The controller is further configured to control the pool or spa heater to operate at one of the optimized modulation rate and the maximum modulation rate based on the temperature overshoot setpoint for the current mode of operation, the target water temperature setpoint for the current mode of operation, and the current water temperature.

In some aspects, the controller can be also configured to determine if the current water temperature is less than the temperature overshoot setpoint for the current mode of operation plus the target water temperature setpoint for the current mode of operation. In such aspects, the controller can be configured to control the pool or spa heater to operate at one of the optimized modulation rate and the maximum modulation rate if the current water temperature is less than the temperature overshoot setpoint for the current mode of operation plus the target water temperature setpoint for the current mode of operation.

In other aspects, the controller can be configured to confirm the presence of a flow of water through the heater prior to operating the heater.

In still other aspects, the controller can be configured to control a variable speed pump that is in fluidic communication with the heater. In such aspects, the controller can be configured to establish variable speed pump parameters and heater modulation parameters based on the current mode of operation. The controller can additionally or alternatively be configured to establish a heater outlet water temperature setpoint and determine a current heater outlet water temperature of water at an outlet of the heater. Additionally, the controller can be configured to control a modulation rate of the heater and a speed of the variable speed pump based on a difference between the heater outlet water temperature setpoint and the current heater outlet water temperature. In connection with this functionality, the controller can be configured to instruct the variable speed pump to operate at a minimum allowable speed for the current mode of operation if the current heater outlet water temperature is less than the heater outlet water temperature setpoint, and/or instruct the variable speed pump to increase speed until operating at a maximum allowable speed for the current mode of operation if the current heater outlet water temperature is greater than the heater outlet water temperature setpoint. Furthermore, the controller can be configured to also adjust the modulation rate of the heater while the variable pump speed is operating at the maximum allowable speed for the current mode of operation to cause the current water temperature to gradually approach the target temperature setpoint for the pool or spa water and minimize overshoot.

In some other aspect, the controller can be enclosed within a housing of the modulating pool or spa heater, can be a local pool or spa control system, or can be a cloud-based pool or spa control system.

In some aspects, the current mode of operation can be determined based on a user input.

In some other aspects, the controller can be configured to determine an initial thermal load and the temperature overshoot setpoint for the current mode of operation based on one or more of a predicted load of the pool or spa heater, an actual load of the pool or spa heater from a previous cycle, an estimation of pool or spa occupancy, the current temperature of the pool or spa water, and a current ambient air temperature at the pool or spa.

In still other aspects, the controller can be configured to determine the target water temperature setpoint for the current mode of operation based on whether the current mode of operation is a mode of operation where the pool or spa is in-use or a mode of operation where the pool or spa is not in-use.

In some aspects, the controller can be configured to determine an error value based on the temperature overshoot setpoint for the current mode of operation, the target water temperature setpoint for the current mode of operation, and the current water temperature. The controller can also be configured to control the pool or spa heater to operate at one of the optimized modulation rate and the maximum modulation rate based on the error value. Additionally, the controller can be configured to determine if the error value is less than a target error value for the current mode of operation, instruct the pool or spa heater to operate at the optimized modulation rate for the pool or spa heater when the error value is less than the target error value for the current mode of operation, and instruct the pool or spa heater to operate at the maximum modulation rate for the pool or spa heater when the error value is greater than the target error value for the current mode of operation. In such aspects, the error value can be calculated as the temperature overshoot setpoint for the current mode of operation plus the target water temperature setpoint for the current mode of operation minus the current water temperature.

In some other aspects, the controller can determine the optimized modulation rate for the current mode of operation based on one or more of a determination of a current load on the pool or spa heater, a determination of whether a water flow rate through the pool or spa heater is sufficient, and baseline modulation parameters for the current mode of operation. In this regard, the current load on the pool or spa heater can be determined based on one or more of the current water temperature, an ambient temperature, a size of the pool or spa, and a desired cycle time to heat the pool or spa. The controller can also determine the maximum modulation rate for the current mode of operation based on one or more of a maximum output of the pool or spa heater and a determination of whether the water flow rate through the pool or spa heater is sufficient. In connection therewith, the maximum output of the pool or spa heater can be determined based on one or more of a maximum thermal output of the pool or spa heater, an available fuel supply, and an elevation of the pool or spa.

In some aspects, the controller can be configured to control a variable speed pump and at least one valve actuator. The at least one valve actuator can be adjustable between a pool mode in which it adjusts an associated valve to provide water from the pump to a pool and a spa mode in which it adjusts the associated valve to provide water from the pump to a spa. In such aspects, the controller can be configured to adjust the speed of the variable speed pump and the modulation rate of the heater to a minimum allowable level prior to transitioning the at least one valve actuator from pool mode to spa mode or from spa mode to pool mode. Alternatively, the at least one valve actuator can be adjustable between a pool mode in which it adjusts an associated valve to provide water from the pump to a pool and a water feature mode in which it adjusts the associated valve to provide water from the pump to a water feature. In such aspects, the controller can be configured to suspend a current heating cycle and adjust the speed of the variable speed pump to a minimum allowable level prior to transitioning the at least one valve actuator from pool mode to water feature mode or from water feature mode to pool mode. Additionally, the controller can be configured to reactivate the heating cycle after transitioning the at least one valve actuator from pool mode to water feature mode, control the speed of the variable speed pump based on a flow requirement of the water feature, and control the modulation rate of the heater based on the speed of the variable speed pump.

In still other aspects, the controller can be configured to determine a current ambient air temperature at the pool or spa, if the current ambient air temperature is less than an ambient air temperature threshold, and if the current temperature of the pool or spa water is less than a pool or spa water threshold. The controller can be also configured to instruct a variable speed pump to operate at a predefined speed if the current ambient air temperature is less than an ambient air temperature threshold and the current temperature of the pool or spa water is less than a pool or spa water threshold. Additionally, the controller can be configured to transition at least one valve actuator into a heating position in which the at least one valve actuator adjusts an associated valve to allow water to flow from the pump to the heater after instructing the variable speed pump to operate at the predefined speed, and operate the heater according to an icing protection heating cycle.

In some aspects, the controller can be configured to determine a flow rate of water through the heater, compare the flow rate of water through the heater to an expected flow rate, and instruct a variable speed pump to adjust its speed based on the comparison to compensate for a difference between the flow rate and the expected flow rate. In such aspects, the expected flow rate can be based on a speed of a variable speed pump communicatively coupled to the controller.

The controller can also be configured to receive information relating to required pool volume turnovers, control a speed of a variable speed pump based on the information to achieve the required pool volume turnovers, and control the modulation rate of the heater based on the speed of the variable speed pump.

Methods of controlling a heater with a controller consistent with the foregoing functionalities are also provided by the present disclosure.

In particular, according to aspects of the present disclosure, a method for controlling a pool or spa modulating heater is provided. The method involves determining a current mode of operation for the pool or spa heater with a controller communicatively coupled to the pool or spa heater. The heater is capable of variably modulating energy output thereof to heat water of a pool or spa in fluidic communication with the heater, and, in some instances, can be a gas heater. The method further involves establishing a temperature overshoot setpoint for the current mode of operation and a target temperature setpoint for the pool or spa water for the current mode of operation. The method also involves determining a current water temperature of the pool or spa water, an optimized modulation for the pool or spa heater for the current mode of operation, and a maximum modulation for the pool or spa heater for the current mode of operation. Additionally, the method involves controlling the pool or spa heater to operate at one of the optimized modulation rate and the maximum modulation rate based on the temperature overshoot setpoint for the current mode of operation, the target water temperature setpoint for the current mode of operation, and the current water temperature.

According to some other aspects of the present disclosure, a method of controlling a pool or spa modulating heater and a variable speed pump a provided. The modulating heater is capable of variably modulating energy output thereof to heat water of a pool or spa in fluidic communication with the heater, and, in some instances, can be a gas heater. The method involves receiving an instruction to operate the heater according to a heating mode of operation, instructing the variable speed pump to operate at a starting speed, instructing the modulating heater to operate at a starting modulation rate, and instructing the modulating heater to increase modulation rate to a maximum allowed modulation rate and the variable speed pump to decrease speed to a minimum allowable operating level. The method additionally involves determining a current heater outlet water temperature of the water at an outlet of the modulating heater and comparing the current heater outlet water temperature to an outlet water temperature setpoint. The method further involves instructing the variable speed pump to increase speed to a maximum allowable operating level when the current heater outlet water temperature is greater than the outlet water temperature setpoint, and adjusting the modulation rate of the heater while the variable pump speed is operating at the maximum allowable operating level to cause a current water temperature to gradually approach a target temperature setpoint for the pool or spa water and minimize overshoot. One or more of the foregoing steps can be performed by the controller.

In some aspects, the method can also include the steps establishing variable speed pump parameters, heater modulation parameters, and/or heater outlet water temperature setpoint based on the heating mode of operation.

In some other aspects, the method can include the steps of determining the heating mode of operation based on a user input, determining the maximum modulation rate based on the heating mode of operation, and/or determining the minimum allowed operating level based on the heating mode of operation.

According to some other aspects of the present disclosure, a modulating heater system for a pool or spa is provided. The system includes a pool or spa heater that is in fluidic communication with water of a pool or spa, and is capable of variably modulating energy output thereof to heat the water of the pool or spa, as well as a controller communicatively coupled to the pool or spa heater. The controller is configured to receive an instruction for the heater to operate according to a heating mode of operation. The controller is also configured to instruct a variable speed pump to operate at a starting speed, the heater to operate at a starting modulation rate, the heater to increase modulation rate to a maximum allowed modulation rat, and the variable speed pump to decrease speed to a minimum allowable operating level. Additionally, the controller is configured to determine a current heater outlet water temperature of the water at an outlet of the heater and compare the current heater outlet water temperature to an outlet water temperature setpoint. The controller is further configured to instruct the variable speed pump to increase speed to a maximum allowable operating level when the current heater outlet water temperature is greater than the outlet water temperature setpoint, and adjust the modulation rate of the heater while the variable pump speed is operating at the maximum allowable operating level to cause a current water temperature to gradually approach a target temperature setpoint for the pool or spa water and minimize overshoot.

In some aspects, the controller can also be configured to establish variable speed pump parameters, heater modulation parameters, and the heater outlet water temperature setpoint based on the heating mode of operation.

In some other aspects, the controller can also be configured to determine the heating mode of operation based on a user input, the maximum modulation rate based on the heating mode of operation, and the minimum allowed operating level based on the heating mode of operation.

BRIEF DESCRIPTION OF THE DRAWINGS

The foregoing features of the invention will be apparent from the following Detailed Description of the Invention, taken in connection with the accompanying drawings, in which:

FIG. 4 is a flowchart illustrating processing step 114 of FIG. 2 in greater detail;

DETAILED DESCRIPTION

The present disclosure relates to modulating pool or spa heater systems and associated methods for optimized heating and operation of pool and spa environments, as described in detail below in connection with FIGS. 1-21.

Figure 1:
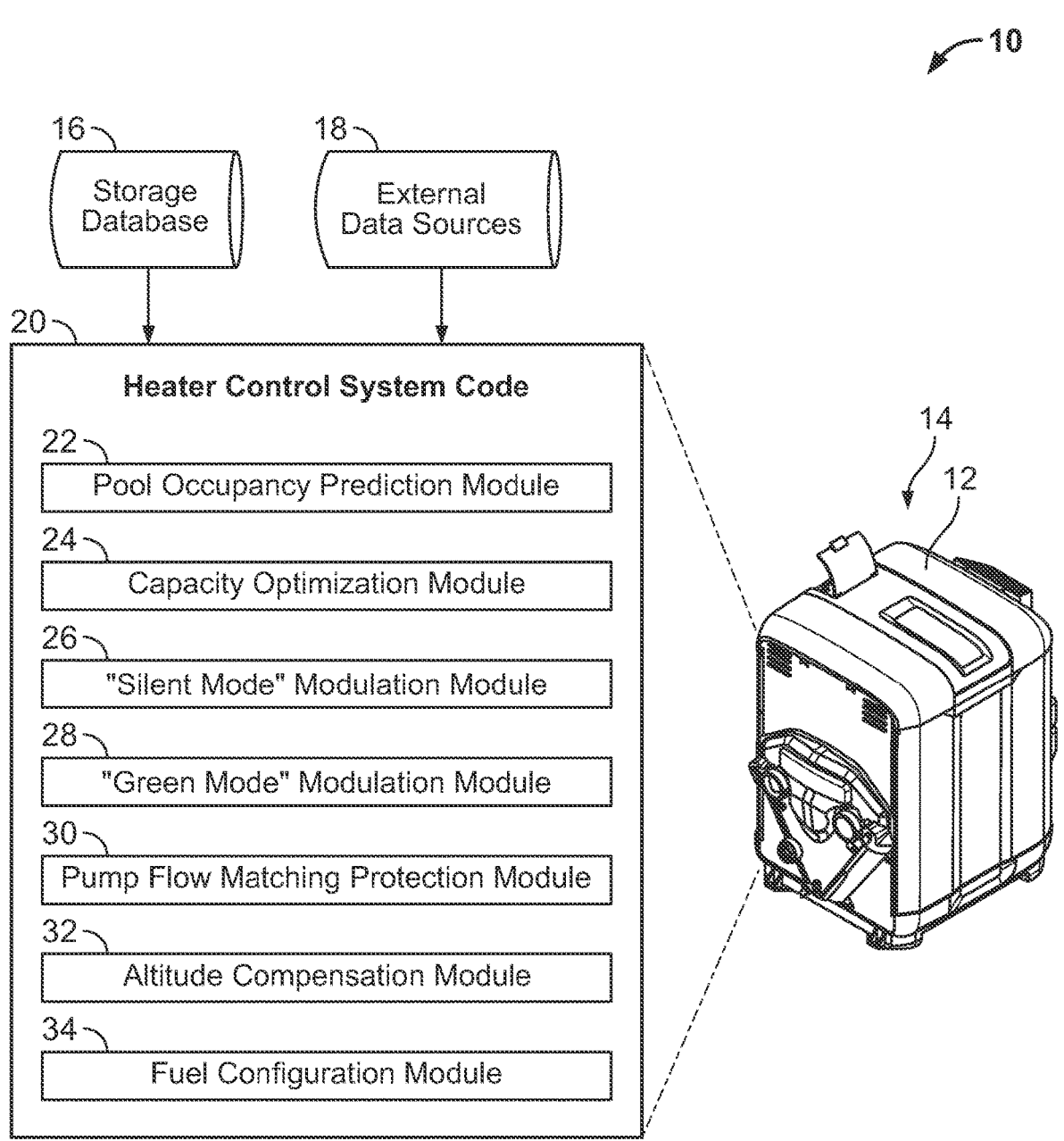
FIG. 1 is a diagram illustrating a modulating pool or spa heater system of the present disclosure.

FIG. 1 is a diagram illustrating hardware and software components of the modulating pool or spa heater system (hereinafter "system 10") of the present disclosure. The system 10 could be embodied as a central processing unit 12 (e.g., a hardware processor) that is coupled to a gas-fired pool or spa modulating heater 14 and can execute system code that determines a modulation rate for the heater 14. The central processing unit 12 can also be coupled to one or more storage databases 16 and one or more external data sources 18 (e.g., sensors, other pool or spa components, networks, etc.). As described herein, the modulating pool or spa heater 14 can be controlled to variably alter the energy or heat output thereof as a percentage of the heater's 14 maximum capacity. For example the modulating heater 14 can be controlled to operate at 85% of the heater's 14 maximum capacity, or likewise, to have an equivalent modulation rate of 85%. Conversely, the modulating heater 14 can be modulated by 15% or have a modulation of 15%, which is equivalent to operating at 85% of the heater's 14 maximum capacity. As should be understood by one of ordinary skill in the art, modulation of the heater 14 can be achieved by adjusting a variable gas supply valve or blower speed to control the amount of fuel provided to a burner of the heater. As shown in FIG. 1, the hardware processor 12 could be housed within the modulating heater unit 14 itself, e.g., in a control panel thereof, or another pool or spa device, e.g., a central controller. Additionally, the hardware processor 12 could include, but is not limited to, a centralized or distributed pool or spa control system, a personal computer, a laptop computer, a tablet computer, a smart telephone, a server, and/or a cloud-based computing platform.

The system 10 includes system code 20 (e.g., non-transitory, computer-readable instructions) stored on a computer-readable medium and executable by the hardware processor 12 and/or additional computer systems. The code 20 could include various custom-written software modules that carry out the steps/processes discussed herein, and could include, but is not limited to, a pool occupancy prediction module 22, a capacity optimization module 24, a "silent mode" modulation module 26, a "green mode" modulation module 28, a pump flow matching module 32, and a fuel configuration module 34. The code 20 could be programmed using any suitable programming language including, but not limited to, C, C++, C#, Java, Python, or any other suitable language. Additionally, the code 20 could be distributed across multiple computer systems in communication with each other over a communications network, and/or stored and executed on a cloud computing platform and remotely accessed by a computer system in communication with the cloud platform. The code 20 could communicate with the storage database 16, which could be stored on the same computer system as the code 20, or on one or more other computer systems in communication with the code 20.

Still further, the system 10 could be embodied as a customized hardware component such as a field-programmable gate array ("FPGA"), application-specific integrated circuit ("ASIC"), embedded system, or other customized hardware component without departing from the spirit or scope of the present disclosure. It should be understood that FIG. 1 is only one potential configuration, and the system 10 of the present disclosure can be implemented using a number of different configurations.

Figure 2:
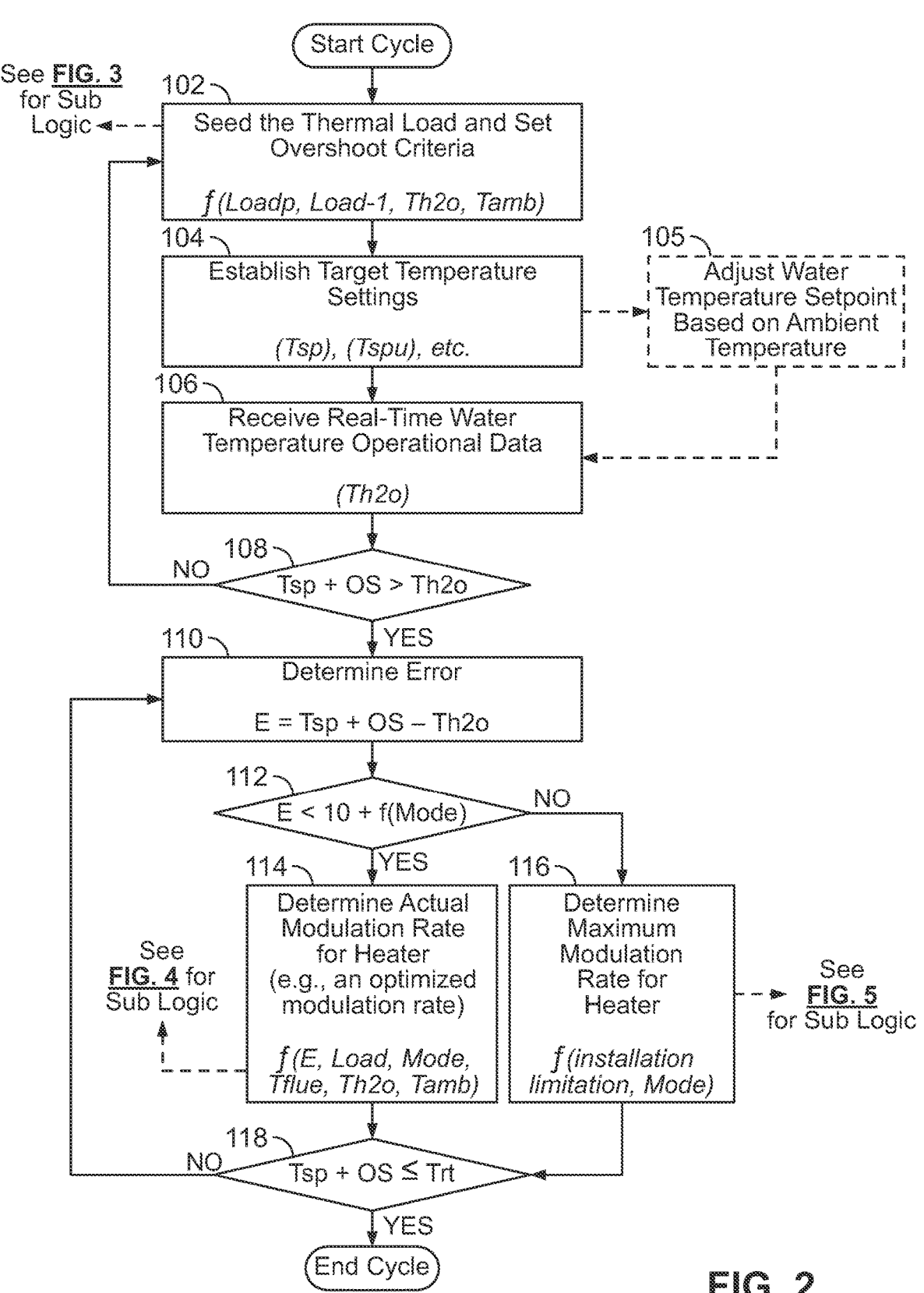
FIG. 2 is a flowchart illustrating overall process steps carried out by the system of the present disclosure.

FIG. 2 is a flowchart illustrating overall process steps carried out by the system 10 of the present disclosure for optimizing the modulation of a pool or spa heater (e.g., modulating heater 14, shown in FIG. 1) for one or more modes of operation (e.g., "silent mode," "green mode," etc.). In step 102, the system 10 seeds the thermal load and sets overshoot criteria for the given mode of operation. Step 102 can be expressed as a function of pertinent variables, such as, Loadp, Load-1, Occ, Th2o, and Tamb-f(Loadp, Load-1, Occ, Th2o, Tamb), where Loadp is the predicted load of the pool or spa heater 14 determined by the system 10, Load-1 is the actual load of the pool or spa heater 14 for a previous cycle, Occ is an estimation of pool occupancy, Th2o is the measured real-time temperature of the pool or spa water, and Tamb is the current ambient temperature at the pool or spa installation. Step 102 provides for temperature setpoint and overshoot management for one or more modes of operation for the system including: setpoint overshoot (OS) minimization utilizing a PID control loop algorithm with auto tuning for stable water temperature (Th2o) control; ambient temperature (Tamb) compensation, which can inversely adjust the water temperature setpoint (Tsp) based on the current ambient temperature (Tamb) at the pool or spa installation; set back mode, which can lower the water temperature setpoint (Tsp) when the pool or spa is not in use in order to save energy and reduce heating costs; heater cycle optimization, which can adjust the heater cycle times and overshoot settings (OS) for a given mode of operation to facilitate a minimum amount of mixing of the pool or spa water to ensure equalized temperature distribution and the dispersion of localized hot spots; load prediction, which examines the load for the present heater cycle (Load) and one or more previous heater cycles (Load-1) to predict the next heater cycle load (Loadp); pool occupancy prediction, which can adjust the heater load prediction (Loadp), water temperature setpoints (Tsp), and overshoot (OS) settings based on an estimated pool occupancy determination (Occ); and pool water level or cover alert, which can evaluate whether the water level of the pool or spa is decreasing based on a predicted pool size (Pool Size) from cycle to cycle, the actual load on the heater (Load), and the predicted load (Loadp), with a larger actual heater load (Load) compared to the predicted load (Loadp) indicating that the pool or spa cover may have been removed or dislodged. Step 102 is described in greater detail hereinbelow, in connection with FIG. 3.

In step 104, the system 10 establishes target temperature settings for one or more modes of operation, which can be pre-programmed, or user-defined, setpoints for the pool or spa water. For example, the user can specify an "in-use" target temperature setting for use with heater modes when the pool or spa is in use (Tsp) and a "not in-use" target temperature setting for use with heater modes when the pool or spa is not in use (Tspu). The user could also specify individual target temperature settings for use with each individual mode of operation (e.g., $Tsp_{econ}$, $Tsp_{setback}$, $Tsp_{silent}$ etc.). Optionally, in step 105, the system 10 can adjust the water temperature setpoint (Tsp) for an active mode of operation based on the current ambient temperature (Tamb), or other environmental conditions, at the pool or spa installation. For example, the system 10 can determine an adjusted temperature setpoint (Tsp') for a given mode of operation based on pertinent variables, such as, Tsp, K, and Tamb, given the equation $Tsp'=Tsp \times K/Tamb$, where Tsp is an initial temperature setpoint for the given mode of operation (e.g., specified by the user), K is a constant, and Tamb is the ambient temperature. Accordingly, the adjusted temperature setpoint (Tsp') is inversely proportional to the ambient temperature (Tamb) and, as such, decreases as the ambient temperature increases and increase as ambient temperature decreases, thereby providing a more comfortable user experience.

In step 106, the system 10 receives real-time water temperature operational data (Th2o) from, for example, temperature sensors disposed within the pool or spa or within piping of the heater 14, e.g., the inlet pipe and/or the outlet pip. In step 108, the system 10 determines if the target temperature setting plus allowable overshoot (OS) criteria for the given mode of operation (e.g., maximum allowable deviation from the target temperature setting (Tsp)) is greater than the real-time water temperature operational data (Th2o) received in step 106. As such, step 108 can be expressed as the equation: $Tsp+OS>Th2o$. If a negative determination is made in step 108, then the process returns to step 102, such that the occupancy ($O_{cc}$) and ambient temperature ($T_{amb}$) inputs continue to affect the target temperature setting (Tsp) and overshoot (OS) criteria. If a positive determination is made in step 108, then the process advances to step 110 where the system 10 determines the error (E) of the heater 14 for the current mode of operation utilizing the following equation: $E=Tsp+OS-Th2o$.

In step 112, the system 10 determines if the error of the heater 14 is less than ten (10), or some other variable amount, plus a target error for the given mode of operation f(mode), given the equation: $E<10+f(mode)$. If a positive determination is made in step 112, then the process advances to step 114, where the system 10 determines an actual modulation rate for the heater 14, which can be, for example, a minimum modulation rate or an optimized modulation rate, based on a function of pertinent variables, such as, E, Load, Mode, Tflue, Th2o, and Tamb-f(E, Load, Mode, Tflue, Th2o, Tamb), where E is the current error of the heater 14, Load is the current load of the heater 14, Mode refers to one or more (e.g., user defined) parameters related to the current mode of operation (e.g., max modulation rate of 85% in "silent mode"), Tflue is the temperature of the exhaust flue of the heater 14, Th2o is the water temperature, and Tamb is the ambient temperature at the pool or spa installation. Step 114 provides for the actual modulation rate of the heater 14 for one or more modes of operation for the system 10 and can include one or more of: modulation step sizing and ramp up response speed, which provide for adaptive performance modifications and system response linearization; a load dump zone, which is a safety feature to protect the user and the heater 14 from over-temperature conditions if modulation steps or ramp rates become excessive; automatic altitude compensation, which utilizes information related to the altitude of the pool or spa installation to establish the minimum and maximum heater modulation rates; and automatic fuel identification and/or switching, which generates a thermal ignition profile including flue temperature, ambient temperature, and ignition rate(s) to determine if the heater 14 is connected to a natural or propane gas supply. Step 114 is described in greater detail hereinbelow, in connection with FIG. 4.

If a negative determination is made in step 112, then the process advances to step 116, where the system 10 determines the maximum modulation rate for the heater 14, based on a function of pertinent variables, such as, Installation Limitation, and Mode-f(Installation Limitation, Mode), where Installation Limitation refers to one or more of hardware and user-defined limitations related to the modulating heater system 10, such as, but not limited to, maximum output (e.g., BTUs) of a particular modulating heater unit (e.g., heater 14), available fuel supply (e.g., flow rate of natural gas or liquefied petroleum (LP) gas), elevation of the pool or spa installation, etc., and Mode refers to one or more (e.g., user defined) parameters or limitations related to the current mode of operation (e.g., max modulation rate of 85% in "silent mode"). Step 116 provides for the maximum modulation rate of the heater 14 (e.g., maximum capacity) for one or more modes of operation for the system 10 and can include one or more of the following functions: flue temperature scaling, which utilizes information from a flue temperature sensor and a water return (e.g., inlet) temperature sensor for heat exchanger protection; set back recovery, where greater deviations between the setback temperature setpoint (Tspu) and the water temperature setpoint (Tsp) provide for larger allowable overshoot (OS) settings, modulation steps, and modulation ramp rates; a momentary system boost (e.g., "fast" heat mode), which can override of a system setback mode or setpoint temperature while also being integrated into other modes of operation, such as "silent" or "green" modes; heater unit capacity optimization, which utilizes an inlet gas pressure sensor, previous cycle times, and load predictions to determine the maximum capacity of the heater 14 for a given mode of operation; a "silent" mode set back, which includes a dedicated schedule and modulation rate for the silent mode of operation and can further include "soft start" heater operation to reduce noise and instantaneous power requirements; a "green mode" efficiency optimization, including a modulation rate that is a function of both water temperature and heater flue temperature in order to achieve highest possible efficiency over time to heat and cycle optimization; and pump flow matching override, which adjusts the modulation rate and step size such that the heater 14 capacity matches the current pump speed in order to prevent the heat exchanger from overheating, without requiring communication between the heater 14 and a filter pump. Step 116 is described in greater detail hereinbelow, in connection with FIG. 5.

In other words, in step 108, the system makes a determination whether heating is required and in step 110, if a positive determination is made in step 108, the system determines the error of the current heating mode of operation, e.g., how much lower the current water temperature (Th2o) is than the temperature setpoint (Tsp) plus allowable overshoot (OS). Based on the determined error, in step 112, the system determines whether the heater 14 should be operated at a maximum modulation rate for the current mode to provide increased heating, whether the heater 14 should be operated at a minimum modulation rate for the current mode to provide reduced heating, or operated at a modulation rate (e.g., an actual modulation rate or an optimized modulation rate) between these extremes (e.g., where minimum modulation rate<actual or optimized modulation rate<maximum modulation rate). Those of ordinary skill in the art will understand that, as discussed herein, the minimum modulation rate of the pool or spa heater can be determined from a lookup table, based on the particular configuration of the pool or spa heater, listed state variables, and a flame sense threshold, when fired.

The process then advances to step 118, where the system 10 determines if the temperature set point (Tsp) plus the allowable overshoot is less than or equal to the real time temperature operational data received in step 106. As such, step 118 can be expressed as the equation: Tsp+OS≤Th2o. If a positive determination is made in step 118, then the process ends. If a negative determination is made in step 118, then the process returns to step 110.

Figure 3:
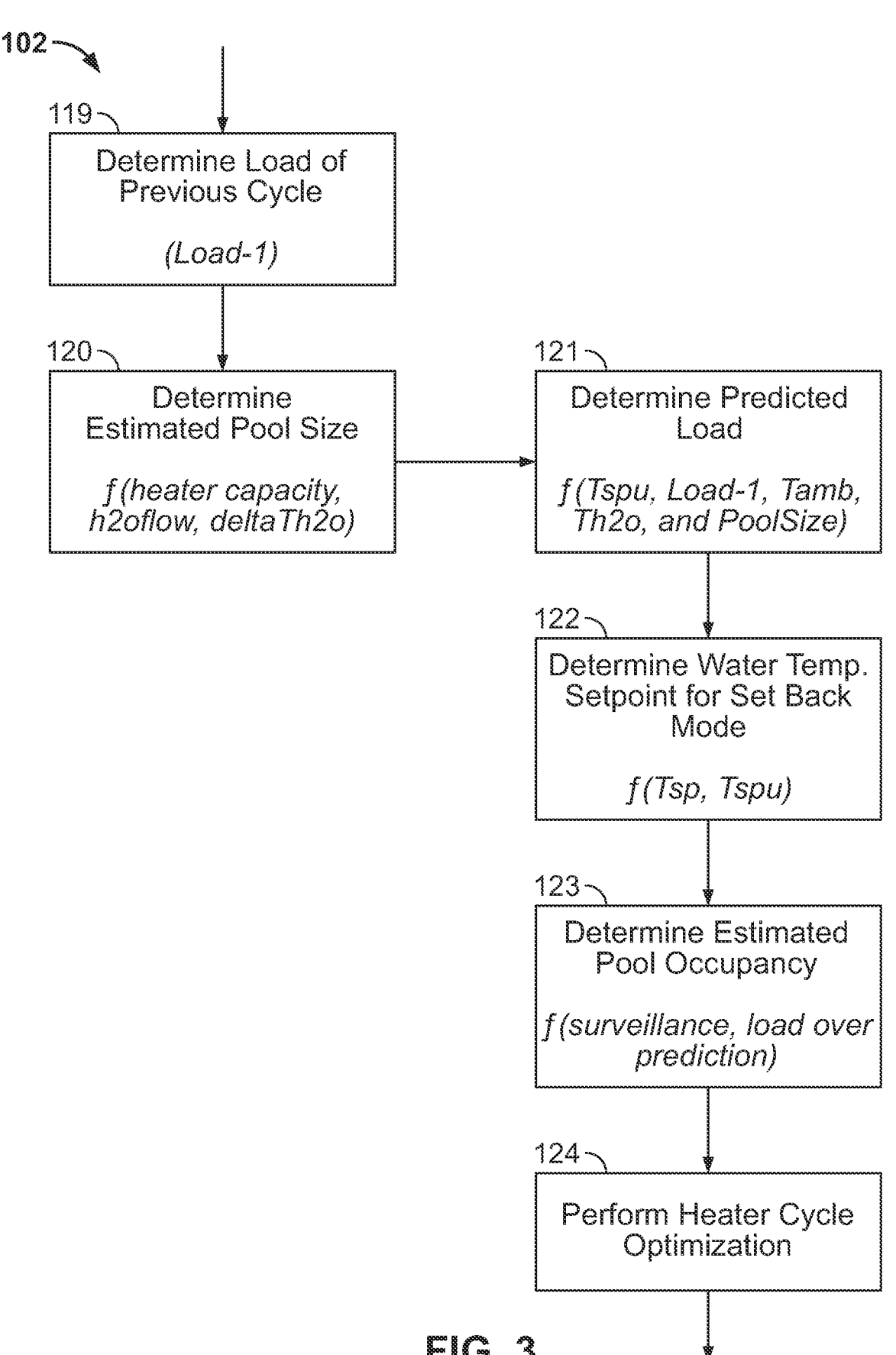
FIG. 3 is a flowchart illustrating processing step 102 of FIG. 2 in greater detail.

FIG. 3 is a flowchart illustrating processing step 102 of FIG. 2 in greater detail. As discussed above in connection with FIG. 2, step 102 can be expressed as a function of pertinent variables, such as, Loadp, Load-1, Occ, Th2o, and Tamb-f(Loadp, Load-1, Occ, Th2o, Tamb), where Loadp is the predicted load of the pool or spa heater 14 determined by the system 10, Load-1 is the actual load of the pool or spa heater 14 for a previous cycle, Occ is an estimation of pool occupancy, Th2o is the measured temperature of the pool or spa water, and Tamb is the current ambient temperature at the pool or spa installation. Processing steps 119-124 of FIG. 3 further illustrate the determination of the previous cycle load (Load-1), estimated pool size (PoolSize), predicted load (Loadp), water temperature setpoints (Tsp, Tspu), pool occupancy (Occ), and heater cycle optimization by the system 10 of the present disclosure.

In step 119, the system 10 determines (e.g., calculates or retrieves from memory) the load of the previous heater cycle (Load-1). According to some aspects of the present disclosure, information related to the previous load can by utilized by the system 10 to provide one or more pool or spa size estimations. For example, the previous load information could include a direct pool size value provided by a user. Additional pool size estimates can be generated with each cycle (e.g., with the longest cycle(s) being weighted the most heavily), calculated based on the water flow rate (e.g., calculated based on input temperature and temperature rise) and the time taken to see an increase in return temperature. According to one example, where the flow rate is 50 gpm and it takes 500 minutes to change the water over, the estimated pool size might be 25000 gallons. If the previous cycle is not one of the top five longest cycles, pool size estimation weighting associated with the previous cycle is ignored, but can still be utilized by the system 10 for water leak detection. It should be understood that the information related to the previous load can be utilized by the system 10 to provide one or more pool or spa size estimations, though, such information in some instances may not provide a comprehensive estimation of pool or spa size. Accordingly, according to some aspects of the present disclosure, process step 119 and process step 120, which also provides an estimated pool or spa size, discussed hereinbelow, can be performed in parallel.

In step 120, the system 10 can determine the estimated pool size (PoolSize), for example, based on a function of pertinent variables, such as heater capacity, h2oflow, and deltaTh2-f(heater capacity, h2oflow, deltaTh2o), where heater capacity is the maximum thermal output (e.g., BTUs) or modulated thermal output of the heater 14 for a given mode of operation or cycle, h2oflow is the volumetric flow rate (e.g., gallons per minute) at which water flows through the heater 14, and deltaTh2o is the change in water temperature (Th2o) over the course of a cycle or given duration of time. That is, the system 10 can estimate the pool size based on how quickly the heater 14 heats the pool/spa water over the course of a cycle or given duration of time. The system 10 can calculate the estimated pool size (PoolSize) every cycle, or continuously, in order to keep track of and/or monitor cycle timing (e.g., the amount of time required to evenly distribute heated water throughout the pool or spa).

In step 121, the system 10 determines the predicted load (Loadp). The system 10 can determine the predicted load (Loadp), for example, based on a function of pertinent variables, such as Tspu, Load-1, Tamb, Th2o, and PoolSize-f(Tspu, Load-1, Tamb, Th2o, and PoolSize), where Tspu is a water temperature setpoint specified by a user (e.g., when the pool or spa is not being used), Load-1 is the actual load of the pool or spa heater 14 for the previous cycle, Tamb is the ambient temperature at the pool or spa installation (e.g., received via one or more temperature sensors installed at the pool or spa installation, retrieved via the Internet through a network connection, etc.), Th2o is the current water temperature (e.g., received via temperature sensors installed within the heater 14, other pool or spa devices, or the pool or spa itself), and PoolSize is the estimated size of the pool or spa (e.g., as described in connection with step 120 above). The system 10 can also account for other environmental factors in determining the predicted load (Loadp). For example, the system 10 could receive information related to the brightness, sun intensity, or cloud cover at the pool or spa (e.g., from an imaging or security system in communication with the system 10) and could receive additional environmental data (e.g., current temperature, cloud cover, forecasted weather conditions, etc.) from a weather reporting service (e.g., via the Internet), and modify the predicted load (Loadp) based on one or more of these variables, e.g., if there is cloud cover then the predicted load (Loadp) could be increased.

In step 122, the system 10 determines a water temperature setpoint for setback mode (e.g., periods of time when the pool or spa is not being used), which is a function of the water temperature setpoint specified by the user Tspu for when the pool or spa is not being used. The system 10 can also adjust the water temperature overshoot criteria (OS) when setback mode is active, or establish an overshoot setpoint for setback mode ($OS_{setback}$), based on an overshoot setpoint for another (e.g., normal, green, etc.) mode of operation ($OS_{mode}$). For example, the overshoot setpoint for setback mode can be twice that of a normal mode of operation, which can be represented as $OS_{setback}=2*(OS_{mode})$. Accordingly, the temperature of the pool or spa water (Th2o) is allowed a greater deviation from the temperature setpoint (Tspu) when the system 10 is in setback mode. It should be understood that this is but one example and the overshoot setpoint for setback mode ($OS_{setback}$) can be established and/or adjusted based on other criteria discussed herein.

In step 123, the system 10 determines the estimated pool occupancy (Occ). The system 10 can determine the estimated pool occupancy, for example, based on a function of pertinent variables, such as surveillance, and load over prediction-f(surveillance, load over prediction), where surveillance represents information received from a surveillance system, vision system, motion detectors, or other pool occupant detection systems in communication with the system 10, and where load over prediction represents the difference between the predicted load (Loadp) on the modulating heater 14 and the actual load on the modulating heater 14. For example, the system 10 can apply machine learning algorithms, or other image processing algorithms, to information received from a surveillance system or other vision system to identify individuals in or around the pool or spa to determine if the pool or spa is occupied and/or determine the number of individuals in or around the pool or spa.

Additionally, if the system 10 determines that the actual load on the heater 14 (Load) is less than the predicted load (Loadp), the system can infer that another heat source (e.g., body heat of occupants) is present, and thereby predict that there are one or more occupants in the pool or spa contributing to the heating of the pool or spa and reducing the actual load (Load) on the heater 14. Similarly, the system 10 can identify load over cycle variation, where the cycle time (e.g., the amount of time required to evenly distribute heated water throughout the pool or spa) is less than a predicted cycle time and thereby predict that there are one or more occupants in the pool or spa contributing to the heating of the pool or spa. The system 10 can also predict the number of occupants in the pool or spa by determining the total thermal output required to achieve the deviation between the actual load (Load) and the predicted load (Loadp), or between the actual cycle time and the predicted cycle time, and by dividing same by a standard thermal output an average adult, child, or the like.

According to some embodiments of the present disclosure, the system 10 can utilize the estimation of pool occupancy (Occ) to adjust (e.g., lower) the predicted load and (e.g., float) the overshoot criteria to optimize the modulation rate of the heater 14. According to one example, the system 10 can determine an adjusted overshoot setting (OS') for a given mode of operation based on pertinent variables, such as, OS, K, and $OCC_n$, given the equation $OS'=OS×K/(OCC_n)$, where OS is the initial overshoot setting for the given mode of operation (e.g., pre-programmed or specified by a user), K is a constant, and $OCC_n$ is a number (e.g., 1, 2, 3, . . . n) of occupants the system 10 has detected or estimated. That is, the adjusted overshoot setting (OS') can be inversely proportional to the number of occupants. According to another example, the system 10 can also determine an adjusted temperature setpoint (Tsp') for a given mode of operation based on pertinent variables, such as, Tsp, K, and $OCC_n$, given the equation $Tsp'=Tsp×K/(OCC_n)$, where Tsp is an initial temperature setpoint for the given mode of operation (e.g., specified by the use 5), K is a constant, and $OCC_n$ is a number (e.g., 1, 2, 3, . . . n) of occupants the system 10 has detected or estimated. That is, the adjusted temperature setpoint (Tsp') can be inversely proportional to the number of occupants.

In step 124, the system 10 can perform heater cycle optimization (e.g., the amount of time or cycles required to evenly distribute heated water throughout the pool or spa) for a given mode of operation. The system 10 can optimize the cycle, for example, based on a function of the predicted load (Loadp), in order to minimize the amount of mixing (e.g., turnovers) required for the given mode of operation. According to one example, the system 10 can establish a maximum amount of cycles (e.g., per day, hour, etc.) for the heater 14, which can be pre-programmed and/or established by the manufacturer thereof, and can determine a minimum amount of cycles in order to evenly distribute heated water throughout the pool or spa and maintain an even and comfortable temperature for the pool or spa occupants. If the pool or spa is not being used (e.g., operating in setback mode), or occupants are not detected, the system 10 can reduce the amount of heater cycles, while simultaneously increasing the overshoot setting (OS), such that the water temperature (Th2o) can deviate from the water temperature setpoint (Tsp) to a greater extent than would be permitted if the pool or spa was in use. Conversely, if the pool or spa is in use (e.g., operating in green mode), or occupants are detected, the system 10 can increase the amount of heater cycles, while simultaneously decreasing the overshoot setting (OS), such that the water temperature (Th2o) does not deviate from the water temperature setpoint (Tsp) to as large of an extent, thereby providing a more even water temperature and enhancing the user experience. After performing the heater cycle optimization in step 124, the process advances to step 104, as described in connection with FIG. 2.

FIG. 4 is a flowchart illustrating processing step 114 of FIG. 2 in greater detail. As discussed above in connection with FIG. 2, in step 114 the system 10 determines the actual modulation rate for the heater 14, which can be an optimized modulation rate or a minimum modulation rate, for example, based on the function of pertinent variables, such as, E, Load, Mode, Tflue, Th2o, and Tamb-f(E, Load, Mode, Tflue, Th2o, Tamb), where E is the current error of the heater 14, Load is the current load of the heater 14, Mode refers to one or more (e.g., user defined) parameters related to the current mode of operation (e.g., max modulation rate of 85% in "silent mode"), Tflue is the temperature of the exhaust flue of the heater 14, Th2o is the water temperature, and Tamb is the ambient temperature at the pool or spa installation. Processing steps 128-134 of FIG. 4 further illustrate the parameters of this function.

In step 128, the system 10 determines the current load (Load) on the heater 14 based on the equation: Load=f (Th2o, Tamb, PoolSize, target time), where Tamb is the temperature of the ambient air at the pool or spa installation, PoolSize represents the volume of the pool or spa (e.g., gallons) and can be calculated from the last 10 cycles, knowing the volumetric flow rate through the heater 14 (h2oflow) and energy balance, and target time is the desired cycle time to heat the pool or spa. For example, in the case of a gas modulating heater, the target time (target time) can be set at 2 hours. In step 130, the system 10 determines if the water flow rate through the heater 14 (h2oflow) is sufficient in order to protect the heat exchanger of the modulating heater 14 from damage due to excessive temperatures, and can be represented by a function of pertinent variables, such as Tflue, and h2oflow-f(Tflue, h2oflow), where Tflue is the temperature measured in the flue or stack and h2oflow is the volumetric flow rate of water through the heater 14, which can be measured (e.g., using one or more flow sensors) or calculated based on the measured temperature rise (deltaTh2o) and known input rate of heat generated by the heater 14. In step 132, the system 10 retrieves (e.g., from memory) baseline modulation parameters for the current mode of operation (Mode), which can be represented by the equation, Mode=f(setback, silent, green), where setback mode can be represented by the function, f(Tsp change 10 deg, target time 4×), silent mode can be represented by the function, f(75% max modulation, target time 3×), and green mode can be represented by the function, f(target time 2×, Tflue 80% max).

According to aspects of the present disclosure, the current mode of operation, which can be represented by the function, Mode=f(setback, recovery, silent, green), can directly impact or control the limits of max modulation, OS, and Target Cycle Time. Furthermore, in setback mode, where Tsp=Tsp−20, target cycle time and OS can be four times the standard values because there are no occupants in the pool or spa and, therefore, having a strict cycle time and OS is not as much of a concern. In recovery mode, the max modulation of the heater can be greater than the max modulation in boost mode, such as, for example, 110% of the max modulation of boost mode, but can also be limited by, for example, a minimum gas pressure and/or a maximum flue temperature. In silent mode, the max modulation can be limited to, for example, 75% max modulation, and the target cycle time can be a multiple of a standard predetermined cycle time (e.g., three times the standard target cycle time), resulting in a longer cycle time. In green mode, the max modulation can be limited as a function of a minimum flue temperature, the current temperature of the pool or spa water, and a target cycle time, which can be, for example, a multiple of a standard predetermined cycle time (e.g., two times the standard target cycle time), resulting in a longer cycle time. Additionally, it is noted that the modulation rate can be adjusted to compensate for fuel supply type, fuel supply pressure, altitude, pool or spa occupancy Occ, stability, etc.

In step 134, the system 10 determines an optimized heater modulation rate based on the current error (E), the current load (Load), the water flow rate (h2oflow), the flue temperature (Tflue), and the baseline modulation parameters discussed in connection with steps 126-132. The process then advances to step 118, as described in connection with FIG. 2.

Figure 5:
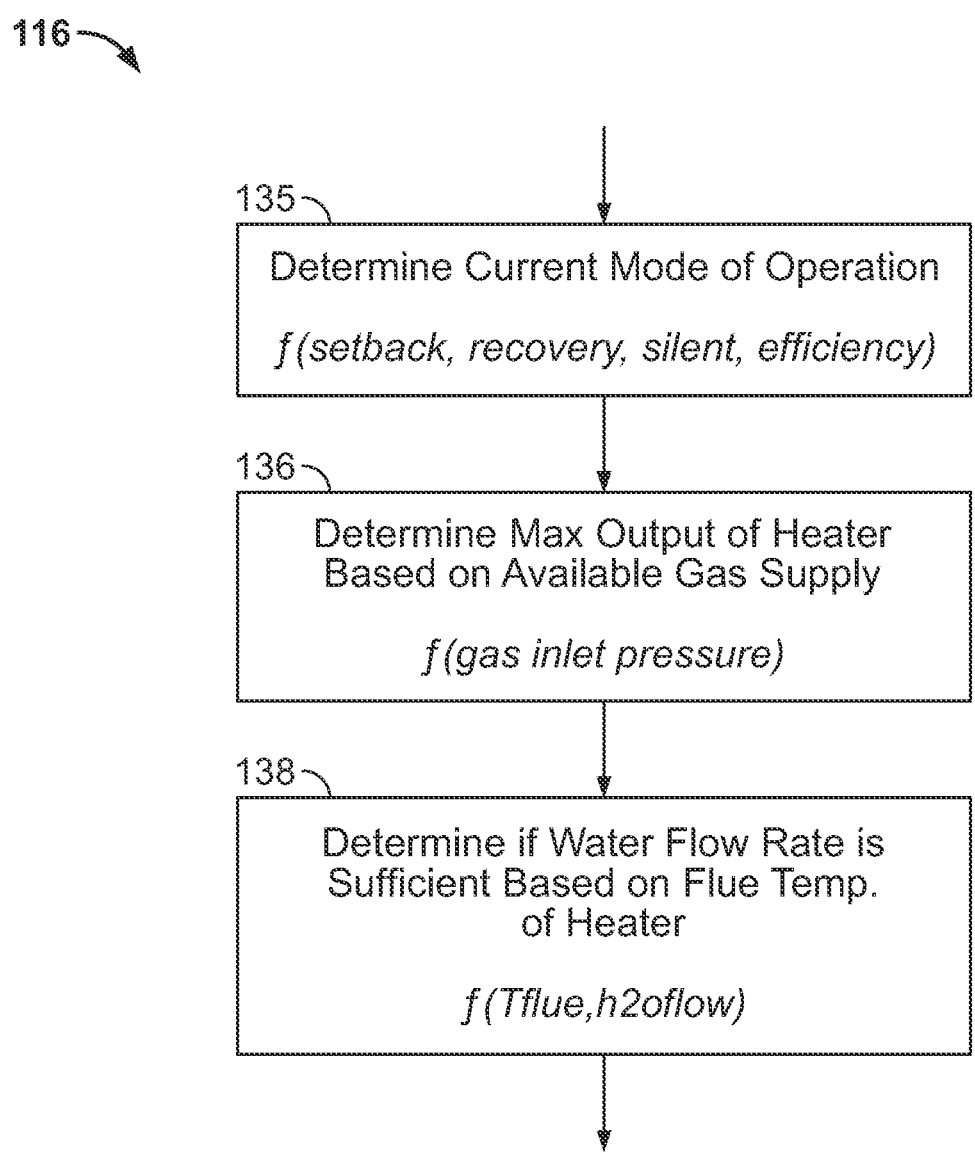
FIG. 5 is a flowchart illustrating processing step 116 of FIG. 2 in greater detail.

FIG. 5 is a flowchart illustrating processing step 116 of FIG. 2 in greater detail. As discussed above in connection with FIG. 2, in step 116 the system 10 determines the maximum modulation rate for the heater 14, e.g., the maximum capacity, based on the function of pertinent variables, such as, Installation Limitation, and Mode-f(Installation Limitation, Mode), where Installation Limitation refers to one or more of hardware and user-defined limitations related to the modulating heater system 10, such as, but not limited to, maximum output (e.g., BTUs) of a particular modulating heater unit (e.g., heater 14), available fuel supply (e.g., flow rate of natural gas or liquefied petroleum (LP) gas), elevation of the pool or spa installation, etc., and Mode refers to one or more (e.g., user defined) parameters or limitations related to the current mode of operation (e.g., max modulation rate of 85% in "silent mode"). Processing steps 135-138 of FIG. 5 further illustrate the parameters of this function. In step 135, the system 10 determines the current mode of operation. As discussed herein, the current mode of operation, which can be represented by the function, Mode=f(setback, recovery, silent, green), can impact or control the limits of max modulation, OS, and Target Cycle Time for each mode of operation. In some aspects, the current mode of operation can be input by a user, e.g., using a pool/spa controller or remote device. In step 136, the system 10 determines the maximum output of the heater 14 based on the available gas supply according to the function f(gas inlet pressure), where gas inlet pressure is the natural or LP supply gas pressure (e.g., PSI) and can be determined by single point or transducer measurement devices. It should be understood that single point measurements can provide a minimum gas pressure reading for satisfactory heater unit operation and transducer measurements can provide additional rate of change information that the system 10 can utilize to predict changes in gas supply conditions. In step 138, similar to step 130 discussed in connection with FIG. 4, the system 10 determines if the water flow rate (h2oflow) through the heater 14 is sufficient in order to protect the heat exchanger of the modulating heater from damage due to excessive temperatures, and can be represented by a function of pertinent variables, such as Tflue and h20flow-f(Tflue, h2oflow), where Tflue is the temperature measured in the flue or stack and h2oflow is the volumetric flow rate of water through the heater 14, which can measured (e.g., using one or more flow sensors) or calculated based on the measured temperature rise and known input rate of heat generated by the heater 14. For example, Tflue can have a maximum temperature setpoint of 300 degrees Fahrenheit and the system 10 could increase the modulation of the heater 14, thereby decreasing the maximum output of the heater 14, if the Tflue exceeds this setpoint value. The process then advances to step 118, as described in connection with FIG. 2.

It should be understood the system functions to optimize the modulation rate of the heater (e.g., step 114, discussed in connection with FIG. 2, and steps 128-134, discussed in connection with FIG. 4) between a minimum modulation rate and a maximum modulation rate (e.g., step 116, discussed in connection with FIG. 2, and steps 135-138, discussed in connection with FIG. 5), while attempting to reach the target water temperature setpoint, and while targeting a response time setpoint, which is determined by the prior loads and/or cycles.

Figure 6:
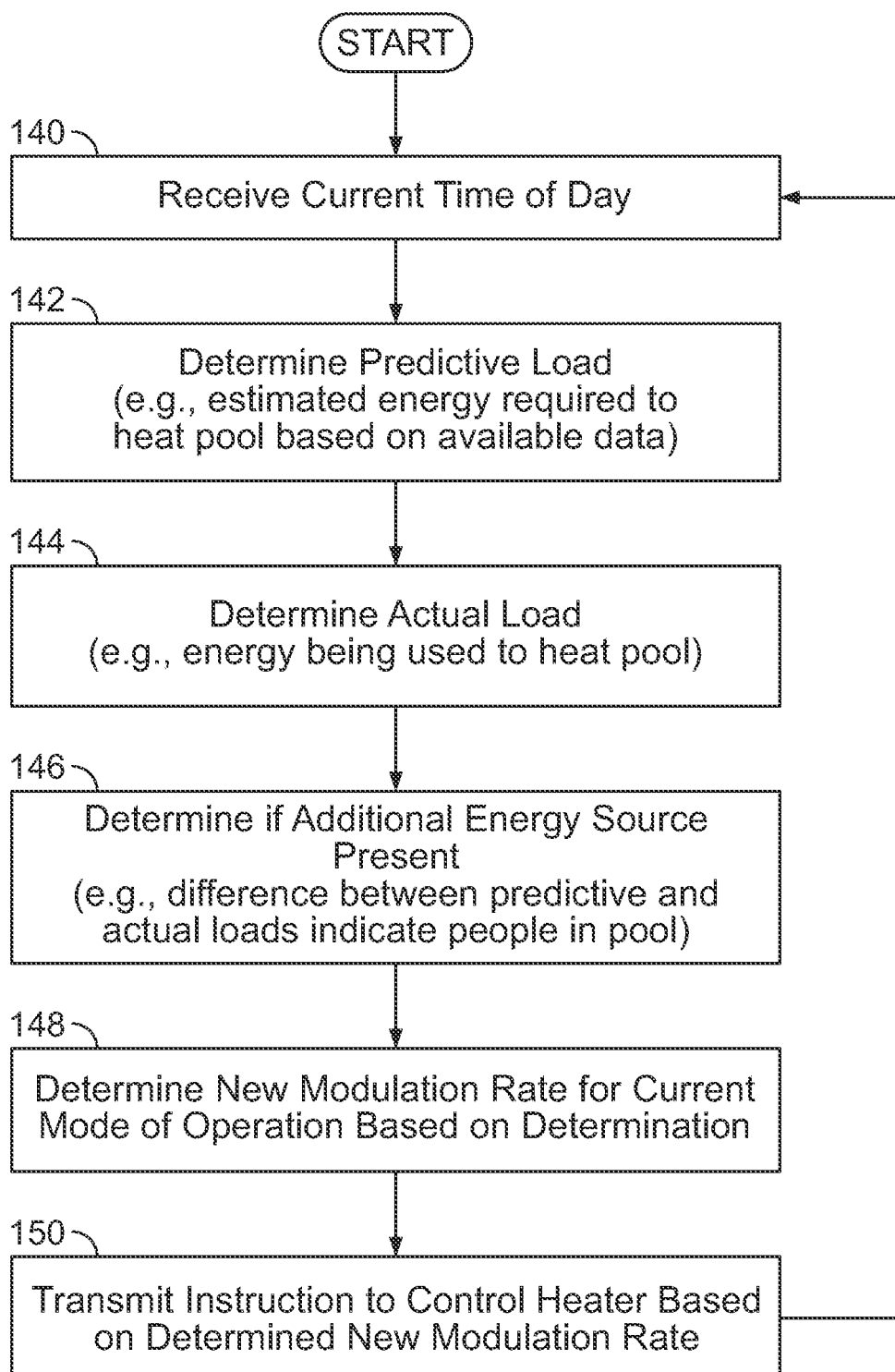
FIG. 6 is another flowchart illustrating process steps carried out according to embodiments of the present disclosure for modulating operation of a pool or spa heater based on a pool occupancy prediction.

FIG. 6 is another flowchart illustrating process steps carried out by the system 10 of the present disclosure in connection with an occupancy mode of operation for optimizing the modulation of the heater 14 based on a pool occupancy prediction. Specifically, the system 10 can utilize the time of day and the predictive load for the heater 14 to determine if there are one or more additional energy sources (e.g., occupants) in the pool or spa. The system 10 can then use this prediction to optimize the modulation rate for silent mode, green mode, etc., or the recovery rate and overshoot calculations described herein.

In step 140, the system 10 receives the current time of day (e.g., via an internal clock or from a remote source, such as the Internet, via a data or network connection). In step 142, the system 10 determines the predictive load (e.g., the estimated energy required to heat the pool or spa based on available data) for the modulating heater. In step 144, the system 10 determines the actual load (e.g., energy currently being used to heat the pool or spa) of the modulating heater by, for example, measuring the volumetric flow rate of the fuel supply and/or measuring the runtime of the heater 14. In step 146, the system 10 determines if one or more additional energy sources (e.g., pool or spa occupants) are present in the pool or spa, for example, by calculating the difference between the predictive and the actual loads, as described in connection with FIG. 3. In step 148, the system 10 determines a new and optimized heater modulation rate for the current mode of operation based on the occupancy determination of step 146. In step 150, the system 10 transmits an instruction to control the heater 14 based on the new modulation rate determined in step 148. The process then returns to step 140.

Figure 7:
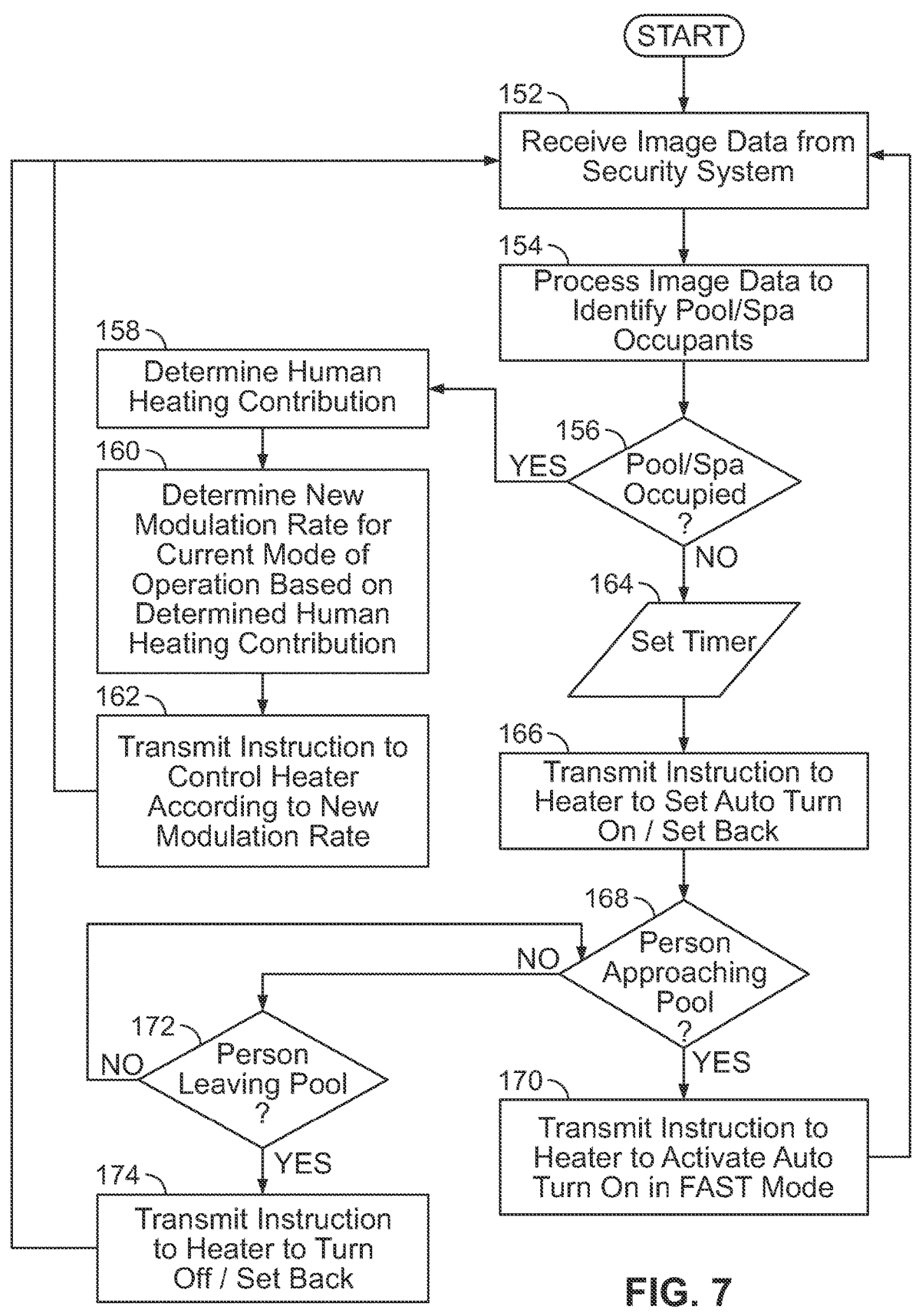
FIG. 7 is another flowchart illustrating process steps carried out according to embodiments of the present disclosure for modulating operation of a pool or spa heater based on a pool occupancy prediction.

FIG. 7 is another flowchart illustrating process steps carried out by the system 10 of the present disclosure in connection with the occupancy mode of operation for optimizing the modulation rate of the heater 14 based on a pool occupancy determination. Specifically, the system 10 can determine the occupancy of a pool or spa based on information received from a security system, or other detection systems, and adjust the modulation rate and/or mode of the heater 14 based on the human heating contribution of the occupants. For example, if no pool or spa occupants are present, the system 10 can initiate an automatic turn on function or temperature set back function after a given period of time has elapsed. Additionally, the system 10 can control the modulating heater to turn on in a "fast" mode when a person enters the pool or spa area and/or control the heater 14 to turn off or initiate the temperature set back function when the person leaves the pool or spa area.

In step 152, the system 10 receives image data from a security, or similar, system associated with the pool or spa installation. In step 154, the system 10 processes the image data from the security system to identify pool or spa occupants (e.g., using machine learning algorithms described herein). In step 156, the system 10 determines if the pool or spa is occupied. If a positive determination is made in step 156, the process advances to step 158, where the system 10 determines the human heating contribution of the pool or spa occupant(s). In step 160, the system 10 determines a new modulation rate for the current mode of operation based on the human heating contribution determined by the system 10 in step 158. In step 162, the system 10 transmits an instruction to control the heater 14 according to the new modulation rate and then the process returns to step 152. If a negative determination is made in step 156, the process advances to step 164, where a timer is set, so that a period of time passes before the process advances to the next step. After the timer has completed, the process advances to step 166, where the system 10 transmits an instruction to the modulating heater to enable the automatic turn on, or temperature set back, function. Accordingly, the system 10 delays enabling the automatic turn on and/or or temperature set back functions until a predetermined period of time has passed (e.g., 2 hours) after the system 10 has determined that the pool or spa is not occupied, thereby preventing the system 10 from prematurely engaging same function while the pool or spa is still in use for the day. In step 168, the system 10 determines if a person is approaching, or has entered, the pool or spa area. If a positive determination is made in step 168, then the process advances to step 170 where the system 10 transmits an instruction to the heater 14 to activate the automatic turn on function in "fast" mode and then the process returns to step 152. If a negative determination is made in step 168, then the process advances to step 172 where the system 10 determines if a person is leaving the pool or spa area. If a positive determination is made in step 172, then the process advances to step 174 where the system 10 transmits an instruction to the heater 14 to turn off or initiates the set back function or mode. The process then returns to step 152. If a negative determination is made in step 172, then the process returns to step 168.

Figure 8A:
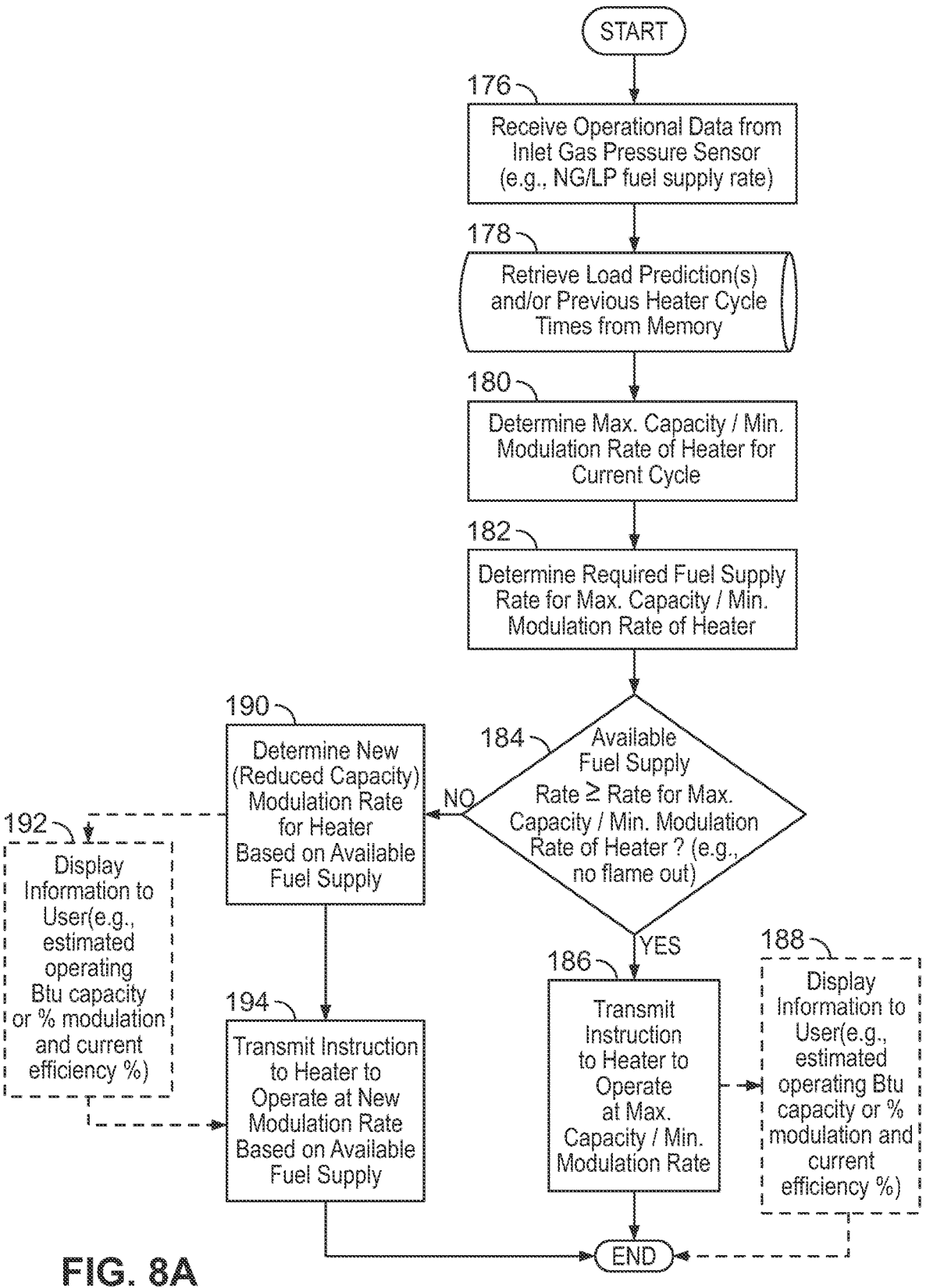
FIG. 8A is another flowchart illustrating process steps carried out according to embodiments of the present disclosure for modulating operation of a pool or spa heater based on availability of a fuel supply.

FIG. 8A is another flowchart illustrating process steps carried out by the system 10 of the present disclosure in connection with an heater unit capacity optimization mode of operation for optimizing the modulation of the heater 14 based on information received from an inlet gas pressure sensor, previous cycle times, and load predictions, which are used to predict a capacity or modulation rate that the heater 14 should be capable of operating at for the present cycle. For example, some gas supplies may not be capable of providing the heater 14 with a sufficient amount of fuel to operate at 100% heater capacity at all operational times, which can cause a flame-out condition (e.g., where the heater 14 attempts to draw fuel faster than it is being supplied, thereby temporarily exhausting its fuel source). A flame out condition can be prevented by modulating the heater 14 to operate at the highest heat capacity output the gas supply will sustain. According to some embodiments, the system 10 can display (e.g., via a smart device, web portal, etc.) an estimated operating Btu capacity, or % modulation, and the current efficiency % of the system.

In step 176, the system 10 receives operational data (e.g., natural gas or LP gas fuel supply rate information) from an inlet gas pressure sensor. In step 178, the system 10 retrieves load prediction(s) and/or previous heater cycle times from the memory. In step 180, the system 10 determines the maximum capacity, or minimum modulation rate, ("desired modulation rate") for the current heating cycle (e.g., 85% output, or 15% modulation in "green" mode) and mode of operation. In step 182, the system 10 determines the required fuel supply rate for the desired modulation rate of the heater 14. In step 184, the system 10 determines if the available fuel supply rate is greater than or equal to the required fuel supply rate for the maximum capacity/minimum modulation of the heater 14, such that a flame out condition is prevented. If a positive determination is made in step 184, then the process advances to step 186, where the system 10 transmits an instruction to the heater 14 to operate at the maximum capacity/minimum modulation for the current cycle and then the process ends. If a negative determination is made in step 184, then the process advances to step 190 where the system 10 determines a new, reduced capacity, modulation rate for the heater 14 based on the available fuel supply. In step 194, the system 10 transmits an instruction to the heater 14 to operate at the new modulation rate based on the available fuel supply and then the process ends. Optionally, in steps 188 and 192, the system 10 can display information to the user (e.g., via smart device, web portal, etc.) related to the current operation of the heater 14 (e.g., estimated operating Btu capacity, modulation rate, and current efficiency) and then the process ends.

Figure 8B:
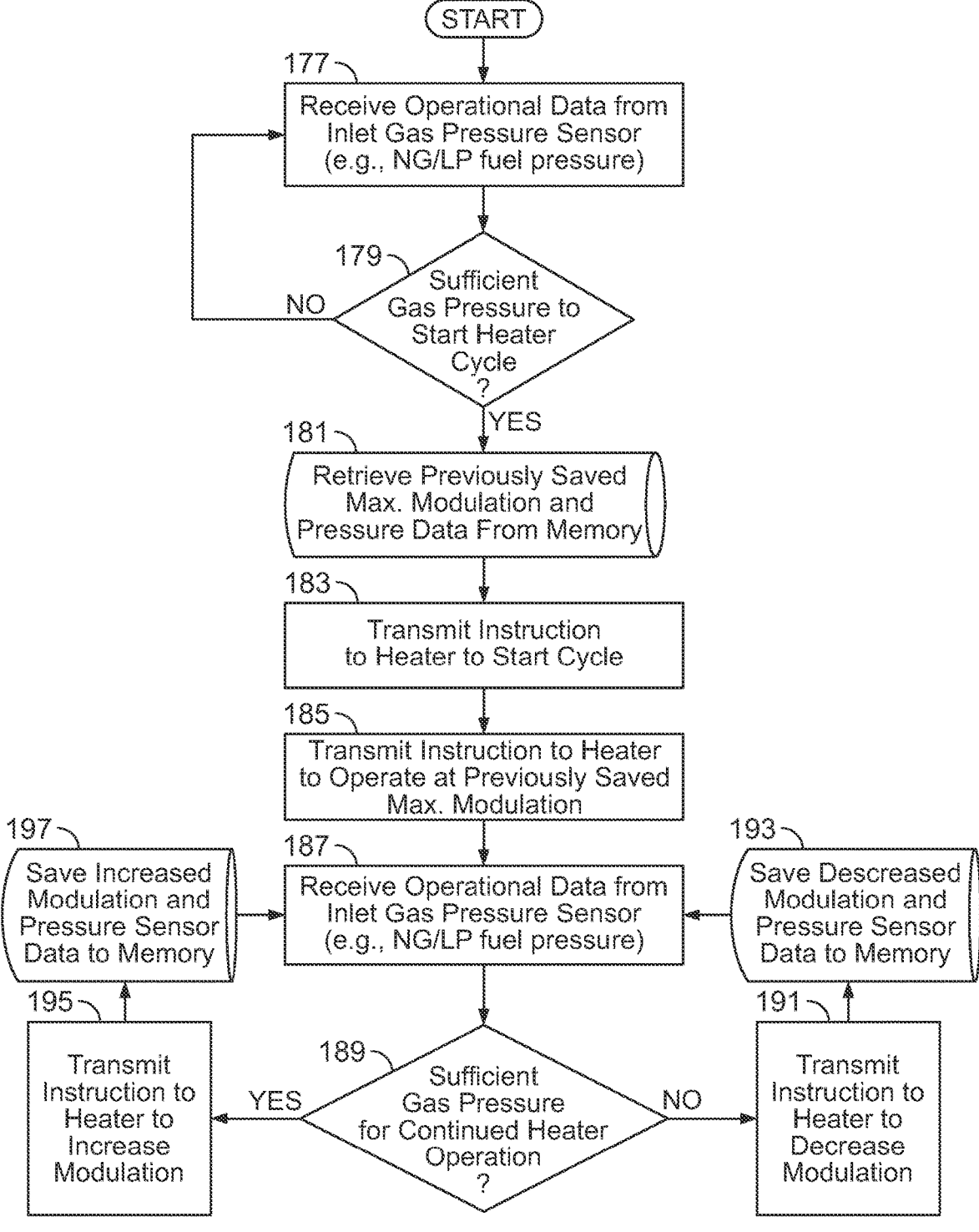
FIG. 8B is another flowchart illustrating process steps carried out according to embodiments of the present disclosure for modulating operation of a pool or spa heater based on availability of a fuel supply.

FIG. 8B is another flowchart illustrating process steps carried out by the system 10 of the present disclosure in connection with an heater unit capacity optimization mode of operation for optimizing the modulation of the heater 14 based on operational data received from an inlet gas pressure sensor (e.g., a binary inlet gas pressure sensor), previous maximum modulations rate for the pool or spa heater, and previous operational data received from the inlet gas pressure sensor, which are used to predict a capacity or modulation rate that the heater 14 should be capable of operating at for the present cycle.

In step 177, the system receives operational data (NG/LP fuel pressure) from an inlet gas pressure sensor. In step 179, the system 10 determines if there is sufficient gas pressure to start the pool or spa heater cycle. If a negative determination is made in step 179, the process returns to step 177. If a positive determination is made in step 179, the process proceeds to step 181 where the system retrieves a previously saved maximum modulation for the pool or spa heater 14 and pressure data from a memory. In step 183, the system 10 transmits an instruction to the heater 14 to start the cycle and in step 185 the system 10 transmits an instruction to the heater 14 to operate at the previously saved maximum modulation. In step 187, the system 10 receives operational data from the inlet gas pressure sensor. Accordingly, the system 10 can monitor the gas pressure from the time of ignition to the current (e.g., previously stored) modulation rate. The process then proceeds to step 189 where the system 10 determines if there is sufficient gas pressure for continued heater operation or a greater heater modulation rate. For example, the system 10 can determine if the operational data from the pressure sensor supports an increase in the maximum modulation rate. If a negative determination is made in step 189, e.g., indicating that the gas pressure cannot support the current heater modulation rate, the process proceeds to step 191 where the system 10 transmits an instruction to the heater 14 to decrease the modulation rate thereof (e.g., by 5%). The process then proceeds to step 193, where the system 10 saves the decreased modulation rate and associated pressure sensor operational data to the memory before returning to step 187. If a positive determination is made in step 189, e.g., indicating that the gas pressure can support the current heater modulation rate and/or possibly a greater modulation rate, the process proceeds to step 195 where the system 10 transmits an instruction to the heater 14 to increase the modulation rate (e.g., by 2%) thereof. The process then proceeds to step 197 where the system 10 saves the increased modulation rate and associated pressure sensor operational data to the memory before returning to step 187. Accordingly, the system 10 can continuously modulate the pool or spa heater 14 to achieve a stable and optimized operation.

Figure 9:
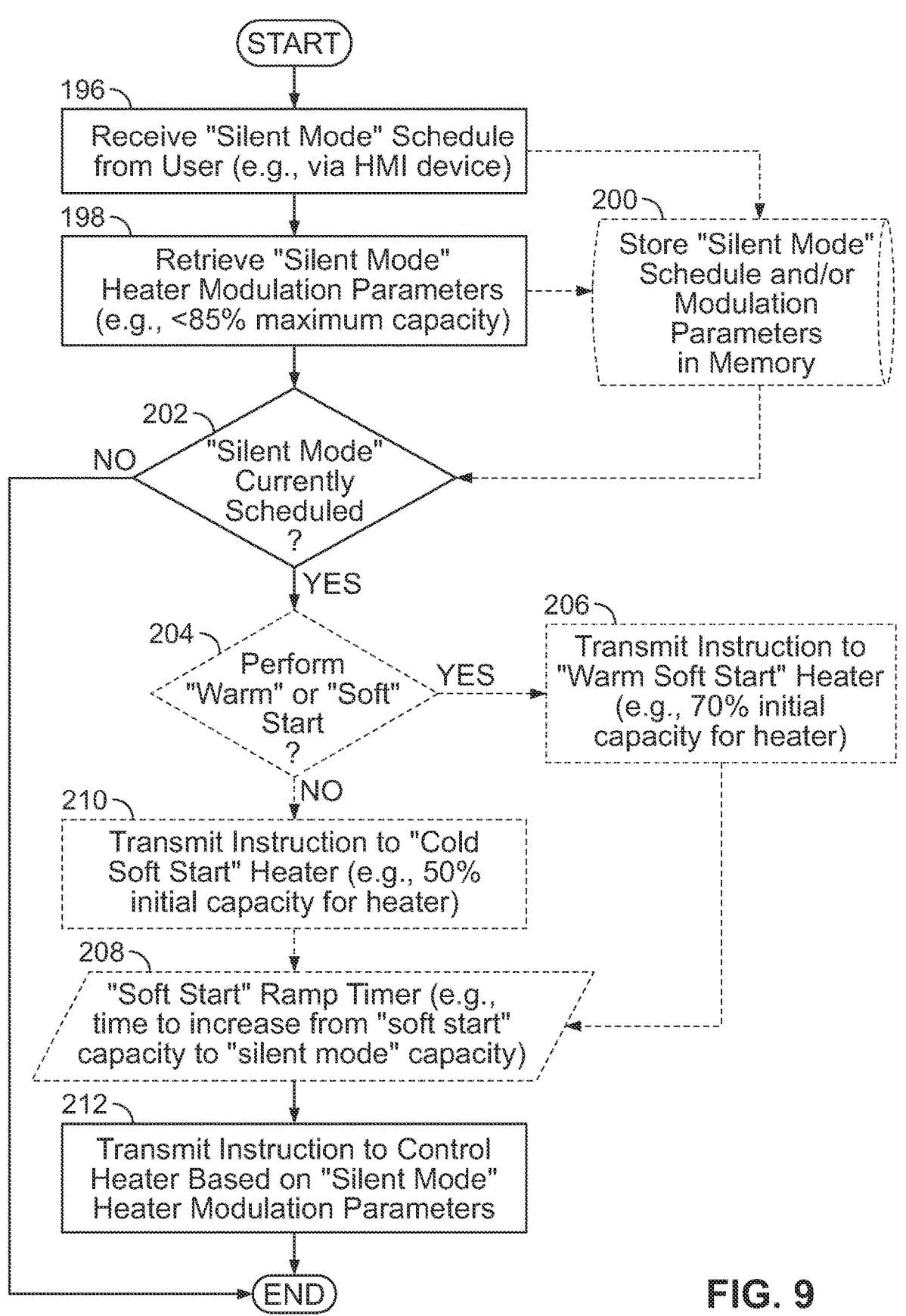
FIG. 9 is another flowchart illustrating process steps carried out according to embodiments of the present disclosure for modulating operation of a pool or spa heater based on parameters associated with a silent mode of operation.

FIG. 9 is another flowchart illustrating process steps carried out by the system 10 of the present disclosure for optimizing the modulation of the heater 14 based on user defined parameters for a "silent" mode. For example, the process allows the user to specify both a schedule and a modulation rate for silent mode (e.g., on weeknights after 7:00 pm operate at <85% max modulation rate). According to some embodiments of the present disclosure, a "soft start" feature can be also be included in silent mode where the default heater starting capacity can be lower than the maximum modulation rate, thereby enabling a slower heater blower speed that is quieter. The soft start function could also be provided with both "cold start" and "warm start" conditions with the modulation rate for the warm start being lower than the modulation rate for the cold start condition.

In step 196, the system 10 receives a silent mode schedule from a user (e.g., via an HMI device provided on the heater 14, a smart device, web interface, etc.). In step 198, the system 10 retrieves silent mode modulation parameters (e.g., <85% maximum capacity or >15% modulation). The silent mode modulation parameters can be design limits that are pre-programmed into the memory of the heater 14 by a manufacturer of the heater 14, or can be specified, or altered, by a technician or the user. Optionally, in step 200, the system 10 can store the silent mode schedule and/or modulation parameters in the memory (e.g., storage database 14). In step 202, the system 10 determines if silent mode is currently scheduled. If a positive determination is made in step 202, then the process advances to step 212 where the system 10 transmits an instruction to control the heater 14 based on the silent mode heater modulation parameters. If a negative determination is made in step 202 then the process ends. Optionally, if a positive determination is made in step 202, then the process can advance to step 204 where the system 10 determines if a "warm soft start" or a "cold soft start" should be performed by the heater 14 based on one or more variables, such as, the current water temperature (Th2o), the target water temperature setting (Tsp), the ambient air temperature (Tamb) at the pool or spa installation, and/or the current mode of operation. According to one example, if the system 10 determines that the deviation between the current water temperature (Th2o) and the target water temperature setting (Tsp) is greater than a predetermined threshold (e.g., while the system is in recovery mode), then the system 10 can perform a "warm soft start" on the heater 14 to increase the water temperature rapidly, whereas if the system 10 determines that the deviation between the current water temperature (Th2o) and the target water temperature setting (Tsp) is less than a predetermined threshold, then the system 10 can perform a "cold soft start" on the heater 14 to increase the temperature of the water at a slower pace. Similarly, if the system 10 determines that that the deviation between the current water temperature (Th2o) and the water temperature of the previous heater cycle (e.g., retrieved from memory) is greater than a predetermined threshold (e.g., the pool or spa is rapidly losing heat due to low ambient air temperatures), then the system 10 can perform a "warm soft start" on the heater 14, whereas if the system 10 determines that that the deviation between the current water temperature (Th2o) and the water temperature of the previous heater cycle is less than a predetermined threshold (e.g., the pool or spa is retaining heat due to high ambient air temperatures) then the system 10 can perform a "cold soft start" on the heater 14. If a positive determination is made in step 204, then the process advances to step 206 where the system 10 transmits an instruction to "warm soft start" the heater 14. If a negative determination is made in step 204, then the process advances to step 210 where the system 10 transmits an instruction to "cold soft start" the heater 14. In step 208, a soft start ramp timer is initiated. Accordingly, the warm soft start and cold soft start functions can specify that the heater 14 initially operates at a reduced capacity (e.g., 70% capacity for a warm soft start and 50% capacity for a cold soft start) and then the soft start ramp timer discussed in connection with step 208 gradually increases the capacity of the heater 14 until it reaches the maximum capacity specified for silent mode (e.g., 85%).

Figure 10:
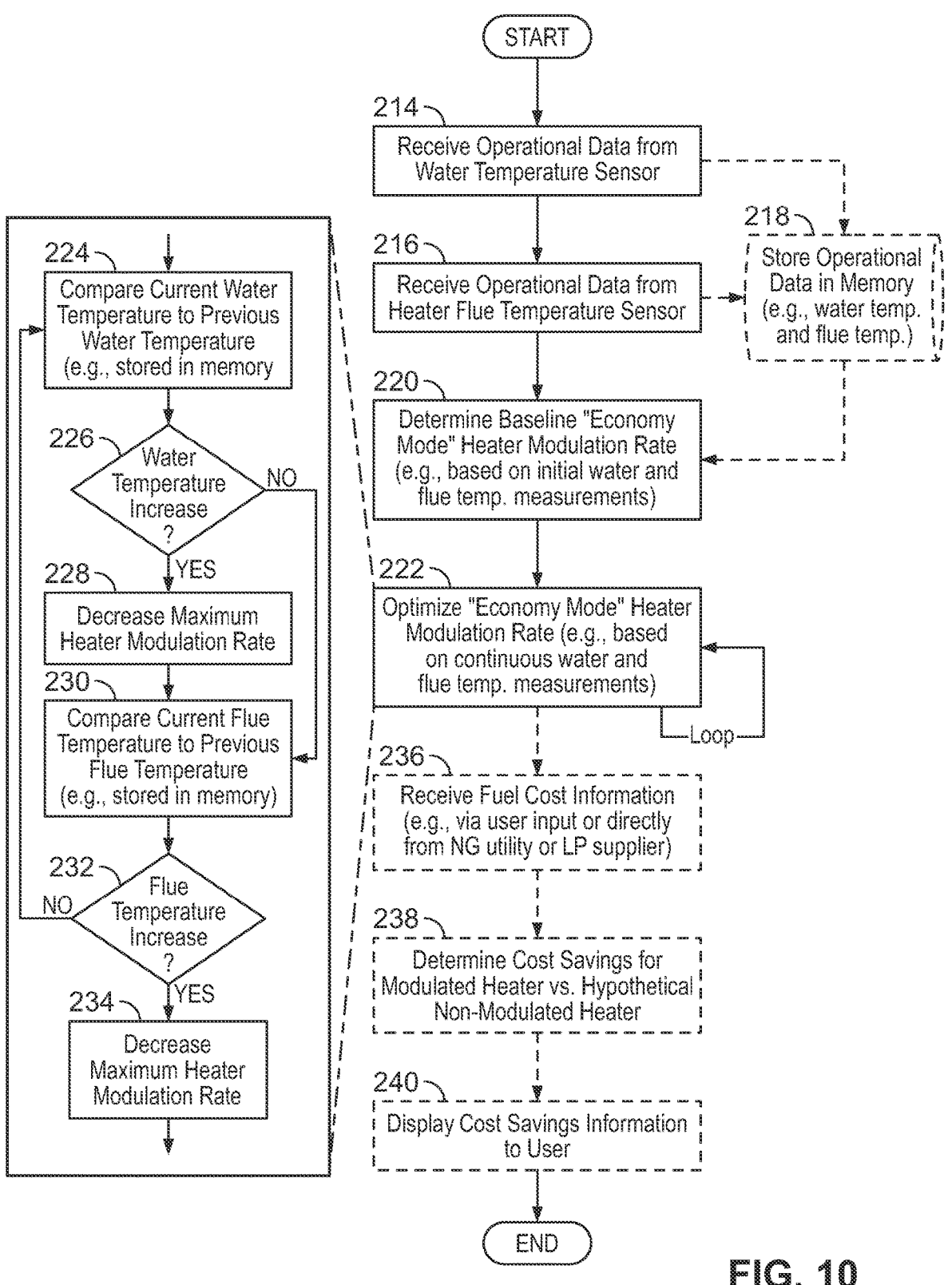
FIG. 10 is another flowchart illustrating process steps carried out according to embodiments of the present disclosure for optimizing modulation of a pool or spa heater based on parameters associated with a green mode of operation.

FIG. 10 is another flowchart illustrating process steps carried out by the system 10 of the present disclosure in connection with a "green" mode of operation, which is also referred to herein as an "economy" or "efficiency" mode, for optimizing the modulation of the heater 14 as a function of both water temperature and heater flue or stack temperature. For example, as water temperature rises, the heater 14 modulation can be increased and as the heater 14 flue temperature rises, heater modulation can also be increased. Accordingly, the system 10 can continuously optimize the modulation rate of the heater 14 based on the water and flue temperature changes, thereby achieving the highest possible efficiency over time for heating and cycle optimization. According to some embodiments of the present disclosure, the user can enter the cost of the heater fuel (e.g., $/therm rate), or the system can use default rate received from a NG utility or LP supply source. The system 10 can then determine the amount of energy savings achieved by the present modulating heater system vs. a non-modulating heater system.

In step 214, the system 10 receives operational data from one or more temperature sensors in fluidic communication with the pool or spa water. In step 216, the system 10 receives operational data from one or more temperature sensors in communication with the heater flue. Optionally, in step 218, the system 10 stores the operational data from the one or more temperature sensors (e.g., water temperature and flue temperature) in a memory. In step 220, the system 10 determines a baseline "economy mode" or "green mode" heater modulation rate (e.g., based on initial water and flue temperature measurements). In step 222, the system 10 continuously optimizes the "economy" or "green" mode heater modulation (e.g., based on continuous water and flue temperature measurements), thereby providing for the most efficient operation possible. As shown, step 222 can further include steps 224-234 for optimizing the green mode heater modulation rate.

In step 224, the system 10 compares the current water temperature to a previous water temperature reading (e.g., stored in memory or database 14). In step 226, the system 10 determines if the current water temperature has increased from the previous water temperature reading. If a positive determination is made, then the process advances to step 228 where the system 10 decreases the maximum heater modulation rate. In step 230, the system 10 compares the current flue temperature to a previous flue temperature reading. If a negative determination is made in step 226, then the process skips step 228 and advances to step 230. In step 232, the system 10 determines if the current flue temperature has increased from the previous flue temperature reading. If a positive determination is made in step 232, then the process advances to step 234 where the system 10 decreased the maximum heater modulation rate. If a negative determination is made in step 232, then the process returns to step 224 and the optimization process continues. It should be understood that the foregoing process steps 224-234 can together function to provide for operation of the pool or spa heater 14 at a minimum allowable design flue temperature for the given water temperature. Thus, according to some aspects of the present disclosure, the system 10 does not compare the current water temperature to a previous water temperature. According to such aspects, the system 10 targets a max modulation rate (e.g., minimum output) that is sufficient to provide a flue temperature that keeps critical components above their respective dew points, said dew points being governed by the return water temperatures of the pool or spa heater (e.g., typically, within 35° F.-104° F.).

Optionally, in step 236, the system 10 can receive fuel cost information (e.g., via user input or directly from an NG utility or LP gas supplier via a data or network connection). In step 238, the system 10 can optionally determine the cost savings provided by the modulated heater (e.g., running at the current modulation rate optimized in step 222) versus a hypothetical model of a non-modulated, but otherwise similar, pool or spa heater system. In step 240, the system 10 can optionally display the cost savings information to a user.

Figure 11:
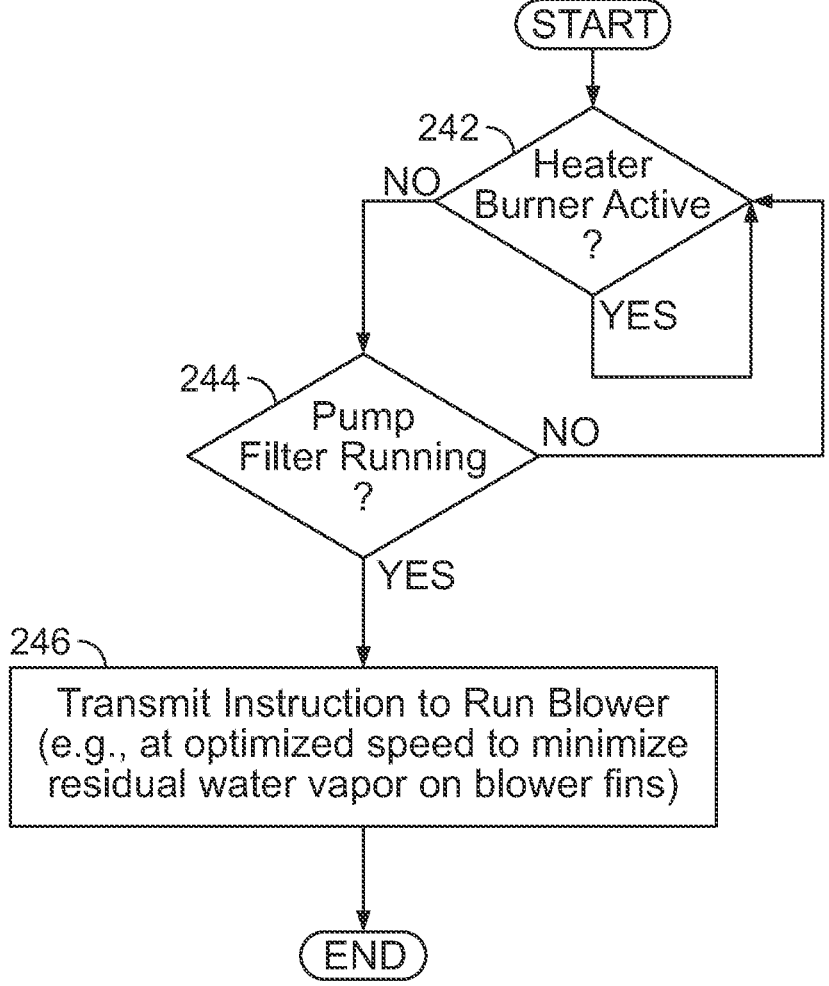
FIG. 11 is another flowchart illustrating process steps carried out according to embodiments of the present disclosure for operation of a pool or spa heater according to a cool down mode of operation.

FIG. 11 is another flowchart illustrating process steps carried out by the system 10 of the present disclosure including a "cool down" optimization function. For example, when the burner of the modulating heater is not running and the gas is off, but the pump filter remains active, the system 10 can continue to run the blower of the modulating heater at an optimized speed to minimize residual water vapor on the fins thereof. According to another example, while the heater 14 is cooling down (e.g., when the heater has recently been deactivated), the blower can remain on for a duration to minimize the residual water vapor on the fins thereof, but with the blower speed being gradually reduced as the heater 14 cools down until the heater 14 is substantially cool and the blower is deactivated. As such, it should be understood that the system 10 does not execute the "cool down" optimization function when the heater 14 has been inactive for a given duration, or when the temperature of the heater 14 is below a given threshold.

The cool down optimization function, described in greater detail below, can be embodied as a set of fixed heater ignition control parameters that are pre-programmed into the memory of the heater 14 by a manufacturer thereof, or alternatively, can be altered by a technician or by the user.

In step 242, the system 10 determines if the heater 14 burner is currently active. If a negative determination is made in step 242, then the process advances to step 244 where the system 10 determines if the pump is currently running. If a positive determination is made in step 242, then the step repeats and system 10 determines if the heater 14 burner is active. If a positive determination is made in step 244, then the process advances to step 246 where the system 10 transmits an instruction to run the blower of the modulating heater (e.g., at an optimized speed that minimizes residual water vapor on the fins of the heater 14 blower, while also reducing the energy required by the blower at full-speed operation). If a negative determination is made in step 244, then the process returns to step 242.

Figure 12:
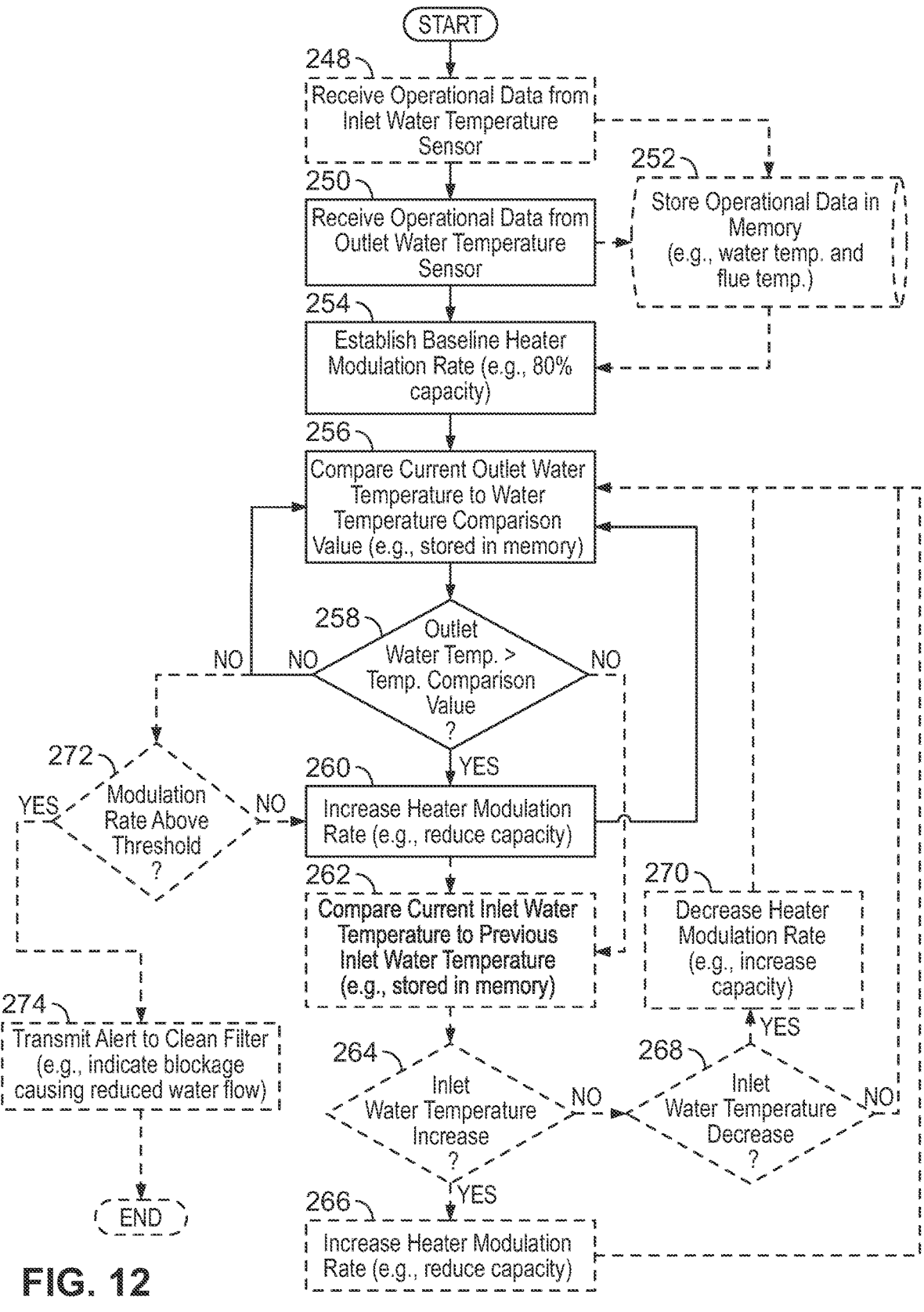
FIG. 12 is another flowchart illustrating process steps carried out according to embodiments of the present disclosure for modulating operation of a pool or spa heater based on heater inlet and heater outlet temperature measurements.

FIG. 12 is another flowchart illustrating process steps carried out by the system 10 of the present disclosure including a heater protection function whereby the system 10 limits the maximum capacity of the heater 14 based on a function of pool or spa water temperature increase and the water temperature as it exits the modulating heater, thus preventing overheating of the heat exchanger. Furthermore, the process described in connection with FIG. 12 does not require communication between the heater 14 and the filter pump, or knowledge of the current flow rate through the modulating heater.

Optionally, in step 248, the system 10 receives operational data from an inlet water temperature sensor. In step 250, the system 10 receives operational data from an outlet water temperature sensor. Optionally, in step 252, the system 10 stores the operational data in a memory (e.g. water temperature and flue temperature). In step 254, the system 10 establishes a baseline heater modulation rate (e.g., 80% capacity). In step 256, the system 10 compares the current outlet water temperature to a water temperature comparison value (e.g., stored in memory). According to aspects of the present disclosure, the water temperature comparison value can be a threshold value or a previous outlet water temperature reading. In step 258, the system 10 determines if the outlet water temperature has increased. If a positive determination is made, then the process proceeds to step 260 where the system 10 increases the heater 14 modulation rate (e.g., reduces capacity) and returns to step 256 for continued outlet water temperature analysis, but if a negative determination is made then the process returns to step 256 for continued outlet water temperature analysis. Optionally, in step 272, the system 10 can determine if the heater 14 modulation rate (e.g., capacity) is above a given threshold. If a positive determination is made, then the process can advance to optional step 274, where the system 10 transmits an alert to clean the pool or spa filter (e.g., indicating a blockage that is causing reduced water flow), and if a negative determination is made in step 272, then the process can advance to previously described step 260. Optionally, in step 262, the system 10 compares the current inlet water temperature to a previous inlet water temperature reading (e.g., stored in memory). In optional step 264, the system 10 determines if the current inlet water temperature has increased. If a negative determination is made, then the process returns to step 256, but if a positive determination is made, then the process advances to optional step 266 where the system 10 increases the heater 14 modulation rate and then the process returns to step 256. Optionally, if a negative determination is made in step 264, the process can proceed to step 268 where the system 10 determines if the inlet water temperature has decreased. If a negative determination is made in step 268, then the process returns to step 256, but if a positive determination is made in step 268, then the process can advance to optional step 270 where the system 10 can decrease the heater 14 modulation rate (e.g., increasing capacity) before returning to step 256.

Figure 13:
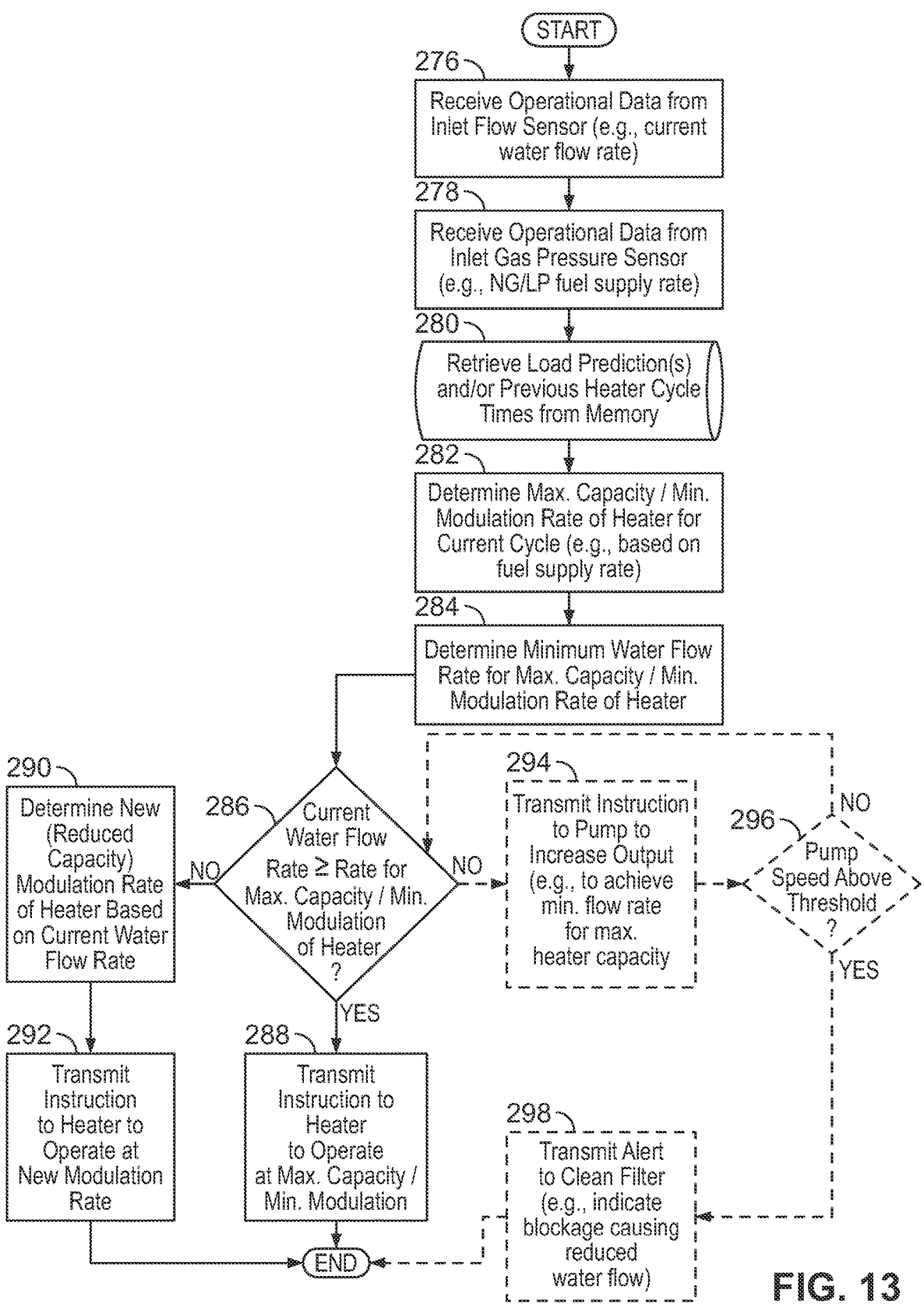
FIG. 13 is another flowchart illustrating process steps carried out according to embodiments of the present disclosure for modulating operation of a pool or spa heater based on a water flow rate passing through the heater.

FIG. 13 is another flowchart illustrating process steps carried out by the system 10 of the present disclosure for optimizing the modulation rate of the heater 14 and including a heater protection function where the filter pump flow rate is the limiting condition to operating the modulating heater at a higher capacity. For example, the system 10 can control the filter pump to increase the flow rate to as high as the gas supply will allow. According to another example, if the pump needs to bypass, or the system reduces flow to (e.g., via a controllable valve), the heater in order to operate a water feature, or the like, the system 10 can increase the modulation rate (e.g., reduce the maximum capacity) of the heater 14 to protect the heater 14 from damage.

In step 276, the system 10 receives operational data from an inlet flow sensor (e.g., current water flow rate through the heater 14). In step 278, the system 10 receives operational data from an inlet gas pressure sensor (e.g., NG or Lpgas supply rate). In step 280, the system 10 retrieves load predictions(s) and/or previous heater times from the memory. In step 282, the system 10 determines the maximum capacity/minimum modulation rate for the heater 14 for the current cycle (e.g., based on fuel supply rate as described herein). In step 284, the system 10 determines the minimum water flow rate required for the maximum heater capacity and minimum modulation rate determined in step 282. In step 286, the system 10 determines if the current water flow rate through the heater 14 is greater than or equal to the water flow rate required for maximum capacity and minimum modulation rate of the heater 14. If a positive determination is made, then the process advances to step 288 where the system 10 transmits an instruction to operate the heater 14 at the maximum capacity and minimum modulation rate determined in step 282 and then the process ends. If a negative determination is made in step 286, then the process advances to step 290 where the system 10 determines a new reduced capacity modulation rate for the heater 14 based on the current water flow rate. In step 292, the system 10 transmits an instruction to operate the heater 14 at the new modulation determined by the system in step 290 and then the process ends.

Optionally, if a negative determination is made in step 286, then the process can proceed to step 294 where the system 10 transmits an instruction to increase the output of the pump. In step 296, the system 10 determines if the current pump speed is above a predetermined threshold. If a negative determination is made in step 296, then the process returns to step 286. If a positive determination is made in step 296, then the process can advance to optional step 298 where the system 10 transmits an alert to clean the filter (e.g., indicating a blockage causing reduced water flow) and then the process ends. While the foregoing process of FIG. 13 can be utilized to identify a dirty filter and predict filter cleaning, it can also be reactive to the switching of a pump from usage with a spa to a pool, and back, which can result in large head differences.

Figure 14:
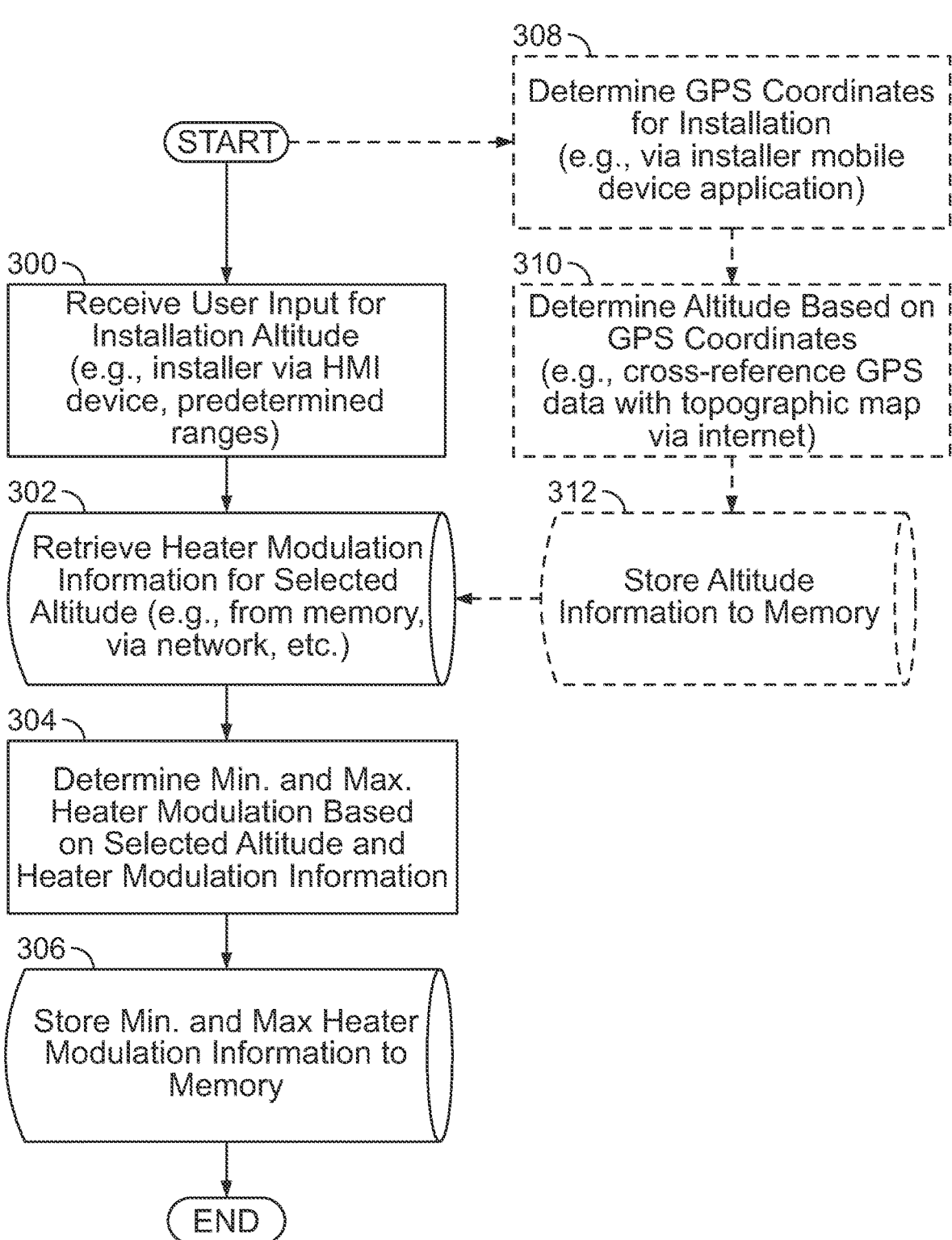
FIG. 14 is another flowchart illustrating process steps carried out according to embodiments of the present disclosure for modulating operation of a pool or spa heater based on an altitude of a pool or spa installation.

FIG. 14 is another flowchart illustrating process steps carried out by the system 10 of the present disclosure for optimizing the modulation rate of the heater 14 based on the altitude pool or spa installation. The process described in connection with FIG. 14 can be utilized where a negative regulation system of a pool or spa heater does not provide for full modulation range adjustments (e.g., as determined by agency testing). An installer can select the altitude of the pool or spa installation from a list of predetermined ranges displayed to the installer and the system 10 can use this information to set minimum and maximum modulation rates as a function of the selected altitude. According to some embodiments of the present disclosure, the altitude selection can be provided by an application on a mobile device, or the system could determine the altitude of the pool or spa installation based on GPS coordinates.

In step 300, the system 10 receives user input (e.g., via an HMI device, mobile phone application, or Internet portal) for the altitude of the pool or spa installation. For example, an installer could select the altitude from a list of predetermined altitude ranges displayed on a mobile device in communication with the system 10. In step 302, the system 10 retrieves heater modulation information (e.g., from the memory or via a network or data connection to an external source) for the selected altitude. In step 304, the system 10 determines the minimum and maximum heater modulation rates based on the selected altitude and the heater modulation information retrieved by the system 10 in step 302. In step 306, the system 10 stores the minimum and maximum heater modulations determined in step 304 to memory and then the process ends.

Optionally, in step 308, the system 10 can determine the (GPS) coordinates of the pool or spa installation (e.g., via an installer mobile device application or via an IP address geolocation service). In step 310, the system 10 determines the altitude of the pool or spa installation based on the (GPS) coordinates determined by the system 10 in step 308 (e.g., by cross-referencing the GPS or other location data with a topographic map stored in memory or accessed via the Internet). In step 312, the system 10 can store the altitude information of the pool or spa installation to memory for later retrieval and use in step 302. According to other embodiments of the present disclosure, the heater 14 can be provided with a pressure switch for measuring the current atmospheric pressure, which information can be utilized to determine the altitude of the heater 14 and provide this altitude information to the system 10 for use as described above.

Figure 15:
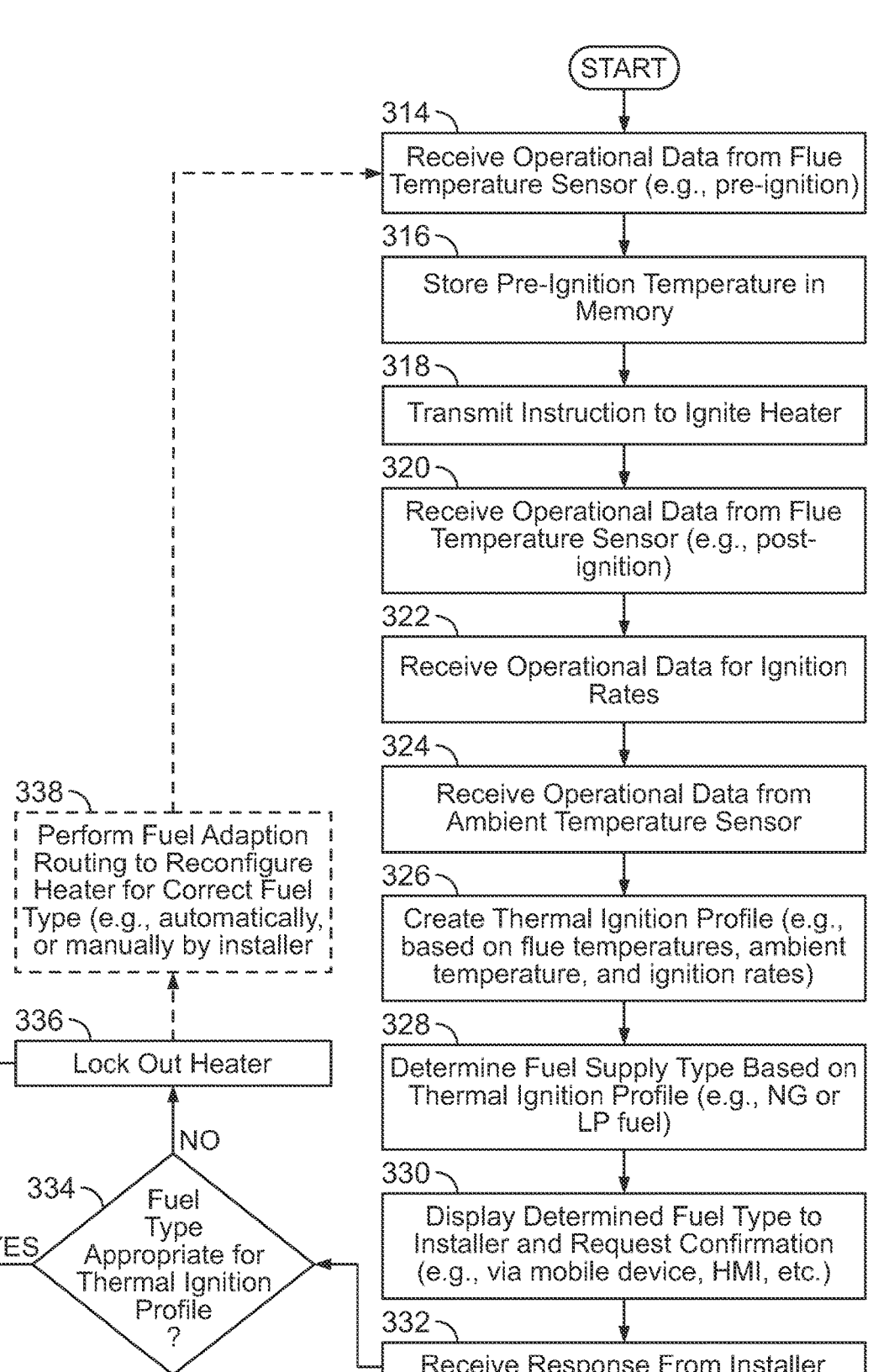
FIG. 15 is another flowchart illustrating process steps carried out according to embodiments of the present disclosure for operation of a pool or spa heater based on an automatic identification of a pool or spa heater fuel supply type.

FIG. 15 is another flowchart illustrating process steps carried out by the system 10 of the present disclosure for automatic fuel identification (e.g., NG or LP gas) and switching and heater modulation optimization based on the available heater fuel source. As described below, the process, uses the heater 14 flue temperature (pre- and post-ignition), ambient temperature of the pool or spa installation, and ignition rate(s) to create an ignition thermal profile, which is subsequently utilized by the system 10 to determine if the modulating heater is connected to an NG or LP gas fuel supply. The system 10 can use this information to alert the installer and to confirm fuel selection. According to some embodiments of the present disclosure, the system 10 can lock out the modulating heater if the ignition thermal profile is not appropriate for the fuel selection. Additionally, the modulating heater can include a fuel adaption routing feature, which can reconfigure the heater 14 (e.g., automatically or manually) for the correct fuel type. The fuel identification features can also be used to set heater modulation ranges that are appropriate for the fuel supply and altitude (e.g., as determined by the process described in connection with FIG. 14).

In step 314, the system 10 receives operational data from a flue temperature sensor of the modulating heater (e.g., at a time prior to ignition of the modulating heater). In step 316, the system 10 stores the pre-ignition temperature operational data in memory and then the process advances to step 318 where the system 10 transmits an instruction to ignite the modulating heater. According to some embodiments of the present disclosure, steps 314 and 316 can be performed by the manufacturer of the heater 14 during the manufacturing process and/or prior to installation of the heater 14 at the pool or spa location. Accordingly, the pre-ignition temperature operational data can be pre-programmed, or stored as a factory preset, in the memory of the heater 14 for subsequent retrieval and use by the system 10. In step 320, the system 10 (again) receives operational data from the flue temperature sensor (e.g., at a time following the ignition of the modulating heater). In step 322, the system 10 receives operational data related to ignition rates of the modulating heater. In step 324, the system 10 receives operational data from an ambient temperature sensor (e.g., positioned within the pool or spa installation area). In step 326, the system 10 creates a thermal ignition profile based on the heater 14 pre- and post-ignition flue temperatures, ambient temperature, and modulating heater ignition rates discussed in connection with steps 314-324.

In step 328, the system 10 determines the heater fuel supply type based on the thermal ignition profile. According to some embodiments, the system 10 can compare the thermal ignition profile to one or more known thermal ignition profiles (e.g., stored in database 16 or retrieved via the Internet) of different heater configurations and/or fuel supply types to determine a configuration of the heater 14 and the fuel supply type. For example, the system 10 can match the thermal ignition profile of the heater 14 to known thermal profiles of the heater 14 when provided with combinations of natural gas, liquefied petroleum gas, orifices configured for natural gas, orifices configured for liquefied petroleum gas, and the like in order to determine the present (e.g., orifice) configuration and fuel supply type of the heater 14. Similarly, the system 10 can compare the operational data for the ignition rates (e.g., received in step 322), including the number of missed ignitions, to one or more known ignition rates (e.g., stored in database 16 or retrieved via the Internet) for different heater configurations and/or fuel supply types to determine the configuration of the heater 14 and the fuel supply type. For example, the system 10 can match the number of missed ignitions of the heater 14 on startup to known missed ignition rates for the heater 14 when provided with combinations of natural gas, liquefied petroleum gas, orifices configured for natural gas, orifices configured for liquefied petroleum gas, and the like in order to determine the present configuration and fuel supply type of the heater 14.

In step 330, the system 10 displays the determined heater fuel supply type to an installer and requests confirmation that the heater fuel supply type determined in step 328 is correct. In step 332, the system 10 receives a response from the installer (e.g., via mobile device, HMI, web portal, etc.). In step 334, the system 10 determines if the determined heater fuel supply type, confirmed by the installer, is appropriate for the thermal ignition profile. If a positive determination is made, then the process ends. If a negative determination is made, then the process advances to step 336 where the system 10 locks out the modulating heater such that the heater 14 is not operable with a fuel type that is not appropriate for the thermal ignition profile determined by the system 10 in step 326 and then the process ends. Optionally, in step 338, the system 10 can perform a fuel adaptation routing function to reconfigure the modulating heater for the correct fuel supply type and then the process can return to step 314.

Figure 16:
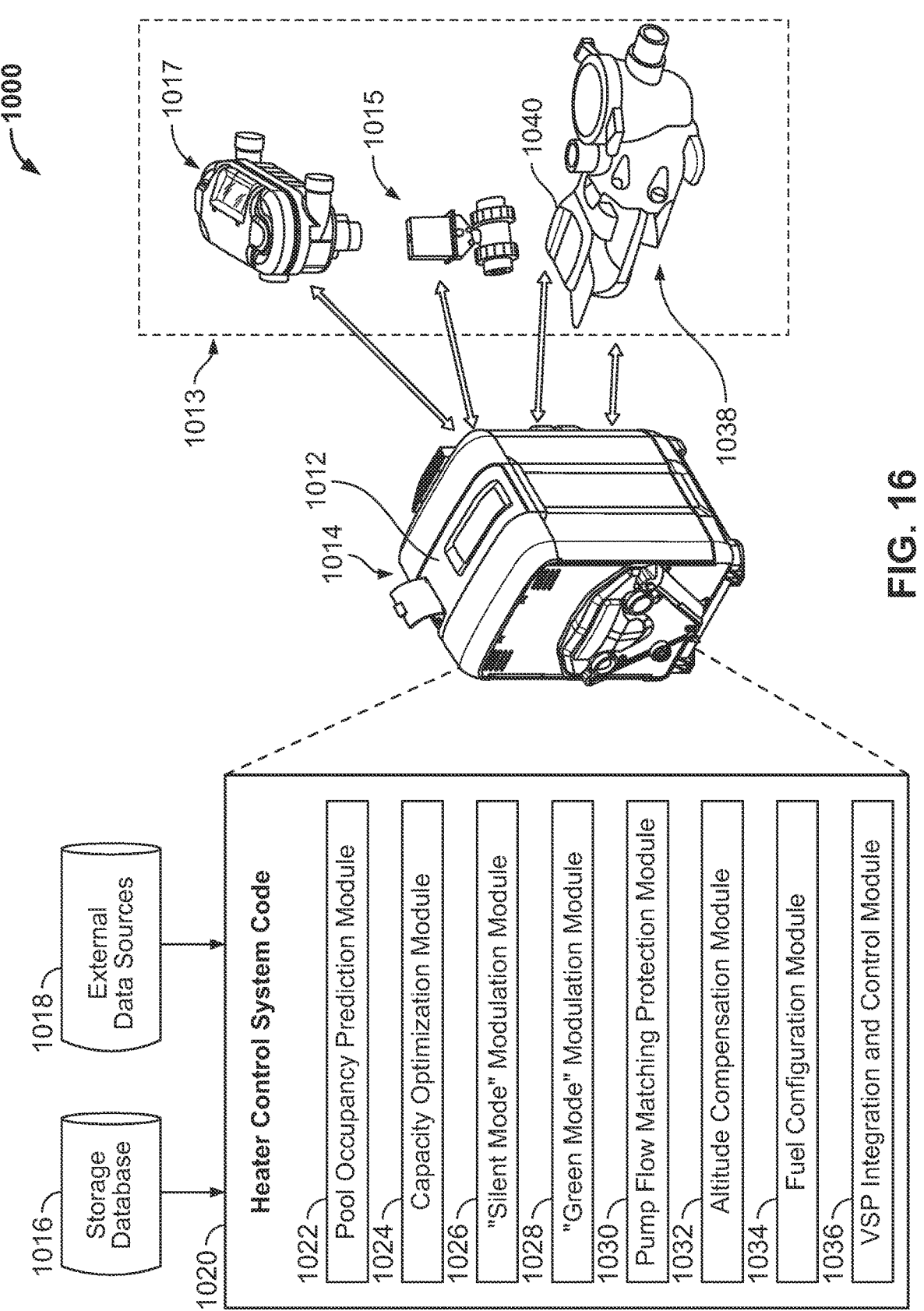
FIG. 16 is a diagram illustrating another exemplary modulating pool or spa heater system of the present disclosure.

FIG. 16 is a diagram illustrating hardware and software components of another exemplary modulating pool or spa heater system (hereinafter "system 1000") of the present disclosure. The system 1000 includes a pool or spa modulating heater 1014, which can be, for example, a gas heater, electric heater, or heat pump, and one or more flow controllers/flow controlling devices 1013 (e.g., one or more valve actuators 1015, valve manifolds 1017, and/or variable speed pumps 1038) that are in fluidic communication and communicatively coupled (directly or indirectly) such that the modulating heater 1014 is capable of providing instructions to and controlling the one or more flow controllers 1013 (e.g., the one or more valve actuators 1015, valve manifolds 1017, and the variable speed pump 1038). The one or more flow controllers 1013 control the flow of water, e.g., the flow rate of the water, through the pool/spa plumbing system and to the heater 1014. In this regard, the speed of the variable speed pump 1038 can be increased or decreased to adjust the water flow rate and/or water pressure in the pool/spa plumbing system, while the one or more valve actuators 1015 can be controlled to adjust the position of an associated valve and thus alter the water flow rate exiting therefrom. Similarly, the one or more valve manifolds 1017 can house one or more valve actuators 1015 and associated valves, and control the valve actuators 1015 to adjust the position of the associated valve and thus alter the water flow rate exiting from the valve manifold 1017. Additionally, the valve actuators 1015 can control the diversion of water between different sections of the pool and/or from the pool to the spa, e.g., when the system 1000 and the valve actuators 1015 are transitioned from a pool mode to a spa mode. The valve actuators 1015 and the valve manifolds 1017 are discussed in greater detail below.

The modulating heater 1014 can be substantially similar to the modulating heater 14 shown and described in connection with FIGS. 1-15, and therefore it should be understood that any description herein with respect to modulating heater 14 is equally applicable to modulating heater 1014 including any components thereof, e.g., the central processing unit 12, system code 20, etc. In this regard, the modulating heater 1014 includes a central processing unit 1012 (e.g., a hardware processor) coupled thereto which can execute system code, determine a modulation rate for the heater 1014, control the heater 1014 in accordance with the modulation rate, determine a speed (e.g., operation level or modulation rate) and control instructions for the variable speed pump 1038, and communicate with (e.g., transmit control instructions to) a pump controller 1040 of the variable speed pump 1038. The central processing unit 1012 could be housed within the modulating heater unit 1014 itself, e.g., in a control panel thereof, or another pool or spa device, e.g., a central controller. Additionally, the central processing unit 1012 could include, but is not limited to, a centralized or distributed pool or spa control system, a personal computer, a laptop computer, a tablet computer, a smart telephone, a server, and/or a cloud-based computing platform.

The modulating heater 1014 can include a wired communication subsystem and/or a wireless communication subsystem to facilitate communication with the pump 1038 and the valve actuators 1015 over a wired or wireless connection. The wired communication subsystem could include an Ethernet transceiver and a serial transceiver. The serial transceiver could support one or more suitable serial communication protocols, such as RS-485, RS-232, USB, etc. The wireless communication subsystem could include a Wi-Fi transceiver, a Bluetooth (or Bluetooth LE) transceiver, a cellular data transceiver, a satellite transceiver, an infrared transceiver, and a radiofrequency/RF mesh transceiver. The cellular data transceiver could support one or more cellular data communications protocols, such as 4G, LTE, 5G, etc. The radiofrequency/RF mesh transceiver could support one or more RF mesh network protocols, such as ZWave, Zigbee, Thread, Weave, etc. Accordingly, the wired connection could be RS-485, RS-232, Ethernet, USB, etc., while the wireless connection could be over a wireless network such as a home WiFi network, BlueTooth, an RF mesh network (e.g., ZWave, Zigbee, Thread, Weave, etc.), a cellular network, the Internet, etc. It should be understood that the foregoing enumerated wired and wireless connections are non-exhaustive lists. The central processing unit 1012 can also be coupled to one or more storage databases 1016 and one or more external data sources 1018 (e.g., sensors, other pool or spa components, valves, networks, etc.) This connection can be in the same fashion as the connection with the pump 1038 and/or valve actuators 1015.

As similarly described in connection with FIGS. 1-15 with respect to the modulating heater 14, the modulating pool or spa heater 1014 can be controlled to variably alter the energy or heat output thereof as a percentage of the heater's 1014 maximum capacity. For a gas heater, this can be achieved, for example, by adjusting a variable gas supply valve or blower speed to control the amount of fuel provided to a burner of the heater 1014. For a heat pump, this can be achieved, for example, by adjusting the voltage or frequency (e.g., the PWM frequency) of the electrical signal provided to the compressor, controlling the speed of the compressor, controlling the speed of associated indoor or outdoor fans, and/or controlling any other suitable electrical parameter. For an electric heater, this can be achieved by various means resulting in the regulation of the current passing through the heating elements.

Additionally, the modulating heater 1014 can receive data from various pool/spa components, sensors, etc., interpret the data, generate control instructions, e.g., speed instructions, for the variable speed pump 1038 based on the data, and control the associated variable speed pump 1038 in order to control the flow rate of water through the modulating heater 1014. For example, the modulating heater 1014 could have heater flow interlocking functionality such that it ensures that the pump 1038 is operating and providing the minimum amount of flow through the modulating heater 1014 for safe operation of the modulating heater 1014 at the active desired heater output capacity, as different modulation rates (and thus heater output capacities) will require different flow rates of water through the modulating heater 1014 to ensure proper and safe operation thereof. If the modulating heater 1014 determines that the minimum amount of flow is not being provided by the pump 1038, then it can instruct the pump 1038 to increase speed and thus flow rate until the minimum flow value is achieved, or alternatively, the modulating heater 1014 can reduce the modulation rate and output capacity thereof if it determines that the pump 1038 is operating at its maximum allowable operating speed.

The modulating heater 1014 includes system code 1020 (e.g., non-transitory, computer-readable instructions) stored on a computer-readable medium and executable by the central processing unit 1012 and/or additional computer systems. The code 1020 can include the same custom-written software modules 22, 24, 26, 28, 30, 32, 34 as heater 12, labeled as modules 1022, 1024, 1026, 1028, 1030, 1032, 1034 in FIG. 16, that carry out the steps/processes discussed in connection with FIGS. 1-15. For example, this can include the pool occupancy prediction module 1022, the capacity optimization module 1024, the "silent mode" modulation module 1026, the "green mode" modulation module 1028, the pump flow matching module 1030, the altitude compensation module 1032, and the fuel configuration module 1034. Modules 1022, 1024, 1026, 1028, 1030, 1032, 1034 can operate substantially in accordance with modules 22, 24, 26, 28, 30, 32, 34, and need not be described in further detail. Additionally, the modulating heater 1014 can include a VSP integration and control module 1036, which can determine a desired speed for the variable speed pump 1038 based on heater and operating mode parameters, and relay control instructions to the variable speed pump 1038. The code 1020 could be programmed using any suitable programming language including, but not limited to, C, C++, C#, Java, Python, or any other suitable language. Additionally, the code 1020 could be distributed across multiple computer systems in communication with each other over a communications network, and/or stored and executed on a cloud computing platform and remotely accessed by a computer system in communication with the cloud platform. The code 1020 could communicate with the storage database 1016, which could be stored on the same computer system as the code 1020, or on one or more other computer systems in communication with the code 1020.

The valve actuators 1015 discussed herein can be variably adjustable valve assemblies capable of regulating a flow of water through a manifold or a fluid conduit, such as the valve assemblies disclosed by U.S. Pat. No. 11,204,106 entitled "Valve Assembly" and issued on Dec. 21, 2021, U.S. Pat. No. 11,137,780 entitled "Fluid Distribution Manifold" and issued on Oct. 5, 2021, and U.S. patent application Ser. No. 17/324,064 entitled "Systems and Methods for Controlling Operations of a Fluid Distribution System" published on Oct. 27, 2022, as U.S. Patent App. Pub. No. 2022/0342430, the entire disclosures of which are expressly incorporated by reference herein in their entirety.

For example, the valve actuators 1015 can be provided as valve assemblies that can include a first housing, a second housing engaged to the first housing, a cover engaged to the second housing, a valve member positioned in the first housing, an actuator attached to the valve member, and a valve controller. The first housing can define an inlet, a fluid output chamber, and an open chamber. In this regard, the open chamber can be defined by one or more annular spaced wall segments, and can be in fluid communication with an area surrounding the one or more annular spaced wall segments, e.g., by way of a gap formed in or between the one or more annular spaced wall segments. The actuator can be configured to move the valve member to selectively put the inlet in fluid communication with the area surrounding the one or more wall segments through the open chamber, or to variably adjust the valve member to control the flow rate of water exiting the valve assembly. In this regard, the valve actuators 1015 can also include a flow rate sensor positioned downstream of the open chamber and the inlet, which can provide information regarding the flow rate of fluid exiting the valve actuator 1015. Accordingly, the system 1000 can generate and transmit control instructions, e.g., valve positioning instructions, for and to the valve actuators 1015 based on data from various pool/spa components, sensors, etc., and thus control the valve actuators 1015 in order to variably adjust the flow rate of water exiting therefrom and provided to the heater 1014. This control can be performed in addition to or in place of controlling the variable speed pump 1038. For example, control of the valve actuators 1015 can be implemented in situations that require certain flow adjustments that are not possible through control of the variable speed pump 1038 alone.

The valve actuators 1015 can also be a part of one or more valve manifolds 1017, e.g., smart manifolds, such as those described in connection with U.S. Pat. No. 11,137,780 entitled "Fluid Distribution Manifold" and issued on Oct. 5, 2021, and U.S. patent application Ser. No. 17/324,064 entitled "Systems and Methods for Controlling Operations of a Fluid Distribution System" published on Oct. 27, 2022, as U.S. Patent App. Pub. No. 2022/0342430, the entire disclosures of which are expressly incorporated by reference herein in their entirety. In this regard, the valve manifold 1017 can be configured to house a plurality of valve assemblies, such as the valve assemblies discussed herein, each which can be associated with an individual outlet of the valve manifold 1017 to regulate the flow rate of water from the respective outlet.

The valve manifold 1017 can include a manifold control system while each of the valve assemblies can include a valve controller. The manifold control system can facilitate communication (direct or indirect) with the heater 1014 and variable speed pump 1038, and can be in communication with the valve controllers to direct operations of the valve assemblies, e.g., to control the valve actuators 1015 of each valve assembly to adjust the valve position and alter the flow rate of water exiting therefrom. Alternatively, the manifold control system can directly control each of the valve assemblies without the need for individual valve controllers.

The manifold control system can control the individual valve assemblies based on signals received from the heater 1014 and/or the variable speed pump 1038, as well as based on data provided by one or more sensors, which can be, for example, flow sensors that are configured to continuously detect the actual flow rate of water from each valve assembly. In particular, the manifold control system can continuously poll flow sensors of all of the valve assemblies for the manifold 1017, and continuously operate/adjust each of the valve assemblies (e.g., the valve actuators 1015) based thereon to maintain or modify flow rates there through in order to deliver the required flow rates through the valve assemblies, e.g., to provide the flow rate requested or required by the heater 1014. Additionally, the manifold control system can continuously perform flow rate balancing operations of the valve assemblies so that the manifold 1017 delivers the flow rates required by associated fluid handling devices, e.g., the heater 1014, within predetermined tolerances based on individual valve assembly flow rates, manifold total input, and output flow rates until a new control input is received, e.g., from the heater 1014. In some instances, more than one valve manifold 1017 can be provided and each valve manifold 1017 can be in communication with the other valve manifolds 1017 and the heater 1014. In this configuration, the flow balancing aspects discussed above can be performed across the multiple valve manifolds 1017 and the valve assemblies thereof.

Figures 17A, 17B:
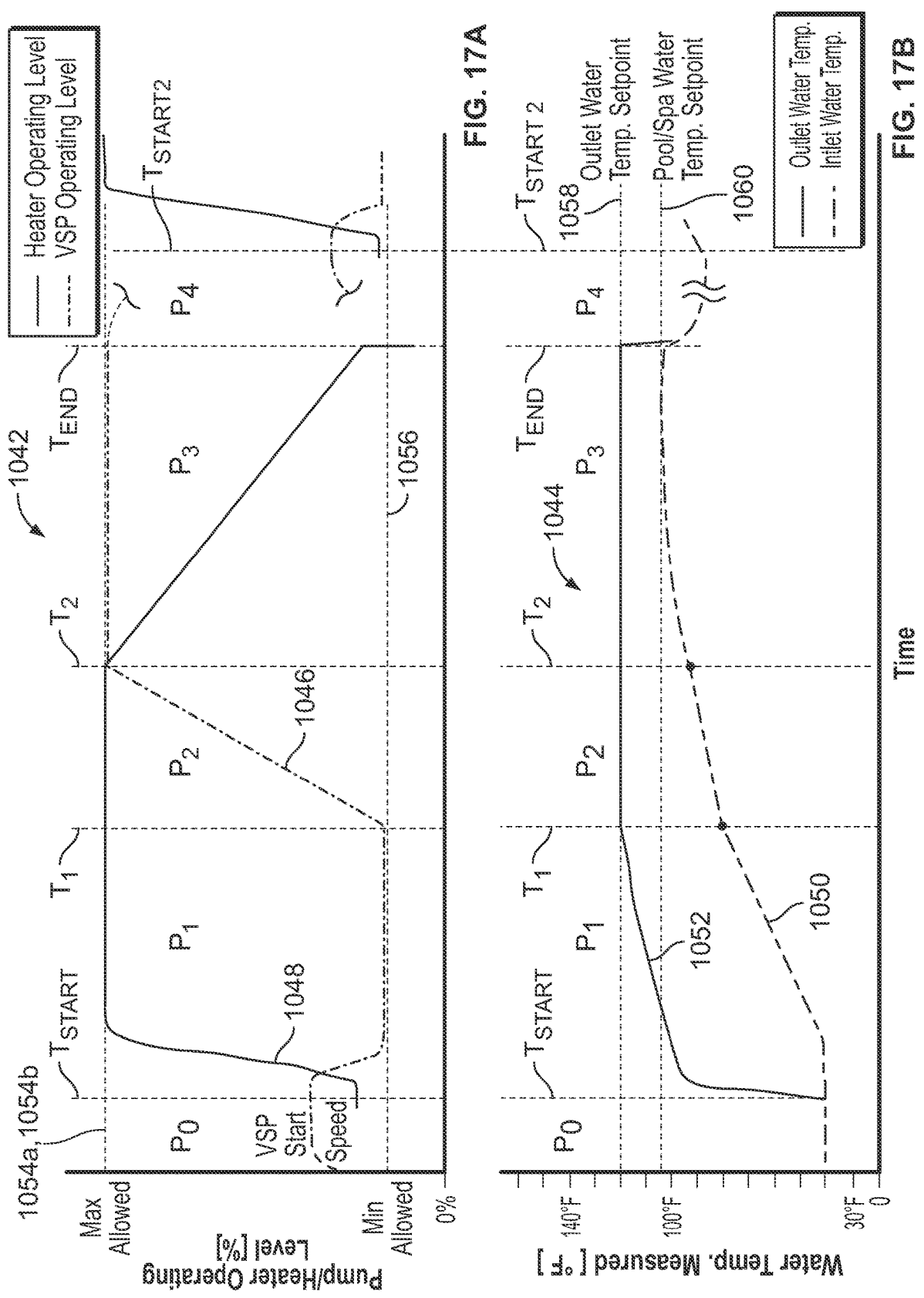
FIG. 17A is a graph of variable speed pump and modulating heater operating levels versus time for the modulating pool or spa heater system of the present disclosure during an exemplary heating cycle.
FIG. 17B is a corresponding graph of water temperature versus time for the graph of FIG. 17A during the exemplary heating cycle.

FIG. 17A is a graph 1042 of modulating heater 1014 and variable speed pump 1038 operating levels versus time for the system 1000 during an exemplary heating cycle of the present disclosure, and FIG. 17B is a corresponding graph 1044 of water temperature versus time for the graph of FIG. 17A during the exemplary heating cycle. The graphs 1042, 1044 generally illustrate operation of the system 1000 as the pool or spa water is heated to the desired temperature based on the heating mode of operation. In particular, graph 1042 illustrates the change in modulating heater 1014 operating level over time as a percentage of the maximum operating level or modulation rate for the current mode of operation (shown as trendline 1048) and the change in variable speed pump 1038 operating level over time as a percentage of the maximum operating level for the current mode of operation (shown as trendline 1046), as the system 1000 is operated to heat the pool or spa water to the desired temperature. Graph 1044, on the other hand, illustrates the corresponding impact that the modulating heater 1014 and variable speed pump 1038 operating levels of FIG. 17A have on the water temperature as they are adjusted over time at an inlet to the heater 1014 (which is generally representative of the water temperature in the pool or spa) shown as trendline 1050 and at an outlet of the heater 1014 (which circulates the heated water back to the pool or spa) shown as trendline 1052.

The graphs 1042, 1044 are generally divided into five time periods $P_0$, $P_1$, $P_2$, $P_3$, $P_4$ by four specific times $T_{start}$, $T_1$, $T_2$, $T_{end}$. Time period $P_0$ represents the period of time preceding the start of a scheduled or user activated heating mode of operation. During time period $P_0$, the modulating heater 1014 is inactive and the variable speed pump 1038 is operating at a speed according to the pump schedule, e.g., according to a filter schedule, turnover schedule, etc. Additionally, during time period $P_0$, the outlet water temperature and inlet water temperature will be generally at equilibrium, but above freezing and no lower than the minimum temperature allowed, e.g., no lower than 36° F. Time period $P_0$ ends at the start time $T_{start}$ of the activated heating mode of operation, which begins the first time period $P_1$.

At the start time $T_{start}$, the modulating heater 1014, e.g., the central processing unit 1012, confirms that the variable speed pump 1038 is providing a flow of water through the modulating heater 1014, and then, upon confirmation, starts at an initial modulation rate, e.g., initial percentage of the maximum permitted modulation rate, and immediately ramps up to the maximum allowed modulation rate 1054a, e.g., maximum permitted output capacity. The maximum allowed modulation rate 1054a can be based on the current mode of operation for the modulating heater 1014. For example, as discussed above in connection with modulating heater 14, the modes of operation can be "silent" mode, "green" mode, "setback" mode, "fast heat" mode, "comfort" mode, etc., with each mode having a respective maximum allowed modulation rate 1054. For example, the maximum allowed modulation rate 1054a might be greater when the modulating heater 1014 is operating in "fast heat" mode than when it is operating in "silent" mode and trying to minimize the noise level of the modulating heater 1014. Additionally, the maximum allowed modulation rate 1054a can be determined, at least in part, on the outlet and/or inlet water temperatures at the start time $T_{start}$. In particular, if the water temperature is significantly lower than the temperature setpoint, e.g., greater than 30° F. below the temperature setpoint, then the modulating heater 1014 can be operated at a higher capacity than would normally be expected, e.g., it could overfire at a greater capacity, since the water is capable of absorbing more heat so long as the flow rate through the heater 1014 is sufficient, which is discussed in greater detail below. For example, if the inlet water temperature is greater than 30° F. below the temperature setpoint, then a 400 kBTU capacity modulating heater 1014 could be overfired and operated at 500 kBTU capacity in order to draw more heat into the water. In this example, one or more of the flow controllers/controlling devices 1013 (e.g., one or more of the valve actuators 1015, valve manifolds 1017, and/or variable speed pumps 1038) could be adjusted and/or optimized to accommodate for the increased heating. For example, the minimum allowed operating level 1056 of the pump could be adjusted and/or optimized to accommodate for the increased heating.

As the modulating heater 1014 is ramped up to the maximum allowed modulation rate 1054a, the system 1000, e.g., the modulating heater 1014, instructs the variable speed pump 1038 to rapidly decrease its operating level down to the minimum allowed operating level 1056, e.g., minimum speed, and operate at that minimum allowed operating level 1056 until instructed otherwise. The minimum allowed operating level 1056 of the pump 1038 can be directly tied to the output capacity of the modulating heater 1014 when operating at the maximum allowed modulation rate 1054a to ensure safe operation of the modulating heater 1014, e.g., to ensure that there is adequate flow through the modulating heater 1014 when operating at the maximum allowed modulation rate 1054a. The minimum allowed operating level 1056 of the pump 1038 can also be determined so as to minimize the formation of heater condensation, e.g., during the first time period $P_1$, since condensate is corrosive, can damage a heater combustion chamber, and must be drained if excessive. In particular, since the water is coldest at the start time $T_{start}$, operating the pump 1038 at too high of a speed and having too high of a flow will result in condensate being generated; however, as noted above, operating the pump 1038 at too low of a speed and having too low of a flow can stress the heat exchanger of the heater 1014 as excessive temperatures may occur due to the inadequate flow extracting an insufficient amount of heat, which can reduce the heat exchanger fin life. Thus, the inlet water temperature, e.g., at the start time $T_{start}$, can be taken into consideration in determining the minimum allowed operating level 1056 of the pump 1038. Accordingly, the minimum allowed operating level 1056 of the pump 1038 can be optimized such that it strikes a balance between a flow that is too low and a flow that is too high. This optimized minimum allowed operating level 1056 will extend the life of the heater 1014 by reducing stress on the heat exchanger and minimizing the formation of condensation.

Additionally and/or alternatively, the minimum allowed operating level 1056 of the pump 1038 can be set in order to optimize or account for pool volume turnover requirements. In particular, the minimum allowed operating level 1056 of the pump 1038 can be set to ensure that the minimum number of turnovers required by code is achieved during the heating cycle. For example, if the required pool turnover rate is once per hour, then the minimum allowed operating level 1056 of the pump 1038 can be dictated by this required turnover rate.

Once the modulating heater 1014 reaches the maximum allowed modulation rate 1054a it maintains that modulation rate for the remainder of the first time period $P_1$ and the second time period $P_2$, which is discussed in greater detail below. Once the pump 1038 reaches the minimum allowed operating level 1056 it maintains that operating level for the remainder of the first time period $P_1$ until the outlet water temperature 1052 reaches an outlet water temperature setpoint 1058 at the first time $T_1$, unless instructed otherwise, e.g., by the modulating heater 1014. For example, the modulating heater 1014 can include a flow sensor that senses the flow/speed of water through the modulating heater 1014 and compare the flow value to an expected flow value. If the modulating heater 1014 determines that the flow there through does not match the flow that the pump 1038 should be providing based on the current operating level/speed, and is therefore at a potentially unsafe level, then the modulating heater 1014 can instruct the pump 1038 to increase operating level/speed until the desired flow through the modulating heater 1014 is achieved. The outlet water temperature setpoint 1058 can be, for example, 140° F.

During the first time period P1, the modulating heater 1014 is operated at the maximum allowed modulation rate 1054a while the pump 1038 is operated at the minimum operating level/speed 1056 in order to draw as much heat as possible into the water flowing through the modulating heater 1014 and therefore heat the pool or spa water as rapidly as possible. In particular, since the water is passing through the modulating heater 1014 at a reduced rate it will get hotter before exiting the modulating heater 1014 than if it flowed through the modulating heater 1014 at a faster rate because it has more time to extract more heat from the modulating heater 1014, e.g., from the hot gases within a combustion chamber of the modulating heater 1014. This effect is shown by the inlet water temperature trendline 1050 and the outlet water temperature trendline 1052 shown in FIG. 17B. As can be seen in FIG. 17B, the outlet water temperature 1052 increases drastically as the modulating heater 1014 operating level is ramped up to the maximum allowed modulation rate 1054a and the pump 1038 operating level is reduced to the minimum operating level/speed 1056. The outlet water temperature 1052 continues to increase once the modulating heater 1014 reaches the maximum allowed modulation rate 1054a and the pump 1038 reaches the minimum operating level/speed 1056. As such, there is a very quick ramp up of heat into the water flowing through the modulating heater 1014, which subsequently stabilizes. Once the outlet water temperature 1052 stabilizes, the inlet water temperature 1050, which is representative of the pool or spa water temperature, continues to gradually increase while the modulating heater 1014 is operated at the maximum allowed modulation rate 1054*a* and the pump 1038 is operated at the minimum operating level/speed 1056 during the first time period $P_1$.

The pump 1038 is controlled by the system 1000, e.g., the modulating heater 1014 of the system 1000, according to the outlet water temperature setpoint 1058. That is, the pump 1038 is operated at the minimum operating level/speed 1056 until the temperature 1052 of the outlet water reaches the outlet temperature setpoint 1058, as determined by the modulating heater 1014 based on outlet water temperature readings provided by a water temperature sensor communicating with the modulating heater 1014. The time at which the outlet water temperature 1052 reaches the setpoint 1058 is labelled in FIG. 17B as $T_1$, which marks the beginning of the second time period $P_2$. It is noted that since operation of the pump 1038 and modulating heater 1014 is based on water temperature instead of time, the time scale shown in FIGS. 17A and 17B is not necessarily linear or to scale.

Once the outlet water temperature 1052 reaches the outlet water temperature setpoint 1058, the modulating heater 1014 instructs the pump 1038 to increase its modulation rate, e.g., operating level/speed, to the maximum allowed operating level 1054*b* for the pump 1038. In this regard, during the second time period $P_2$, the operating level/speed of the pump 1038 is increased over time as the water temperature increases since the water flowing through the heater 1014 absorbs less heat (e.g., because it has increased in temperature). This increased flow helps to protect the heater 1014 by preventing excessively high temperatures and reducing heat exchanger stress, as noted above. As such, the pump 1038 gradually increases its operating level/speed to the maximum allowed operating level 1054*b* from the first time $T_1$ to the second time $T_2$, which marks the end of the second time period $P_2$, to control the outlet water temperature 1052. That is, the variable speed pump 1038 is modulated to control the outlet water temperature 1052 to the outlet water temperature setpoint 1058, and to protect the heater 1014 by preventing excessively high heat exchanger temperatures.

The modulating heater 1014 continues to operate at the maximum allowed modulation rate 1054*a* while the operating level of the pump 1038 is ramped up during the second time period $P_2$. The additional flow of water provided through the modulating heater 1014 by the pump 1038 during the second time period $P_2$ causes the outlet water temperature 1052 to be maintained at the outlet water temperature setpoint 1058 despite the modulating heater 1014 being operated at the maximum allowed modulation rate 1054*a*. As such, while the temperature of the water exiting the heater 1014 is maintained, the temperature of the water at the inlet to the modulating heater 1014 continues to increase. Thus, the second time period $P_2$ functions to mix and even out the temperature of the pool water. The second time period $P_2$ ends when the pump 1038 reaches the maximum operating level, which is indicated as the third time $T_3$.

The third time period $P_3$ starts once the pump 1038 reaches the maximum allowed operating level 1054*b* (at time $T_2$). At this time, the operating level, e.g., modulation rate, of the modulating heater 1014 is controlled according to a pool/spa water temperature setpoint 1060, which can be user defined or set by the mode of operation selected by the user. However, the inlet temperature setpoint 1060 should be no greater than 104° F. That is, the modulation rate of the heater 1014 is continually adjusted to cause the inlet water temperature 1050 to gradually approach the pool/spa water temperature setpoint 1060, and then maintain the inlet water temperature 1050 at the pool/spa water temperature setpoint

1060 while also ensuring that the outlet water temperature 1052 does not exceed the outlet water temperature setpoint 1060. Generally, this involves gradually reducing the modulation rate of the heater 1014 as the inlet water temperature 1050 approaches the pool/spa water temperature setpoint 1060, and then continually adjusting the modulation rate of the heater 1014 to maintain the inlet water temperature 1050 at the pool/spa water temperature setpoint 1060 for the duration of the heating mode of operation until a time period associated with the user selected or scheduled mode of operation has elapsed, which is indicated at the end time $T_{end}$. The end time $T_{end}$ indicates the end of the heating mode of operation, the end of the third period $P_3$, and the beginning of the fourth period $P_4$. Additionally, during the third time period P3, the modulation rate of the heater 1014 is continually adjusted to prevent excessive heating of the heat exchange since the pump 1038 is being operated at the maximum allowed operating level 1054*b*. For example, if the system 1000 determines that the temperature of a heat exchanger is greater than a threshold, then the system 1000 could instruct the heater 1014 to decrease modulation and thus capacity.

At the end time $T_{end}$, the heater 1014 is turned off and the pump operating level/speed can be reverted back to the scheduled level, which can be in accordance with a filtering or turnover schedule. Once the heater 1014 is turned off, the outlet water temperature 1052 will drastically drop until it reaches equilibrium with the inlet water temperature 1050. Additionally, the inlet water temperature 1050 will gradually reduce over time once the heater 1014 is turned off. The cycle can then be repeated once a new pool or spa heating operation is activated by a user or by a schedule. This new cycle starts at the second start time $T_{start2}$, and essentially repeats the first, second, and third periods P1, P2, P3, as described above, but with the current values for the speed of the variable speed pump 1038, outlet water temperature 1052, and inlet water temperature 1050 at the second start time $T_{start2}$ as the initial starting values, and according to the new heating operating.

In addition to the foregoing, the required flow for scheduled or user selected pool operations, e.g., water features/lighting, cleaning, chlorination, filtration status, pool occupancy, etc., can be prioritized by the heater 1014 when setting the maximum allowed operating level 1054*b* of the pump 1038, the minimum allowed operating level 1056 of the pump 1038, and the current operating level of the pump 1038. For example, if a pool operation or component requiring a minimum amount of flow from the pump 1038 is engaged when the heater 1014 is activated, then the heater 1014 can set the minimum allowed operating level 1056 of the pump 1038 for the process of FIGS. 17A and 17B to be no less than what is required by that engaged pool operation or component. Additionally, the heater 1014 can confirm that the pump 1038 is providing the minimum required flow early in the heater cycle, e.g., at the first start time $T_{start}$, and can do so using float switches and/or pressure switches to provide flow confirmation redundancy. That is, the heater 1014 can confirm that an adequate amount of water flow is passing there through prior to operation.

Additionally, the heater 1014 can take into account various characteristics specific to a chosen mode of operation for the heater 1014, e.g., "silent" mode, "green" mode, "setback" mode, "fast heat" mode, "comfort" mode, etc., as well as other requirements of the pool or spa that might supersede, e.g., a required turnover rate, when setting the maximum allowed modulation rate 1054*a* of the heater 1014, the maximum allowed operating level 1054*b* of the pump 1038, the minimum allowed operating level 1056 of the pump 1038, the outlet water temperature setpoint 1058, and the pool/spa water temperature setpoint 1060.

As one example, set point overshoot minimization, which is discussed in connection with FIGS. 2-5, can be further enhanced when the modulating heater 1014 is in communication with and can control the variable speed pump 1038. As previously described, each mode of operation can have an associated target temperature setting (Tsp), e.g., pool/spa water temperature setpoint 1060, and an allowable overshoot (OS) criteria, which is the maximum allowable deviation from the target temperature setting (Tsp). By allowing the modulating heater 1014 to communicate with the variable speed pump 1038, the modulating heater 1014 can not only adjust its modulation rate to reduce the energy delivered to the pool/spa water as the pool/spa water approaches the setpoint temperature, but can also adjust the speed of the pump 1038 to change the pool water flow rate and further increase set point response and accuracy. That is, the amount of heat being transferred to the pool/spa water can be controlled by adjusting both the heater 1014 modulation rate and the speed of the variable speed pump 1038, which allows for more precise control over the temperature of the water exiting the heater 1014. This can be implemented, for example, in the third period $P_3$ of FIGS. 17A and 17B as the inlet water temperature 1050 is increasing to the pool/spa water temperature setpoint 1060.

Additionally, the amount of allowable overshoot for each mode of operation can be adapted in view of this dual control functionality. For example, if the system 1000 is operating in "comfort" mode, which would necessitate minimal temperature overshoot and low pump speeds, then the heater 1014 could instruct the pump 1038 to operate at a lower speed as the pool/spa water temperature 1050 approaches the pool/spa water temperature setpoint 1060 in order to provide a constant supply of water having a uniform temperature, e.g., to an aquatic zone with the most swimmers. As another example, if the system 1000 is operating in "quiet" mode, then the heater 1014 could instruct the pump 1038 to slow down to the minimum allowed operating level 1056 as the pool/spa water temperature 1050 nears the pool/spa water temperature setpoint 1060 in order to provide the design specified minimum flow rate while also reducing the amount of noise generated by the pump 1038. This can occur, for example, in the third period $P_3$ of FIGS. 17A and 17B. For example, instead of operating the pump 1042 at the maximum allowed operating level 1054b as the pool/spa water temperature 1050 nears the pool/spa water temperature setpoint 1060, the heater 1014 could instruct the pump 1038 to operate at a lower level in order to satisfy the requirements of the mode of operation, while also providing sufficient water flow to cause the pool/spa water temperature 1050 to increase to the setpoint 1060.

Moreover, the system 1000 can be configured such that one or more settings, e.g., the maximum allowed modulation rate 1054a of the heater 1014, the maximum allowed operating level 1054b of the pump 1038, the minimum allowed operating level 1056 of the pump 1038, the outlet water temperature setpoint 1058, and the pool/spa water temperature setpoint 1060, can be tied to and dictated by the mode of operation. In such configurations, the other settings can also be bound by these setting(s) in order to ensure that the heater 1014 operates safely and effectively. For example, if a user selects the "comfort" mode heating mode of operation, then the low pump speed required by that mode can be the controlling setting. In particular, the minimum allowed pump speed 1056 set by the heater 1014 would be dictated by the minimum allowed pump speed required by the "comfort" mode of heating. However, since the minimum allowed pump speed 1056 is now set to a relatively low level in accordance with the "comfort" mode of heating, the maximum permitted modulation rate 1054a of the heater 1014 would also have to be adjusted to account for that minimum speed. As such, the maximum permitted modulation rate 1054a would be reduced to a level that is safe for operation of the heater 1014 when the pump 1038 is operating at the minimum allowed pump speed 1056, e.g., as is the case in the first time period $P_1$. Therefore, the modulation rate of the heater 1014 is bound by the flow rate required of the "comfort" heating mode of operation.

As previously discussed, the minimum allowed operating level 1056 of the pump 1038 can be set in order to optimize or account for pool volume turnover requirements. However, it should be also understood that the required turnover rate can also control with respect to settings for a selected heating mode of operation, e.g., the maximum allowed modulation rate 1054a of the heater 1014, the maximum allowed operating level 1054b of the pump 1038, the minimum allowed operating level 1056 of the pump 1038, the outlet water temperature setpoint 1058, and the pool/spa water temperature setpoint 1060. For example, if the heating mode of operation is "comfort" mode, then the modulation rate of the heater 1014 when operating in that mode would be tied to the minimum allowed operating level 1056 of the pump 1038 required to satisfy turnover requirements. As another example, if the heating mode of operation is "quiet" mode, which necessitates a low pump speed to reduce pump noise, then the pump speed could be slowed to provide the minimum flow necessary to satisfy the turnover requirements and then adjusted to the minimum pump speed specified for "quiet" mode when appropriate.

Additionally, it should be understood that some portions, e.g., one or more heater or pump operations, of the process shown and described in connection with FIGS. 17A and 17B can be performed by a fixed output heater or a two-speed pump. For example, the heater operations occurring during the first time period $P_1$ and the second time period $P_2$ can be performed by a fixed output heater, while the pump operations occurring during the first time period $P_1$ and the second time period $P_2$ can be performed by a two-speed pump. In this regard, the maximum allowed heater operating level 1054a can be set to the output of the fixed output heater, and the fixed output heater can be operated at its fixed output for the first time period $P_1$ and the second time period $P_2$. Similarly, the minimum pump operating level 1056 can be set to a first speed of the two-speed pump and the maximum pump operating level 1054b can be set to the second speed of the two-speed pump. Accordingly, the two-speed pump can be operated at the first speed during the first time period $P_1$ and ramped up to the second speed during the second time period $P_2$.

Figure 18:
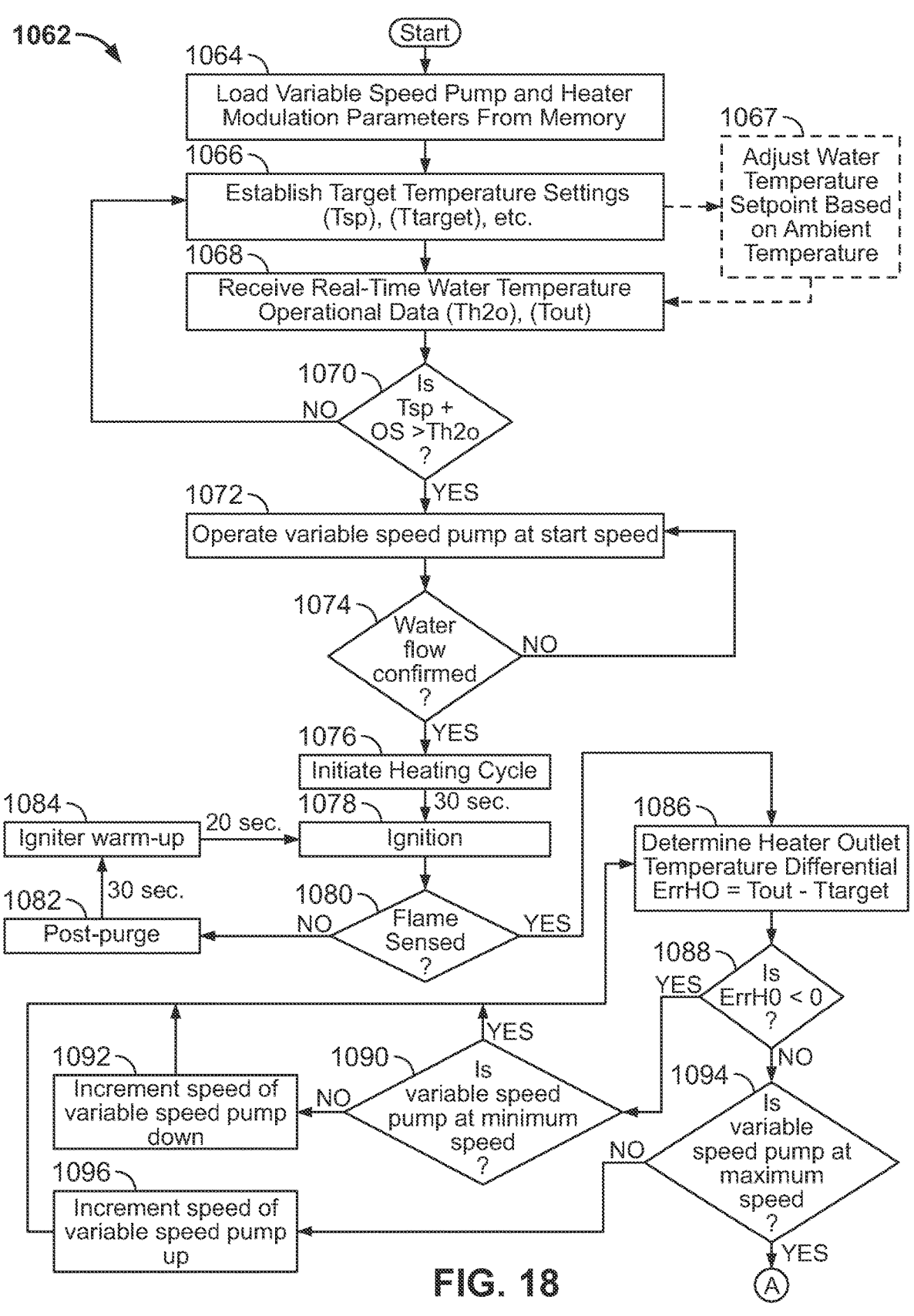
FIG. 18 is a flowchart illustrating process steps carried out by the system of the present disclosure for optimizing a modulation rate of a modulating heater and a speed of a variable speed pump for one or more modes of operation.
Figure 18:
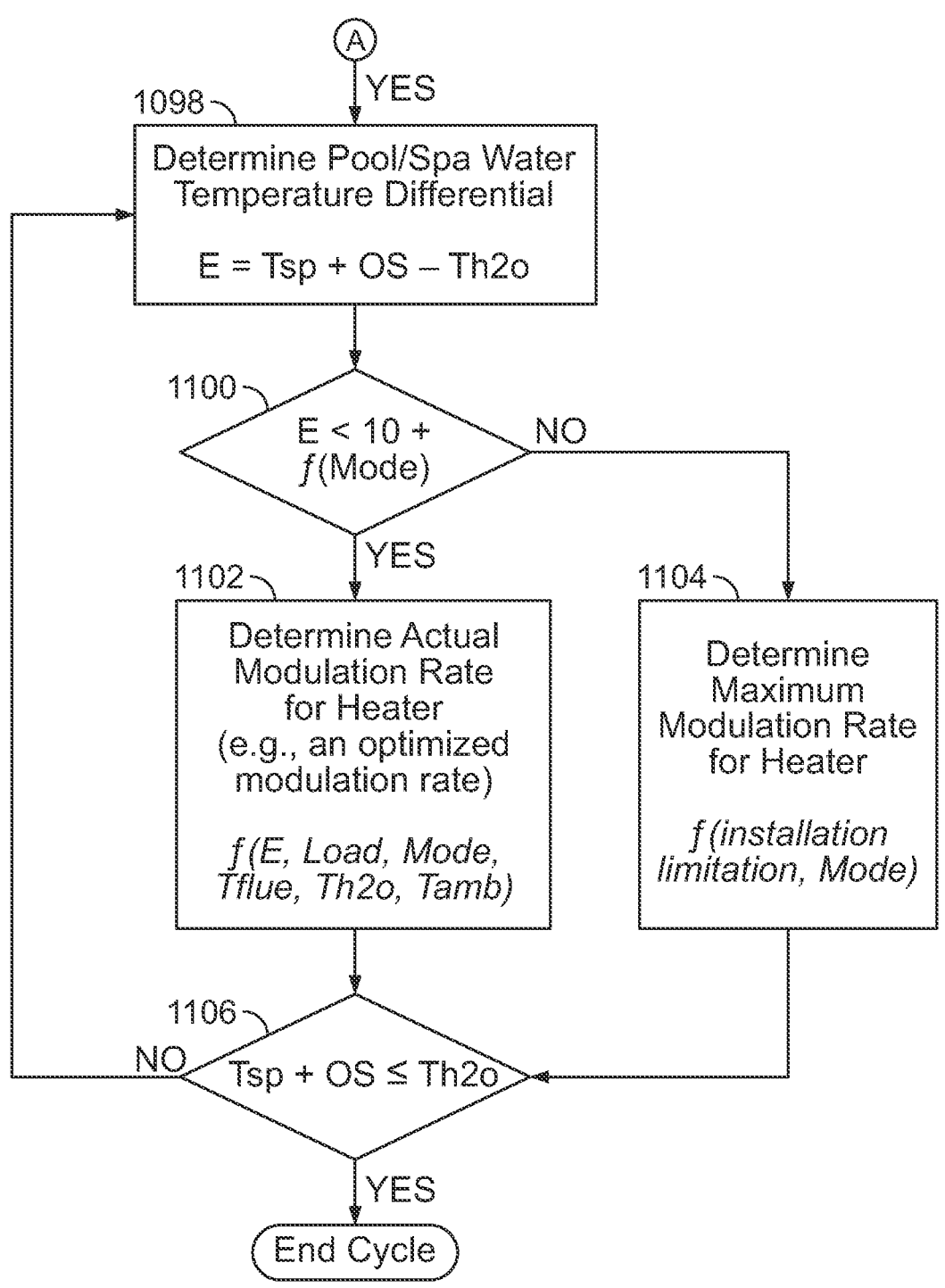

FIG. 18 is a flowchart illustrating process steps 1062 carried out by the system 1000 of the present disclosure for optimizing the modulation rate of the modulating heater 1014 and the speed of the variable speed pump 1038 for one or more modes of operation (e.g., "silent mode," "green mode," etc.) In step 1064, the system 1000 loads the variable speed pump 1038 and heater 1014 modulation parameters from memory for the given mode of operation. This can include maximum modulation rate, minimum modulation rate, maximum pump speed, minimum pump speed, setpoint overshoot settings (OS), etc. Additionally, these parameters can include other system aspects related to, for example, required turnover rates and corresponding pumps speeds associated therewith. Step 1064 also provides for temperature setpoint overshoot minimization for the given mode of operation, as previously discussed in connection with FIG. 17. In particular, by having knowledge of the heater modulation rate and pump speed, as well as capability of controlling both the modulating heater 1014 and the variable speed pump 1038, the system 1000 is capable of adjusting the heater 1014 modulation rate and speed of the variable speed pump 1038 to increase set point response and accuracy, and minimize overshoot of the temperature setpoint. This can be achieved, for example, by utilizing a PID control loop algorithm with auto-tuning for stable pool/spa water temperature (Th2o) control. Additionally, the system 1000 can adapt the setpoint overshoot setting (OS), e.g., the amount of acceptable overshoot, based on the mode of operation by controlling both the heater 1014 modulation rate and the speed of the variable speed pump 1038. For example, if the mode of operation is "comfort" mode then the heater 1014 could reduce the pump 1038 speed to provide a constant supply water temperature to the most populated aquatic zone as the heater 1014 nears the heater outlet water temperature setpoint or as the pool/spa water temperature (Th2o) nears the pool/spa water temperature setpoint. As another example, if the mode of operation is "quite" mode then the heater 1014 could reduce the pump 1038 speed to provide the design specified minimum flow rate as the heater outlet water temperature (Tout) nears the heater outlet water temperature setpoint (Ttarget) or as the pool/spa water temperature (Th2o) nears the pool/spa water temperature setpoint (Tsp).

In step 1066, the system 1000 establishes target temperature settings for one or more modes of operation, which can be pre-programmed, or user-defined, setpoints for the pool or spa water. For example, the user can specify an "in-use" target temperature setting for use with heater modes when the pool or spa is in use (Tsp) and a "not in-use" target temperature setting for use with heater modes when the pool or spa is not in use (Tspu). The system 1000 can also establish the heater outlet water temperature setpoint (Ttarget), e.g., based on the pool/spa water target temperature setting (Tsp). The user could also specify individual target temperature settings for use with each individual mode of operation (e.g., Tspecon, Tspsetback, Tspsilent, etc.) Optionally, in step 1067, the system 1000 can adjust the water temperature setpoint (Tsp) for an active mode of operation based on the current ambient temperature (Tamb), or other environmental conditions, at the pool or spa installation. For example, the system 1000 can determine an adjusted temperature setpoint (Tsp') for a given mode of operation based on pertinent variables, such as, Tsp, K, and Tamb, given the equation Tsp'=Tsp×K/Tamb, where Tsp is an initial temperature setpoint for the given mode of operation (e.g., specified by the user), K is a constant, and Tamb is the ambient temperature. Accordingly, the adjusted temperature setpoint (Tsp') is inversely proportional to the ambient temperature (Tamb) and, as such, decreases as the ambient temperature increases and increases as ambient temperature decreases, thereby providing a more comfortable user experience. The adjusted temperature setpoint (Tsp') could be used in place of Tsp.

In step 1068, the system 1000 receives real-time data of the pool/spa water temperature (Th2o) and the heater outlet water temperature (Tout). The pool/spa water temperature (Th2o) can be provided by, for example, a temperature sensor at the inlet pipe of the heater 1014, which is generally representative of the overall temperature of the pool/spa water. Alternatively, one or more temperature sensors could be disposed within the pool or spa and provide real-time data of the pool/spa water temperature (Th2o). The heater outlet water temperature (Tout) can be provided by a temperature sensor at the outlet pipe of the heater 1014. In step 1070, the system 1000 determines if the target temperature setting (Tsp) plus the allowable overshoot (OS) criteria for the given mode of operation (e.g., maximum allowable deviation from the target temperature setting (Tsp)) is greater than the real-time pool/spa water temperature (Th2o) received in step 1068. As such, step 1070 can be expressed as the equation: Tsp+OS>Th2o. If a negative determination is made in step 1070, e.g., the current pool/spa water temperature (Th2o) is greater than the target temperature setting (Tsp) plus the allowable overshoot (OS) criteria, then the process 1062 returns to step 1066. If a positive determination is made in step 1070, e.g., the current pool/spa water temperature (Th2o) is less than the target temperature setting (Tsp) plus the allowable overshoot (OS) criteria, then the process 1062 advances to step 1072.

In step 1072, the system 1000, e.g., the heater 1014 of the system 1000, instructs the variable speed pump 1014 to operate at an established start speed. This step can correspond to the start time $T_{start}$ of FIGS. 17A and 17B. The process 1062 then proceeds to step 1074 where the system 1000 confirms that water is flowing through the heater 1014. In this regard, the system 1000 can include one or more sensors, e.g., float switches, pressure switches, flow meters, etc., at the inlet and/or outlet of the heater 1014 that provide real time data as to the flow through the heater 1014. If the system 1000 confirms that water is flowing through the heater 1014, then the process 1062 proceeds to step 1076, but if the system 1000 does not confirm that water is flowing through the heater 1014 then the process 1062 returns to step 1072 and the system 1000 once again instructs the variable speed pump 1014 to operate at an established start speed. It should be understood that the process 1062 can exit and the system 1000 can issue an error if a negative determination is made in step 1074 more than a predetermined number of times. Steps 1072 and 1074 function as an interlock between the heater 1014 and the pump 1038, and provide flow confirmation redundancy by having the heater 1014 confirm the pump flow early in the heater cycle. That is, the system 1000 allows the heater 1014 to confirm that the pump 1038 is actually providing water flow through the heater 1014, and thus it is safe for the heater 1014 to operate. The system 1000 could also be configured, and the process 1062 modified, to permit the heater 1014 to not only confirm that water flow is present, but also that the water flow is sufficient for the heater 1014 to operate at the active desired modulation rate or heating capacity.

Upon confirming that there is water flow through the heater 1014, the process 1062 proceeds to step 1076 where the heating cycle is initiated for the heater 1014. After a predetermined period of time, e.g., 30 seconds, the process 1062 proceeds to step 1078 and the heater 1014 begins ignition procedure by activating its igniter to cause gas discharged into a combustion chamber to ignite. In step 1080, the heater 1014 determines if a flame is sensed, e.g., utilizing a flame sensor, to confirm that ignition was successful. If a negative determination is made, then the process 1062 proceeds to step 1082 where the heater 1014 performs a post-purge procedure for a predetermined period of time, e.g., 30 seconds, in which it purges all gas from its ignition chamber. In step 1084, the heater 1014 warms-up the igniter for a predetermined period of time, e.g., 20 seconds, in preparation for re-attempting ignition. In step 1078, the heater 1014 attempts ignition once again. It should be understood that if the heater 1014 fails ignition a set number of times, then the process 1062 can end, and the heater 1014 can lockout and display an error condition to the user.

If a positive determination is made in step 1080, e.g., a flame is sensed, the process 1062 proceeds to step 1086 where the system 1000 determines a heater outlet temperature differential (ErrHO), which is calculated as the heater outlet water temperature (Tout) minus the heater outlet water temperature setpoint (Ttarget). In step 1088, the system 1000 determines if the heater outlet temperature differential (ErrHO) is less than 0. If a positive determination is made in step 1088, and thus the heater outlet water temperature (Tout) has not yet reached the heater outlet water temperature setpoint (Ttarget), then the process 1062 advances to step 1090 where the system 1000 determines if the variable speed pump 1038 is at the minimum pump speed loaded during step 1064, which can be the minimum allowed operating level 1056 shown and described in connection with FIG. 17A. If a positive determination is made in step 1090, then the process 1062 returns to step 1086. If a negative determination is made in step 1090, then the process 1062 proceeds to step 1092 and the system 1000, e.g., the heater 1014, instructs the variable speed pump 1038 to increment its speed down and returns to step 1086. Accordingly, the system 1000 continually instructs the variable speed pump 1038 to increment its speed down until either the variable speed pump 1038 is operating at its minimum allowed operating level 1056 or the heater outlet temperature differential (ErrHO) is equal to or greater than 0. Additionally, the system 1000 maintains the variable speed pump 1038 at the minimum allowed operating level 1056 until the heater outlet temperature differential (ErrHO) is equal to or greater than 0, which will result in a negative determination in step 1088.

Upon making a negative determination is in step 1088, e.g., once the heater outlet water temperature (Tout) is equal to or greater than the heater outlet water temperature setpoint (Ttarget), and thus the heater outlet temperature differential (ErrHO) is equal to or greater than 0, the process 1062 proceeds to step 1094 where the system 1000 determines if the variable speed pump 1038 is operating at the maximum allowed operating level 1054b. If a negative determination is made, then the process 1062 proceeds to step 1096 in which the system 1000, e.g., the heater 1014, instructs the variable speed pump 1038 to increment its speed up and returns to step 1086. Accordingly, the system 1000 continually instructs the variable speed pump 1038 to increment its speed up until the variable speed pump 1038 is operating at its maximum allowed operating level 1054b. Once the variable speed pump 1038 is operating at its maximum allowed operating level 1054b and a positive determination is made in step 1094, the process 1062 proceeds to step 1098.

Steps 1086-1096 could be understood to occur during the first time period $P_1$ and second time period $P_2$ of FIGS. 17A and 17B, with steps 1090 and 1092 corresponding to the adjustment of the pump speed 1046 down to the minimum allowed operating level 1056 in the first time period $P_1$ of FIG. 17A and steps 1094 and 1096 corresponding to the ramping up of the pump speed 1046 to the maximum allowed operating level 1054b in the second time period $P_2$ of FIG. 17A. Additionally, the first instance of step 1094 could be understood to correspond to the first time $T_1$ of FIG. 17A, e.g., the start of the second time period $P_2$ in which the speed of the variable speed pump 1038 is continually ramped up until it reaches maximum allowed operating level 1054b, while the point in time at which a positive determination is made in step 1094 could be understood to correspond to the second time $T_2$ of FIG. 17A and the start of the third time period $P_3$.

In step 1098, the system 10 determines the error (E), e.g., pool/spa water temperature differential, of the heater 1014 for the current mode of operation utilizing the following equation: E=Tsp+OS−Th2o. Accordingly, the error (E) is essentially the difference between the target temperature setting (Tsp) plus the allowable overshoot (OS) criteria and the current pool/spa water temperature (Th2o). In step 1100, the system 1000 determines if the error (E) is less than ten (10), or some other predetermined amount, plus a target error for the given mode of operation f(mode), given the equation: E<10+f(mode).

If a positive determination is made in step 1100, then the process advances to step 1102, where the system 1000 determines an actual modulation rate for the heater 1014, which can be, for example, a minimum modulation rate or an optimized modulation rate, based on a function of pertinent variables, such as, E, Load, Mode, Tflue, Th2o, and Tamb-f(E, Load, Mode, Tflue, Th2o, Tamb), where E is the current error of the heater 1014, Load is the current load of the heater 1014, Mode refers to one or more (e.g., user defined) parameters related to the current mode of operation (e.g., max modulation rate of 85% in "silent mode"), Tflue is the temperature of the exhaust flue of the heater 1014, Th2o is the current pool/spa water temperature, and Tamb is the ambient temperature at the pool or spa installation. Step 1102 provides for the actual, e.g., desired, modulation rate of the heater 1014 for the current mode of operation for the system 1000 and can include one or more of: modulation step sizing and ramp up response speed, which provide for adaptive performance modifications and system response linearization; a load dump zone, which is a safety feature to protect the user and the heater 1014 from over-temperature conditions if modulation steps or ramp rates become excessive; automatic altitude compensation, which utilizes information related to the altitude of the pool or spa installation to establish the minimum and maximum heater modulation rates; and automatic fuel identification and/or switching, which generates a thermal ignition profile including flue temperature, ambient temperature, and ignition rate(s) to determine if the heater 1014 is connected to a natural or propane gas supply. Step 1102 can be performed substantially in the same fashion as step 114 previously described in connection with FIGS. 2 and 4, and can involve substantially the same sub-steps, e.g., steps 128, 130, 132, and 134 of FIG. 4, all of which can be performed by the system 1000 in connection with performing step 1102 of process 1062. Accordingly, it should be understood that FIG. 4 and the corresponding description thereof, including the previous discussion relating to steps 114, 128, 130, 132, and 134, is equally applicable to step 1102 and need not be repeated, but instead reference is made thereto and such is incorporated herein.

If a negative determination is made in step 1100, then the process advances to step 1104, where the system 1000 determines the maximum modulation rate for the heater 1014, based on a function of pertinent variables, such as, Installation Limitation, and Mode-f(Installation Limitation, Mode), where Installation Limitation refers to one or more of hardware and user-defined limitations related to the modulating heater system 1000, such as, but not limited to, maximum output (e.g., BTUs) of a particular modulating heater unit (e.g., heater 1014), available fuel supply (e.g., flow rate of natural gas or liquefied petroleum (LP) gas), elevation of the pool or spa installation, etc., and Mode refers to one or more (e.g., user defined) parameters or limitations related to the current mode of operation (e.g., max modulation rate of 85% in "silent mode").

Step 1104 provides for the maximum modulation rate of the heater 1014 (e.g., maximum capacity) for the current mode of operation and can include one or more of the following functions: flue temperature scaling, which utilizes information from a flue temperature sensor and a water return (e.g., inlet) temperature sensor for heat exchanger protection; set back recovery, where greater deviations between the setback temperature setpoint (Tspu) and the water temperature setpoint (Tsp) provide for larger allowable overshoot (OS) settings, modulation steps, and modulation ramp rates; a momentary system boost (e.g., "fast" heat mode), which can override of a system setback mode or setpoint temperature while also being integrated into other modes of operation, such as "silent" or "green" modes; heater unit capacity optimization, which utilizes an inlet gas pressure sensor, previous cycle times, and load predictions to determine the maximum capacity of the heater 1014 for a given mode of operation; a "silent" mode set back, which includes a dedicated schedule and modulation rate for the silent mode of operation and can further include "soft start" heater operation to reduce noise and instantaneous power requirements; a "green mode" efficiency optimization, including a modulation rate that is a function of both water temperature and heater flue temperature in order to achieve highest possible efficiency over time to heat and cycle optimization; and pump flow matching override, which adjusts the modulation rate and step size such that the heater 1014 capacity matches the current pump speed in order to prevent the heat exchanger from overheating. Step 1104 can be performed substantially in the same fashion as step 116 previously described in connection with FIGS. 2 and 5, and can involve substantially the same sub-steps, e.g., steps 135, 136, and 138 of FIG. 5, all of which can be performed by the system 1000 in connection with performing step 1102 of process 1062. Accordingly, it should be understood that FIG. 5 and the corresponding description thereof, including the previous discussion relating to steps 116, 135, 136, and 138, is equally applicable to step 1104 and need not be repeated, but instead reference is made thereto and such is incorporated herein.

In other words, in step 1070, the system 1000 makes a determination whether heating is required and, if a positive determination is made in step 1070, initiates operation of the variable speed pump 1038 and performs a flow confirmation process in steps 1072 and 1074. Upon confirming flow from the pump 1038, the system 1000 starts the heating cycle including confirming the presence of a flame in steps 1076-1084. Upon confirming a flame, the system 1000 in step 1086 determines the heater outlet temperature differential (ErrHO), e.g., how much lower the heater outlet water temperature (Tout) is than the heater outlet water temperature setpoint (Ttarget). Based on the determined heater outlet temperature differential (ErrHO), the system 1000 determines in step 1088 whether the speed of the variable speed pump 1038 should be reduced or increased. In particular, while the heater outlet water temperature (Tout) is less than the heater outlet water temperature setpoint (Ttarget), the system 1000, in steps 1086, 1088, 1090, and 1092, continually instructs the variable speed pump 1038 to reduce its speed until it is at the minimum allowable speed, and maintains the pump 1038 at that minimum speed until the heater outlet water temperature (Tout) is greater than the heater outlet water temperature setpoint (Ttarget), and thus the heater outlet temperature differential (ErrHO) is greater than or equal to 0. Once this is achieved, e.g., the heater outlet water temperature (Tout) is greater than or equal to the heater outlet water temperature setpoint (Ttarget), the system 1000, in steps 1086, 1094, and 1096, continually instructs the variable speed pump 1038 to increment its speed up until the variable speed pump 1038 is operating at its maximum allowed operating level 1054*b*. Once the variable speed pump 1038 is operating at its maximum allowed operating level 1054*b*, the process 1062 proceeds to step 1098 in which the system 1000 determines the error of the current heating mode of operation, e.g., how much lower the current water temperature (Th2o) is than the temperature setpoint (Tsp) plus allowable overshoot (OS). Based on the determined error, in step 1100, the system 1000 determines whether the heater 1014 should be operated at a maximum modulation rate (step 1104) for the current mode to provide increased heating or operated at a modulation rate (e.g., an actual modulation rate or an optimized modulation rate) that is less than the maximum modulation rate (step 1104). Those of ordinary skill in the art will understand that, as discussed herein, the minimum modulation rate of the pool or spa heater can be determined from a lookup table, based on the particular configuration of the pool or spa heater 1014, listed state variables, and a flame sense threshold when fired.

Finally, the process then advances to step 1106, where the system 1000 determines if the current water temperature (Th2o) is greater than or equal to the temperature set point (Tsp) plus the allowable overshoot (OS). As such, step 1106 can be expressed as the equation: Tsp+OS≤Th2o. If a positive determination is made in step 1106, then the process ends. If a negative determination is made in step 1106, then the process returns to step 1098.

In addition to the foregoing, the heater 1014 of system 1000 is capable of constant flow compensation to ensure that sufficient flow is provided at all times. In this regard, the central processing unit 1012 of the heater 1014 is capable of calculating the flow rate of water through the heater 1014 based on the operating capacity of the heater 1014 and the change in temperature of the water from the inlet of the heater 1014 to the outlet of the heater 1014. The system 1000 can then compare this calculated flow rate to an expected flow rate based on the current speed of the pump 1038. If the actual flow rate is lower than the expected flow rate, then the heater 1014 can determine a flow compensation factor, e.g., an amount of additional speed required by the pump 1038 to achieve the desired flow rate, and communicate to the pump 1038 that additional pump speed is required to satisfy the desired flow rate. In this regard, the heater 1014 can instruct the pump 1038 to increase speed or provide the pump 1038 with the flow compensation factor, which it can use to adjust its speed. This functionality can be used to compensate for the fouling of filtration equipment, use of water features, zone flow customization, pool to spa transitions, etc.

Additionally, the system 1000 can utilize the foregoing information regarding disparity between actual flow rate and expected flow rate to analyze and provide feedback in connection with filter performance. In particular, the system 1000 can use the flow compensation factor or additional required pump speed to predict filter performance and service. For example, the system 1000 can monitor the flow compensation value and as the required flow compensation increases over time, the system 1000, e.g., the heater 1014, could alert a user to backflush the filter, replace a filter cartridge, or replace the filter itself. The system 1000 can also utilize the flow compensation information in combination with the heater inlet and outlet water temperatures to recognize the addition or removal of water in the pool, e.g., due to rain, evaporation, or a leak. In particular, a lower pump speed would be required to provide the desired flow rate when the pool water level is above the standard level, e.g., there is excess water in the pool, while a greater pump speed would be required to provide the desired flow rate when the pool water level is below the standard level. As such, the heater 1014 can utilize this information, including the flow compensation factor, heater inlet temperature response, and heater outlet temperature response, to predict the size of the pool or spa and to understand changes in pool water level.

Furthermore, the system 1000 is capable of spa/pool load transition management in which the system 1000 utilizes knowledge of the modulation rate of the heater 1014 and the speed of the variable speed pump 1038 to minimize changes in the water temperature and nozzle flow velocity as the system 1000 transitions from heating a pool to heating a spa, or vice versa. In this regard, upon activation of spa functionality by a user, the system 1000 will generally prioritize spa demand, e.g., spa heating and flow parameters, and adjust pool/spa valving, e.g., to redirect the flow of water to the spa, to meet the spa heating demand. During this process, the system 1000 can utilize the knowledge of the spa water temperature set point and spa water flow rate to adjust the modulation rate of the heater 1014 and vary the speed of the pump 1038 prior to transitioning to the spa, e.g., prior to adjusting the valving to redirect the flow of water to the spa. Thus, providing a more comfortable transition from pool to spa mode for a user. Additionally, when transitioning from the spa to the pool, the system 1000 can perform the mechanical transition, e.g., valving adjustment, prior to adjusting the modulation rate of the heater 1014 and the speed of the pump 1038 so as to minimize temperature and spa nozzle variations.

Figure 19:
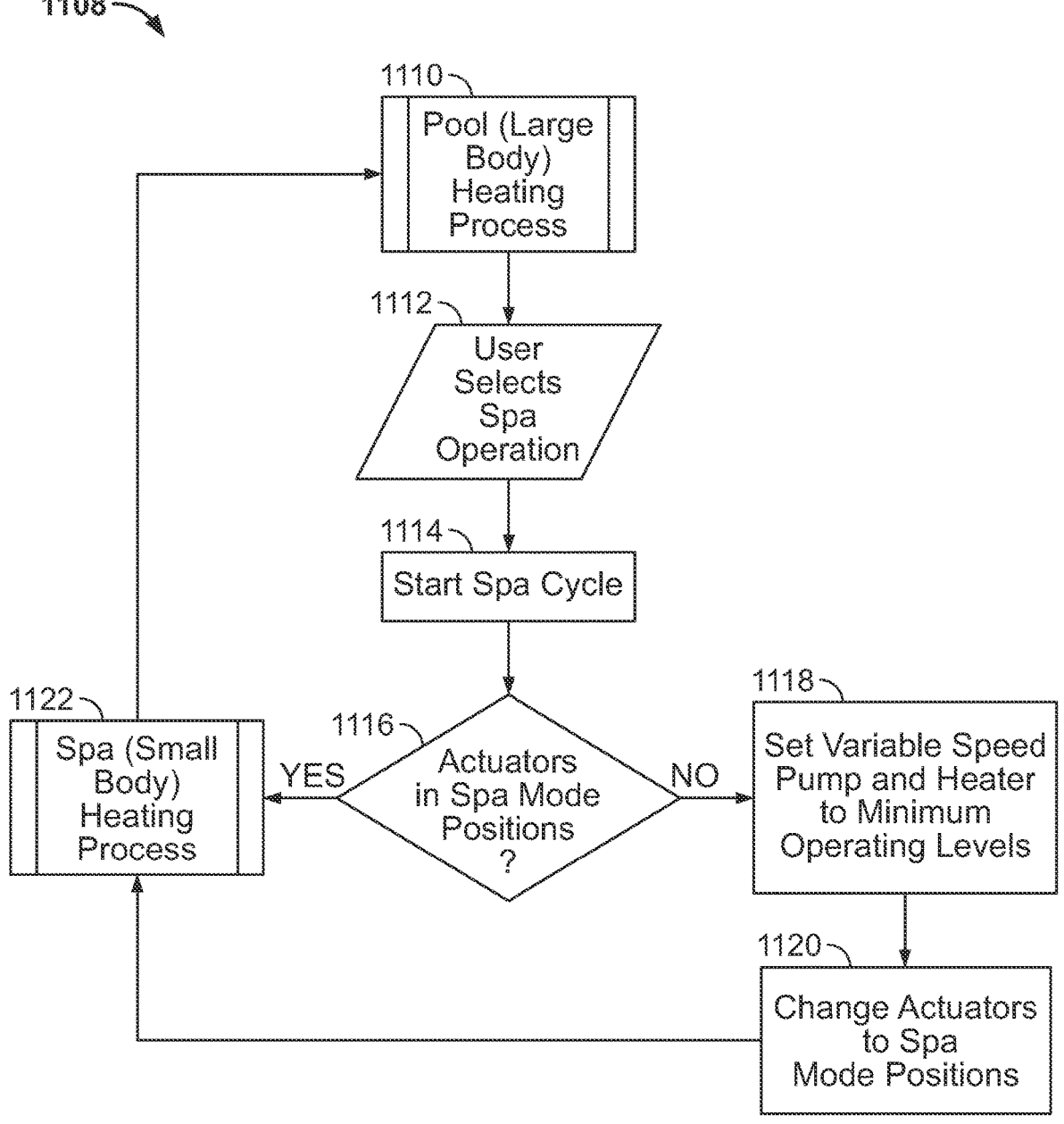
FIG. 19 is a flowchart illustrating process steps carried out by the system of the present disclosure for performing spa/pool load transition management.

FIG. 19 is a flowchart illustrating process steps 1108 carried out by the system 1000 of the present disclosure for performing spa/pool load transition management. The process 1108 starts at step 1110 with the system 1000 operating according to a standard pool (large body) heating process. This pool heating process can be in accordance with the process shown and described in connection with FIGS. 17A and 17B, or the process 1062 shown and described in connection with FIG. 18, which can be interrupted by the activation of a spa mode by the user. In step 1112, a user selects a spa operation to transition the system 1000 from operating according to the pool heating process to operating according to a spa heating process. In step 1114, the spa cycle is started, which can involve loading variable speed pump 1038 and heater 1014 modulation parameters from memory for the user selected spa operation. This can include maximum modulation rate, minimum modulation rate, maximum pump speed, minimum pump speed, setpoint overshoot settings (OS), spa water temperature set point, heater outlet water temperature setpoint, etc. Additionally, these parameters can include other system aspects related to, for example, required turnover rates and corresponding pumps speeds associated therewith.

In step 1116, the system 1000 determines if the valve actuators 1015 are in spa mode positions. That is, the system 1000 determines if the valve actuators 1015 are in a position such that they are redirecting water from the heater 1014 to the spa. If a negative determination is made in step 1116, then the system 1000, in step 1118, adjusts the modulation rate of the heater 1014 and the speed of the variable speed pump 1038 to their respective minimum operating levels for spa mode. In step 1120, the system 1000 changes the valve actuators 1015 to their spa mode positions so that they redirect water provided by the heater 1014 to the spa. That is, the system 1000 starts operating the heater 1014 and the pump 1038 according to the spa mode prior to adjusting the valve actuators 1015 to spa mode.

Once the valve actuators 1015 have been switched to their spa mode positions, the process proceeds to step 1122 in which the system 1000 proceeds with operating the heater 1014 according to the spa heating process. In this regard, the spa heating process can be substantially similar to process 1062 shown and described in connection with FIG. 18, as well as the process shown and described in connection with FIGS. 17A and 17B, but with the spa heating parameters being utilized. Alternatively, if a positive determination is made in step 1116, then the process 1062 proceeds to step 1122 in which the system 1000 proceeds with operating the heater 1014 according to the spa heating process. Once the spa heating process of step 1122 is completed, e.g., the user deactivates spa heating mode, the system returns to the pool heating process of step 1110 and operates according thereto.

Accordingly, the system 1000 utilizes the knowledge of the spa set point data and flow rate data to adjust the modulation rate of the heater 1014 and the speed of the pump 1038 prior to transitioning the valving to spa mode in order to minimize the temperature and nozzle flow velocity changes as the system 1000 transitions to spa mode, e.g., from heating the pool to heating the spa.

Additionally, when the system 1000 transitions back to pool mode, e.g., when process 1108 returns to step 1110, the system 1000 could adjust the valving prior to adjusting the heater modulation rate and pump speed for pool mode in order to minimize temperature and nozzle variations in the spa. Moreover, the system 1000 can use the knowledge of the heater 1014 modulation levels and capabilities of the variable speed pump 1038 to minimize the temperature and nozzle flow velocity changes as the system 1000 is meeting the heating requirements of the spa, e.g., as the system 1000 is operating according to the spa heating process in step 1122. It would be advantageous for this control method to control the modulation rate of the heater 1014 and the speed of the pump 1038 based on the heater outlet water temperature to minimize overshoot of the spa water temperature setpoint. Additionally, the difference between the spa water temperature setpoint and the heater outlet water temperature setpoint can be adjusted for comfort (e.g., to minimize temperature fluctuations and overshoot, etc.), performance (e.g., efficiency, etc.), and recovery from a setback temperature (e.g., the water temperature from a period of time when the pool or spa is not being used). Still further, if the heater 1014 is being operated at an appropriate modulation rate to achieve the desired spa temperature, but the heater outlet water temperature and pump speed cannot be controlled within an acceptable level of stability, then the system 1000 can adjust the valving to use the pool as a dump zone to allow for stable spa operation. In this regard, control of the heater outlet water temperature to the heater outlet water temperature setpoint can have priority over the pump speed to maximum nozzle comfort.

Figure 20:
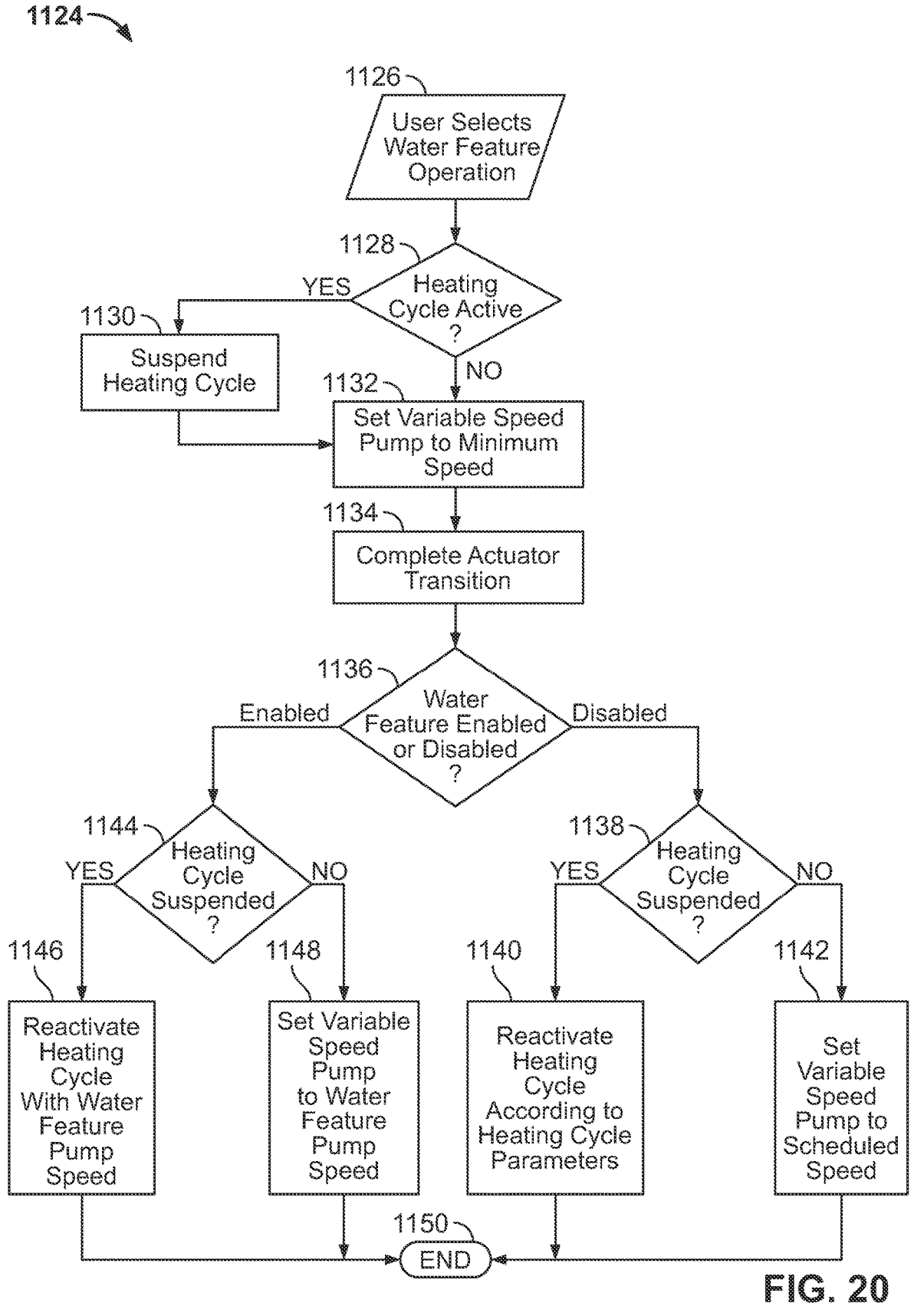
FIG. 20 is a flowchart illustrating process steps carried out by the system of the present disclosure for controlling valve actuators upon selection of a water feature operation to reduce heater temperature fluctuations.

The system 1000 can also suspend heating operations when driving valve actuators 1015 upon activation of a pool feature in order to reduce heater temperature fluctuations. In this regard, FIG. 20 is a flowchart illustrating process steps 1124 carried out by the system 1000 of the present disclosure for controlling valve actuators 1015 upon selection of a water feature operation to reduce heater temperature fluctuations. In step 1126, a user enables or disables a water feature operation, which can be, for example, a water fall feature, a laminar jet feature, etc. In step 1128, a determination is made as to whether a heating cycle is currently active. If a positive determination is made in step 1128, then the process 1124 proceeds to step 1130 in which the system 1000 suspends the heating cycle, and then proceeds to step 1132. If a negative determination is made in step 1128, e.g., a heating cycle is not active, then the process proceeds to step 1132. In step 1132, the system 1000 sets the speed of the variable speed pump 1038 to the minimum speed, and then proceeds to step 1134. In step 1134, the valve actuators 1015 complete their transition based on the user selection from step 1126. Accordingly, the system 1000 ensures that there is no heating cycle active and the variable speed pump 1038 is set to the minimum speed prior to transitioning the valve actuators 1015, e.g., to enable or disable the water feature operation.

Once the valve actuator transition is completed, the process 1124 proceeds to step 1136 in which it is determined whether the user selection was to enable or disable the water feature. One purpose of step 1136 is to determine whether the variable speed pump requirement of a water feature needs be taken into account. In particular, if the water feature operation was disabled, then the pump requirements of that water feature operation no longer need to be considered for the mode of heating, however, if the water feature operation was enabled, then the pump requirements of that water feature operation need to be considered for the mode of heating.

If it is determined in step 1136 that the user's selection was to disable the water feature, then the process 1124 proceeds to step 1138 in which it is determined whether a heating cycle has been suspended, e.g., in step 1130. If a positive determination is made in step 1138, e.g., a heating cycle was suspended, then in step 1140 the system 1000 reactivates the heating cycle according to the previous heating cycle parameters and proceeds to the process end 1150. That is, the heating cycle can be reactivated without consideration of the pump speed required by the water feature because the water feature is no longer active. If a negative determination is made in step 1138, e.g., a heating cycle was not suspended, then in step 1142 the system 1000 sets the variable speed pump 1038 to the scheduled speed without activating a heating cycle, and then proceeds to the process end 1150.

If it is determined in step 1136 that the user's selection was to enable the water feature, then the process 1124 proceeds to step 1144 in which it is determined whether a heating cycle has been suspended, e.g., in step 1130. If a positive determination is made in step 1144, e.g., a heating cycle was suspended, then in step 1146 the system 1000 reactivates the previously suspended heating cycle, but with variable speed pump speed parameters required by the water feature instead of the heating cycle variable speed pump parameters. That is, the speed of the variable speed pump 1038 during the reactivated heating cycle is dictated by the flow and pump speed requirements of the water feature to ensure that the water feature operates correctly. Additionally, the modulation rate of the heater 1014 during the reactivated heating cycle will be dictated by the pump speed required by the water feature. The process 1124 then proceeds to the process end 1150. If a negative determination is made in step 1144, e.g., a heating cycle was not suspended, then in step 1148 the system 1000 sets the variable speed pump 1038 to the speed required by the water feature, and then proceeds to the process end 1150.

Figure 21:
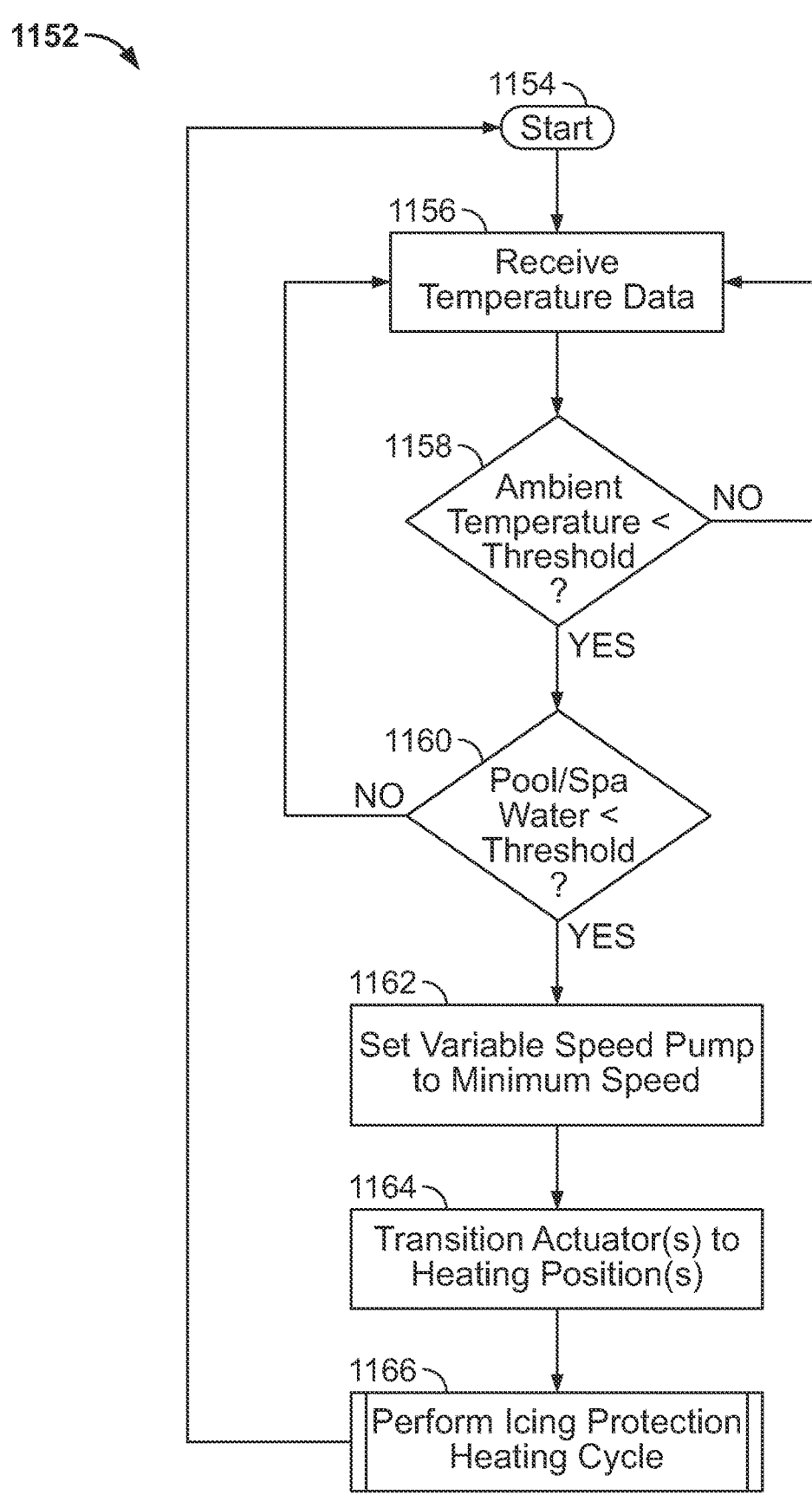
FIG. 21 is a flowchart illustrating process steps carried out by the system of the present disclosure for performing icing protection.

FIG. 21 is a flowchart illustrating process steps 1152 carried out by the system 1000 of the present disclosure for performing icing protection. The process 1152 can be carried out by the system 1000 in the background The process 1152 starts in step 1154 and proceeds to step 1156 in which the system 1000 receives temperature data, which can include, for example, the temperature of the ambient air at the pool/spa and the current pool/spa water temperature. In step 1158, the system 1000 determines if the ambient temperature is less than a threshold ambient temperature value. For example, the threshold ambient temperature value can be 32 degrees Fahrenheit, or a temperature slightly above 32 degrees Fahrenheit, e.g., 36 degrees Fahrenheit. If a negative determination is made in step 1158, e.g., the ambient temperature is not less than the threshold ambient temperature, then the process returns to step 1156 for continued monitoring of the ambient temperature. In particular, a negative determination in step 1158 indicates that there is minimal or no icing/freeze risk. If a positive determination is made in step 1158, e.g., the ambient temperature is less than the threshold ambient temperature, then the process proceeds to step 1160 in which the system 1000 determines if the pool/spa water temperature is less than a threshold water temperature. For example, the threshold water temperature value can be a temperature slightly above 32 degrees Fahrenheit, e.g., 36 degrees Fahrenheit. If a negative determination is made in step 1160 then the process returns to step 1156 for continued monitoring of the ambient temperature and the pool/spa water temperature. In particular, a negative determination in step 1160 indicates that there is minimal or no icing/freeze risk. This could be due, for example, to the fact that a heating cycle is already underway and therefore further icing/freeze protection is not yet necessary.

If a positive determination is made in step 1160, the process 1152 proceeds to step 1162 in which the system 1000 sets the variable speed pump 1038 to the minimum speed. In step 1164 the system 1000 transitions the valve actuators 1015 to heating positions. In step 1166, the system 1000 starts an icing protection heating cycle, and operates the heater 1012 and variable speed pump 1038 according thereto. Upon completion of the icing protection heating cycle, the process 1152 returns to the start 1154 for continued icing protection.

Accordingly, the system 1000 can drive the valve actuators 1015 as a function of the ambient temperature during time periods when the modulating heater 1014 is off to protect against icing e.g., preventing the pool/spa pipes from freezing, and for obtaining better pool/spa temperature readings during heater off cycles.

In addition to the foregoing, the system 1000 can drive valve actuators 1015, e.g., bypass actuators, to check the alignment of the heater temperature sensors, e.g., the inlet and outlet sensors of the heater 1014, during off cycles of the heater 1014.

It should be understood that any steps of the processes shown and described in connection with FIGS. 18-21 that are described as being performed by the system 1000 could additionally and/or alternatively be performed by the heater 1014, e.g., the central processing unit 1012 thereof. That is, the central processing unit 1012 of the heater 1014 can instruct, communicate with, and control the heater 1014 itself, as well as the valve actuators 1015 and the variable speed pump 1038.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure.

All such variations and modifications, including those discussed above, are intended to be included within the scope of the disclosure.

What is claimed is:

1. A modulating heater system for a pool or spa, comprising:

a pool or spa heater in fluidic communication with water of a pool or spa, the heater capable of variably modulating energy output thereof to heat the water of the pool or spa; and a controller communicatively coupled to the pool or spa heater, the controller configured to:

determine a current mode of operation for the pool or spa heater;

establish a temperature overshoot setpoint for the current mode of operation and a target water temperature setpoint for the pool or spa water for the current mode of operation;

determine a current temperature of the pool or spa water;

determine an optimized modulation rate for the pool or spa heater for the current mode of operation;

determine a maximum modulation rate for the pool or spa heater for the current mode of operation; and control the pool or spa heater to operate at one of the optimized modulation rate and the maximum modulation rate based on the temperature overshoot setpoint for the current mode of operation, the target water temperature setpoint for the current mode of operation, and a current water temperature, wherein the controller determines the optimized modulation rate for the current mode of operation based on one or more of a determination of a current load on the pool or spa heater, a determination of whether a water flow rate through the pool or spa heater is sufficient, and baseline modulation parameters for the current mode of operation, and wherein the controller determines the maximum modulation rate for the current mode of operation based on one or more of a maximum output of the pool or spa heater and a determination of whether the water flow rate through the pool or spa heater is sufficient.

2. The system of claim 1, wherein the controller is configured to:

determine if the current water temperature is less than the temperature overshoot setpoint for the current mode of operation plus the target water temperature setpoint for the current mode of operation; and control the pool or spa heater to operate at one of the optimized modulation rate and the maximum modulation rate if the current water temperature is less than the temperature overshoot setpoint for the current mode of operation plus the target water temperature setpoint for the current mode of operation.

3. The system of claim 1, wherein the controller is configured to:

confirm the presence of a flow of water through the heater prior to operating the heater.

4. The system of claim 1, wherein the controller is configured to control a variable speed pump in fluidic communication with the heater.

5. The system of claim 4, wherein the controller is configured to:

establish variable speed pump parameters based on the current mode of operation; and establish heater modulation parameters based on the current mode of operation.

6. The system of claim 4, wherein the controller is configured to:

establish a heater outlet water temperature setpoint; and determine a current heater outlet water temperature of water at an outlet of the heater.

7. The system of claim 6, wherein the controller is configured to:

control a modulation rate of the heater and a speed of the variable speed pump based on a difference between the heater outlet water temperature setpoint and the current heater outlet water temperature.

8. The system of claim 7, wherein the controller is configured to:

instruct the variable speed pump to operate at a minimum allowable speed for the current mode of operation if the current heater outlet water temperature is less than the heater outlet water temperature setpoint.

9. The system of claim 7, wherein the controller is configured to:

instruct the variable speed pump to increase speed until operating at a maximum allowable speed for the current mode of operation if the current heater outlet water temperature is greater than the heater outlet water temperature setpoint.

10. The system of claim 9, wherein the controller is configured to:

adjust the modulation rate of the heater while the variable speed pump is operating at the maximum allowable speed for the current mode of operation to cause the current water temperature to gradually approach the target temperature setpoint for the pool or spa water and minimize overshoot.

11. The system of claim 1, wherein the controller is enclosed within a housing of the modulating pool or spa heater.

12. The system of claim 1, wherein the controller is a local pool or spa control system, or a cloud-based pool or spa control system.

13. The system of claim 1, wherein the current mode of operation is determined based on a user input.

14. The system of claim 1, wherein the controller is configured to determine an initial thermal load and the temperature overshoot setpoint for the current mode of operation based on one or more of a predicted load of the pool or spa heater, an actual load of the pool or spa heater from a previous cycle, an estimation of pool or spa occupancy, the current temperature of the pool or spa water, and a current ambient air temperature at the pool or spa.

15. The system of claim 1, wherein the controller is configured to determine the target water temperature setpoint for the current mode of operation based on whether the current mode of operation is a mode of operation where the pool or spa is in-use or a mode of operation where the pool or spa is not in-use.

16. The system of claim 1, wherein the controller is configured to:

determine an error value based on the temperature overshoot setpoint for the current mode of operation, the target water temperature setpoint for the current mode of operation, and the current water temperature; and control the pool or spa heater to operate at one of the optimized modulation rate and the maximum modulation rate based on the error value.

17. The system of claim 16, wherein the controller is configured to:

determine if the error value is less than a target error value for the current mode of operation;

instruct the pool or spa heater to operate at the optimized modulation rate for the pool or spa heater when the error value is less than the target error value for the current mode of operation; and instruct the pool or spa heater to operate at the maximum modulation rate for the pool or spa heater when the error value is greater than the target error value for the current mode of operation.

18. The system of claim 17, wherein the error value is calculated as the temperature overshoot setpoint for the current mode of operation plus the target water temperature setpoint for the current mode of operation minus the current water temperature.

19. The system of claim 1, wherein the determination of the current load on the pool or spa heater is based on one or more of the current water temperature, an ambient temperature, a size of the pool or spa, and a desired cycle time to heat the pool or spa.

20. The system of claim 1, wherein the maximum output of the pool or spa heater is based on one or more of a maximum thermal output of the pool or spa heater, an available fuel supply, and an elevation of the pool or spa.

21. The system of claim 1, wherein the pool or spa heater is a gas heater.

22. The system of claim 1, wherein the controller is configured to:

receive information relating to required pool volume turnovers;

control a speed of a variable speed pump based on the information to achieve the required pool volume turnovers; and control a modulation rate of the heater based on a speed of the variable speed pump.

23. The system of claim 1, wherein the controller is configured to control a variable speed pump and at least one valve actuator, the at least one valve actuator being adjustable between a pool mode in which the at least one valve actuator adjusts an associated valve to provide water from the pump to a pool and a spa mode in which the at least one valve actuator adjusts the associated valve to provide water from the pump to a spa, and wherein the controller is configured to adjust a speed of the variable speed pump to a minimum allowable level and adjust a modulation rate of the heater to a minimum allowable level prior to transitioning the at least one valve actuator from pool mode to spa mode or from spa mode to pool mode.

24. The system of claim 1, wherein the controller is configured to control a variable speed pump and at least one valve actuator, the at least one valve actuator being adjustable between a pool mode in which the at least one valve actuator adjusts an associated valve to provide water from the pump to a pool and a water feature mode in which the at least one valve actuator adjusts the associated valve to provide water from the pump to a water feature, and wherein the controller is configured to suspend a current heating cycle and adjust a speed of the variable speed pump to a minimum allowable level prior to transitioning the at least one valve actuator from pool mode to water feature mode or from water feature mode to pool mode.

25. The system of claim 24, wherein the controller is configured to:

reactivate the heating cycle after transitioning the at least one valve actuator from pool mode to water feature mode;

control the speed of the variable speed pump based on a flow requirement of the water feature; and control a modulation rate of the heater based on the speed of the variable speed pump.

26. The system of claim 1, wherein the controller is configured to:

determine a current ambient air temperature at the pool or spa;

determine if the current ambient air temperature is less than an ambient air temperature threshold;

determine if the current temperature of the pool or spa water is less than a pool or spa water threshold;

instruct a variable speed pump to operate at a predefined speed if the current ambient air temperature is less than an ambient air temperature threshold and the current temperature of the pool or spa water is less than a pool or spa water threshold;

transition at least one valve actuator into a heating position in which the at least one valve actuator adjusts an associated valve to allow water to flow from the pump to the heater after instructing the variable speed pump to operate at the predefined speed; and operate the heater according to an icing protection heating cycle.

27. The system of claim 1, wherein the controller is configured to:

determine a flow rate of water through the heater;

compare the flow rate of water through the heater to an expected flow rate, the expected flow rate being based on a speed of a variable speed pump communicatively coupled to the controller; and instruct the variable speed pump to adjust its speed based on the comparison to compensate for a difference between the flow rate and the expected flow rate.

28. A method for controlling a pool or spa modulating heater, comprising the steps of:

determining a current mode of operation for the pool or spa heater with a controller communicatively coupled to the pool or spa heater, the pool or spa heater being capable of variably modulating energy output thereof to heat water of a pool or spa in fluidic communication with the heater;

establishing a temperature overshoot setpoint for the current mode of operation and a target water temperature setpoint for the pool or spa water for the current mode of operation;

determining a current water temperature of the pool or spa water;

determining an optimized modulation rate for the pool or spa heater for the current mode of operation based on one or more of a determination of a current load on the pool or spa heater, a determination of whether a water flow rate through the pool or spa heater is sufficient, and baseline modulation parameters for the current mode of operation;

determining a maximum modulation rate for the pool or spa heater for the current mode of operation based on one or more of a maximum output of the pool or spa heater and a determination of whether the water flow rate through the pool or spa heater is sufficient; and controlling the pool or spa heater to operate at one of the optimized modulation rate and the maximum modulation rate based on the temperature overshoot setpoint for the current mode of operation, the target water temperature setpoint for the current mode of operation, and the current water temperature.

29. The method of claim 28, wherein the heater is a gas heater.

30. The method of claim 28, comprising the steps of:

receiving information relating to required pool volume turnovers;

controlling a speed of a variable speed pump communicatively coupled to the controller based on the information to achieve the required pool volume turnovers; and controlling a modulation rate of the heater based on a speed of the variable speed pump.

31. The method of claim 28, comprising the steps of:

determining if the current water temperature is less than the temperature overshoot setpoint for the current mode of operation plus the target water temperature setpoint for the current mode of operation; and controlling the pool or spa heater to operate at one of the optimized modulation rate and the maximum modulation rate if the current water temperature is less than the temperature overshoot setpoint for the current mode of operation plus the target water temperature setpoint for the current mode of operation.

32. The method of claim 28, comprising the step of confirming the presence of a flow of water through the heater prior to operating the heater.

33. The method of claim 28, comprising the steps of:

establishing, with the controller, variable speed pump parameters based on the current mode of operation for a variable speed pump communicatively coupled with the controller; and establishing heater modulation parameters based on the current mode of operation.

34. The method of claim 28, comprising the steps of:

establishing a heater outlet water temperature setpoint; and determining a current heater outlet water temperature of the water at an outlet of the heater.

35. The method of claim 34, comprising the step of:

controlling a modulation rate of the heater and a speed of a variable speed pump communicatively coupled with the controller based on a difference between the heater outlet water temperature setpoint and the current heater outlet water temperature.

36. The method of claim 35, wherein the step of controlling a modulation rate of the heater and a speed of a variable speed pump includes:

instructing the variable speed pump to operate at a minimum allowable speed for the current mode of operation if the current heater outlet water temperature is less than the heater outlet water temperature setpoint.

37. The method of claim 35, wherein the step of controlling a modulation rate of the heater and a speed of a variable speed pump includes:

instructing the variable speed pump to increase speed until operating at a maximum allowable speed for the current mode of operation if the current heater outlet water temperature is greater than the heater outlet water temperature setpoint.

38. The method of claim 37, comprising the step of:

adjusting the modulation rate of the heater while the variable speed pump is operating at the maximum allowable speed for the current mode of operation to cause the current water temperature to gradually approach the target temperature setpoint for the pool or spa water and minimize overshoot.

39. The method of claim 28, wherein the controller is enclosed within a housing of the modulating pool or spa heater.

40. The method of claim 28, wherein the controller is a local pool or spa control system or a cloud-based pool or spa control system.

41. The method of claim 28, wherein the current mode of operation is determined based on a user input.

42. The method of claim 28, comprising the step of:

determining an initial thermal load on the pool or spa heater, wherein the initial thermal load and the temperature overshoot setpoint for the current mode of operation is based on one or more of a predicted load of the pool or spa heater, an actual load of the pool or spa heater from a previous cycle, an estimation of pool or spa occupancy, the current water temperature of the pool or spa, and a current ambient air temperature of the pool or spa.

43. The method of claim 28, wherein the step of determining the target water temperature setpoint for the current mode of operation is based on whether the current mode of operation is a mode of operation where the pool or spa is in use, or a mode of operation where the pool or spa is not in use.

44. The method of claim 28, comprising the steps of:

determining an error value based on the temperature overshoot setpoint for the current mode of operation, the target water temperature setpoint for the current mode of operation, and the current water temperature; and controlling the pool or spa heater to operate at one of the optimized modulation rate and the maximum modulation rate based on the error value.

45. The method of claim 44, comprising the steps of:

determining if the error value is less than a target error value for the current mode of operation;

instructing the pool or spa heater to operate at the optimized modulation rate for the pool or spa heater when the error value is less than the target error value for the current mode of operation; and instructing the pool or spa heater to operate at the maximum modulation rate for the pool or spa heater when the error value is greater than the target error value for the current mode of operation.

46. The method of claim 45, wherein the error value is determined as the temperature overshoot setpoint for the current mode of operation plus the target water temperature setpoint for the current mode of operation minus the current water temperature.

47. The method of claim 28, comprising the step of:

determining the current load on the pool or spa heater based on one or more of the current water temperature, an ambient temperature, a size of the pool or spa, and a desired cycle time to heat the pool or spa.

48. The method of claim 28, comprising the step of:

determining the maximum output of the pool or spa heater based on one or more of a maximum thermal output of the pool or spa heater, an available fuel supply, and an elevation of the pool or spa.

49. The method of claim 28, comprising the steps of:

determining a flow rate of water through the heater;

comparing the flow rate of water through the heater to an expected flow rate, the expected flow rate being based on a speed of a variable speed pump communicatively coupled to the controller; and

instructing the variable speed pump to adjust its speed based on the comparison to compensate for a difference between the flow rate and the expected flow rate.

50. The method of claim 28, comprising the steps of:
determining a current ambient air temperature at the pool or spa;
determining if the current ambient air temperature is less than an ambient air temperature threshold;
determining if the current temperature of the pool or spa water is less than a pool or spa water threshold;
instructing a variable speed pump to operate at a predefined speed if the current ambient air temperature is less than an ambient air temperature threshold and the current temperature of the pool or spa water is less than a pool or spa water threshold;
transitioning at least one valve actuator into a heating position in which the at least one valve actuator adjusts an associated valve to allow water to flow from the pump to the heater after instructing the variable speed pump to operate at the predefined speed; and
operating the heater according to an icing protection heating cycle.

51. The method of claim 28, comprising the steps of:
receiving an instruction to transition at least one valve actuator from a pool mode to a spa mode or from a spa mode to a pool mode, the at least one valve actuator configured to adjust an associated valve to provide water from a variable speed pump to the pool when in the pool mode and to provide water from the variable speed pump to the spa when in the spa mode;
adjusting a speed of the variable speed pump to a minimum allowable level and a modulation rate of the heater to a minimum allowable level; and
transitioning the at least one valve actuator from the pool mode to the spa mode after adjusting the speed of a variable speed pump to a minimum allowable level and the modulation rate of the heater to a minimum allowable level,
wherein the at least one valve actuator is communicatively coupled with the controller and the controller is configured to control the at least one valve actuator.

52. The method of claim 28, comprising the steps of:
receiving an instruction to transition at least one valve actuator from a pool mode to a water feature mode or from a water feature mode to a pool mode, the at least one valve actuator configured to adjust an associated valve to provide water from a variable speed pump to the pool when in the pool mode and to provide water from the variable speed pump to a water feature when in the water feature mode;
suspending a current heating cycle;
adjusting a speed of a variable speed pump to a minimum allowable level; and
transitioning the at least one valve actuator from the pool mode to the water feature mode or from the water feature mode to the pool mode after suspending the current heating cycle and adjusting the speed of the variable speed pump to the minimum allowable level,
wherein the at least one valve actuator is communicatively coupled with the controller and the controller is configured to control the at least one valve actuator.

53. The method of claim 52, comprising the steps of:
reactivating the heating cycle after transitioning the at least one valve actuator from pool mode to water feature mode or from water feature mode to pool mode;
controlling the speed of the variable speed pump based on a flow requirement of the water feature; and controlling a modulation rate of the heater based on the speed of the variable speed pump.

54. A method of controlling a pool or spa modulating heater and variable speed pump, comprising:
receiving, at a controller of the modulating heater, an instruction to operate according to a heating mode of operation;
instructing, with the controller, the variable speed pump to operate at a starting speed;
instructing, with the controller, the modulating heater to operate at a starting modulation rate, the modulating heater being capable of variably modulating energy output thereof to heat water of a pool or spa in fluidic communication with the heater;
instructing, with the controller, the modulating heater to increase modulation rate to a maximum allowed modulation rate and the variable speed pump to decrease speed to a minimum allowable operating level;
determining a current heater outlet water temperature of the water at an outlet of the modulating heater;
comparing the current heater outlet water temperature to a heater outlet water temperature setpoint;
instructing, with the controller, the variable speed pump to increase speed to a maximum allowable operating level when the current heater outlet water temperature is greater than the outlet water temperature setpoint; and
adjusting, with the controller, the modulation rate of the heater while the variable pump speed is operating at the maximum allowable operating level to cause a current water temperature to gradually approach a target temperature setpoint for the pool or spa water and minimize overshoot.

55. The method of claim 54, comprising the steps of:
establishing, with the controller, variable speed pump parameters based on the heating mode of operation; and
establishing, with the controller, heater modulation parameters based on the heating mode of operation.

56. The method of claim 54, comprising the step of:
establishing the heater outlet water temperature setpoint based on the heating mode of operation.

57. The method of claim 54, comprising the step of:
determining the heating mode of operation based on a user input.

58. The method of claim 54, comprising the step of:
determining the maximum allowed modulation rate based on the heating mode of operation.

59. The method of claim 54, comprising the step of:
determining the minimum allowable operating level based on the heating mode of operation.

60. A modulating heater system for a pool or spa, comprising:
a pool or spa heater in fluidic communication with water of a pool or spa, the heater capable of variably modulating energy output thereof to heat the water of the pool or spa; and
a controller communicatively coupled to the pool or spa heater, the controller configured to:
receive an instruction for the heater to operate according to a heating mode of operation;
instruct a variable speed pump to operate at a starting speed;
instruct the heater to operate at a starting modulation rate;
instruct the heater to increase modulation rate to a maximum allowed modulation rate and the variable speed pump to decrease speed to a minimum allowable operating level;

determine a current heater outlet water temperature of the water at an outlet of the heater;

compare the current heater outlet water temperature to an outlet water temperature setpoint;

instruct the variable speed pump to increase speed to a maximum allowable operating level when the current heater outlet water temperature is greater than the outlet water temperature setpoint; and adjust the modulation rate of the heater while the variable pump speed is operating at the maximum allowable operating level to cause a current water temperature to gradually approach a target temperature setpoint for the pool or spa water and minimize overshoot.

61. The system of claim 60, wherein the controller is configured to:

establish variable speed pump parameters based on the heating mode of operation; and establish heater modulation parameters based on the heating mode of operation.

62. The system of claim 60, wherein the controller is configured to:

establish the heater outlet water temperature setpoint based on the heating mode of operation.

63. The system of claim 60, wherein the controller is configured to:

determine the heating mode of operation based on a user input.

64. The system of claim 60, wherein controller is configured to:

determine the maximum allowed modulation rate based on the heating mode of operation.

65. The system of claim 60, wherein controller is configured to:

determine the minimum allowable operating level based on the heating mode of operation.

* * * * *